US012738233B2

(12) United States Patent
Kawashima et al.

(10) Patent No.: US 12,738,233 B2
(45) Date of Patent: Sep. 15, 2026

(54) SEMICONDUCTOR DEVICE, ELECTRONIC DEVICE, AND METHOD FOR DRIVING SEMICONDUCTOR DEVICE

(71) Applicant: Semiconductor Energy Laboratory Co., Ltd., Atsugi (JP)

(72) Inventors: Susumu Kawashima, Atsugi (JP); Tomoaki Atsumi, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 193 days.

(21) Appl. No.: 18/576,197

(22) PCT Filed: Jun. 30, 2022

(86) PCT No.: PCT/IB2022/056087
§ 371 (c)(1),
(2) Date: Jan. 3, 2024

(87) PCT Pub. No.: WO2023/285905
PCT Pub. Date: Jan. 19, 2023

(65) Prior Publication Data

US 2024/0185800 A1 Jun. 6, 2024

(30) Foreign Application Priority Data

Jul. 15, 2021 (JP) ................................. 2021-117250
Jul. 15, 2021 (JP) ................................. 2021-117251

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2310/0286* (2013.01); *G09G 2310/08* (2013.01)

(58) Field of Classification Search
CPC .......... G06F 3/041; G06F 3/042; G06F 21/32; G09G 3/3266; G09G 3/3225;
(Continued)

(56) References Cited

U.S. PATENT DOCUMENTS 10,761,653 B2 * 9/2020 Weng .................... G06F 3/0412
2017/0024567 A1 1/2017 Amit. et al.
(Continued)

FOREIGN PATENT DOCUMENTS

CN 105867676 A 8/2016
CN 111149103 A 5/2020
(Continued)

OTHER PUBLICATIONS

Feng. T et al., "Continuous Remote Mobile Identity Management Using Biometric Integrated Touch-Display", 2012 45th Annual IEEE/ACM International Symposium on Microarchitecture Workshops, Dec. 1, 2012, pp. 55-62.
(Continued)

*Primary Examiner* — Twyler L Haskins
*Assistant Examiner* — John H Morehead, III
(74) *Attorney, Agent, or Firm* — Eric J. Robinson; Robinson Intellectual Property Law Office, P.C.

(57) ABSTRACT

A semiconductor device capable of performing authentication in a short time and a driving method thereof are provided. A semiconductor device including a light-emitting apparatus and an imaging apparatus and a driving method thereof. The imaging apparatus includes pixels arranged in a matrix and a row driver including a shift register circuit. The driving method includes a first mode and a second mode. The first mode includes a step of detecting a position of a finger of a user. The second mode includes a step of reading out an image of a fingerprint of the user from pixels in the first row to a row of the position where the fingerprint
(Continued)

of the user is detected in the first mode, row by row. The operation of the shift register circuit is stopped after the first mode and the second mode are completed.

13 Claims, 28 Drawing Sheets

(58) Field of Classification Search
CPC ....... G09G 2310/0286; G09G 2310/08; G06V 40/12; A61B 5/1172
See application file for complete search history.

(56) References Cited

U.S. PATENT DOCUMENTS

| | | | | |
|---|---|---|---|---|
| 2017/0024597 | A1 | 1/2017 | Cho et al. | |
| 2018/0005005 | A1* | 1/2018 | He | G06F 3/0418 |
| 2018/0204035 | A1* | 7/2018 | Kim | G06F 3/0416 |
| 2019/0130087 | A1 | 5/2019 | Mori et al. | |
| 2020/0160025 | A1* | 5/2020 | Dangy-Caye | G06F 21/32 |
| 2020/0160035 | A1 | 5/2020 | Moussaffi | |
| 2021/0192168 | A1* | 6/2021 | Chang | G06F 3/0443 |
| 2022/0057664 | A1 | 2/2022 | Higano et al. | |
| 2023/0412935 | A1* | 12/2023 | Watanabe | H04N 25/44 |

FOREIGN PATENT DOCUMENTS

| | | | |
|---|---|---|---|
| EP | 3054399 | A | 8/2016 |
| EP | 3622428 | A | 3/2020 |
| JP | 2019-079415 | A | 5/2019 |
| JP | 2020-525891 | | 8/2020 |
| JP | 2020-184226 | A | 11/2020 |
| KR | 2016-0096390 | A | 8/2016 |
| KR | 2020-0015710 | A | 2/2020 |
| WO | WO-2019/007514 | | 1/2019 |
| WO | WO-2020/226020 | | 11/2020 |

OTHER PUBLICATIONS

International Search Report (Application No. PCT/IB2022/056087) Dated Sep. 20, 2022.
Written Opinion (Application No. PCT/IB2022/056087) Dated Sep. 20, 2022.
Takahashi.K et al., “A Novel Touch-Control Method with Partial Scanning for LC, OLED, and Hybrid Displays Using an Oxide Semiconductor”, SID Digest ’17 : SID International Symposium Digest of Technical Papers, May 23, 2017, pp. 930-933.

* cited by examiner

SEMICONDUCTOR DEVICE, ELECTRONIC DEVICE, AND METHOD FOR DRIVING SEMICONDUCTOR DEVICE

TECHNICAL FIELD

One embodiment of the present invention relates to a semiconductor device, an electronic device, and a method for driving the semiconductor device. One embodiment of the present invention relates to a semiconductor device including a light-emitting apparatus and an imaging apparatus, an electronic device including a semiconductor device including a light-emitting apparatus and an imaging apparatus, and a driving method for a semiconductor device including a light-emitting apparatus and an imaging apparatus.

Note that one embodiment of the present invention is not limited to the above technical field. Examples of the technical field of one embodiment of the present invention disclosed in this specification and the like include a semiconductor device, a display device, a light-emitting apparatus, an imaging apparatus, a power storage device, a memory device, an electronic device, a lighting device, an input device (e.g., a touch sensor), a driving method for an input/output device (e.g., a touch panel). A semiconductor device refers to any device that can function by utilizing semiconductor characteristics.

BACKGROUND ART

Pieces of imaging apparatus have been used in devices such as digital cameras conventionally, and with the widespread use of portable information terminals such as smartphones and tablet terminals, an improvement in performance, a reduction in size, and a reduction in costs have been needed. Moreover, pieces of imaging apparatus have been not only used for taking a photograph or a moving image but also applied to biometric authentication such as face authentication, fingerprint authentication, and vein authentication, input devices such as touch sensors and motion sensors, or the like; that is, the usage has been diversified. Patent Document 1 discloses electronic devices such as smartphones capable of fingerprint authentication.

REFERENCE

Patent Document

[Patent Document 1] Japanese Published Patent Application No. 2019-79415

SUMMARY OF THE INVENTION

Problems to be Solved by the Invention

As a method of performing fingerprint authentication which is one mode of authentication, there is a method in which a finger is irradiated with light from a light-emitting element and light reflected by the finger is detected by a light-receiving element. In this case, a high-resolution fingerprint image is obtained, whereby fingerprint authentication can be performed with high accuracy. However, if it takes a long time to obtain a high resolution fingerprint image, it is stressful for a person being authenticated.

An object of one embodiment of the present invention is to provide a semiconductor device and an electronic device each of which is capable of performing authentication in a short time and a method for driving the semiconductor device. Another object is to provide a semiconductor device and an electronic device each of which capable of performing highly accurate authentication and a method for driving the semiconductor device. Another object is to provide a highly reliable semiconductor device and electronic device and a driving method of the semiconductor device. Another object is to provide a novel semiconductor device and electronic device and a driving method of the semiconductor device.

Note that the description of these objects does not preclude the existence of other objects. Note that one embodiment of the present invention does not need to achieve all of these objects. Note that other objects can be derived from the description of the specification, the drawings, the claims, and the like.

Means for Solving the Problems

One embodiment of the present invention is a semiconductor device including a light-emitting apparatus and an imaging apparatus. The imaging apparatus includes a pixel portion where pixels are arranged in a matrix of m rows and n columns (m and n are each an integer greater than or equal to 1) and a row driver circuit including a shift register circuit. The imaging apparatus has a function of detecting a detection target that is located over the pixels in the p-th to q-th rows (p and q are each an integer greater than or equal to 1 and less than or equal to m, and p is smaller than q) of the pixel portion when light that is emitted by the light-emitting apparatus and detected by the detection target is detected, and a function of obtaining and reading out an image of the detection target from at least the pixels in the first to the q-th rows of the pixel portion.

In the above, it is preferable that pixels in a first row of the pixel portion be connected to a first stage of the shift register circuit and pixels in the m-th row of the pixel portion be connected to the last stage of the shift register circuit outputting a selection signal.

In the above, the detection target is preferably a finger of a user of a semiconductor device.

In the above, it is preferable that a pixel portion and a shift register circuit each include a transistor and the transistor include a metal oxide in a channel formation region.

Another embodiment of the present invention is an electrical device including the above semiconductor device and a speaker. Pixels in the first row of the pixel portion is the pixels in the row farthest from the speaker, and pixels in the m-th row of the pixel portion is the pixels in the row the nearest from the speaker.

Another embodiment of the present invention is an electronic device including the above semiconductor device and a camera. Pixels in the first row of the pixel portion are the pixels in the row farthest from the camera, and pixels in the m-th row of the pixel portion are the pixels in the row nearest from the camera.

Another embodiment of the present invention is a semiconductor device including a light-emitting apparatus and an imaging apparatus. The imaging apparatus includes a pixel portion where pixels of m rows and n columns (m and n are each an integer greater than or equal to 1) are arranged in a matrix and a row driver circuit including a shift register circuit. The imaging apparatus has a function of detecting a detection target that is located on the pixels in the p-th to q-th rows (p and q are each an integer greater than or equal to 1 and less than or equal to m, and p is smaller than q) of the pixel portion when light that is emitted by the light-emitting apparatus and detected by the detection target is detected, a function of skipping imaging operation for the detection target in pixels in the first to p−1-th rows of the pixel portion, a function of obtaining and reading out an image of the detection target from pixels in the p-th to q-th rows of the pixel portion, and a function of skipping imaging operation for the detection target in pixels in the q+1-th to m-th rows of the pixel portion.

In the above, it is preferable that the detection target be a finger of a user of the semiconductor device, and the image be a fingerprint of the user.

In the above, it is preferable that the pixel portion and the shift register circuit each include a transistor and the transistor include a metal oxide in a channel formation region.

In addition, one embodiment of the present invention is an electronic device including the above semiconductor device and a speaker.

In addition, one embodiment of the present invention is an electronic device including the above semiconductor device and a camera.

In addition, one embodiment of the present invention is a method for driving a semiconductor device including a light-emitting apparatus and an imaging apparatus. The imaging apparatus includes a pixel portion where pixels of m rows and n columns (m and n are each an integer greater than or equal to 1) are arranged in a matrix and a row driver circuit including a shift register circuit. The driving method of the semiconductor device includes a first mode of detecting a detection target that is located on the pixels in p-th to q-th rows (p and q are each integers greater than or equal to 1 and less than or equal to m, and p is smaller than q) of the pixel portion and a second mode of capturing an image of the detection target which reflects light emitted from the light-emitting apparatus and reading out the captured image from the pixels in the first to q-th rows in the pixel portion by the imaging apparatus. The second mode is performed after the first mode is performed, and the operation of the shift register circuit is stopped after the second mode is completed.

In the above, the first mode is preferably performed in every x rows and in every y columns (x and y are each an integer greater than or equal to 1 and less than or equal to q-p) of pixels arranged in m rows and n columns of the pixel portion.

In the above, the second mode is preferably performed from the first row to the q-th row of the pixels of the pixel portion In the above, the detection target is preferably a finger of a user of the semiconductor device and the image captured by the imaging apparatus is preferably a fingerprint image of the user.

One embodiment of the present invention is a method for driving a semiconductor device including a light-emitting apparatus and an imaging apparatus. The imaging apparatus includes a pixel portion where pixels of m rows and n columns (m and n are each an integer greater than or equal to 1) are arranged in a matrix and a row driver circuit including a shift register circuit. The driving method of the semiconductor device includes a step of capturing an image of the detection target which reflects light emitted from the light-emitting apparatus and reading out the captured image from pixels in first to r-th rows (r is an integer greater than or equal to 1 and less than or equal to m) of the pixel portion, and stops the operation of the shift register circuit when the step is completed.

In the above, the step is preferably performed from the first row to the r-th row of the pixels of the pixel portion.

In the above, the detection target is preferably a finger of a user of the semiconductor device, and the image captured by the imaging apparatus is preferably a fingerprint image of the user.

In addition, one embodiment of the present invention is a method for driving a semiconductor device including a light-emitting apparatus and an imaging apparatus. The imaging apparatus includes a first pixel portion where pixels of m rows and n columns (m and n are each an integer greater than or equal to 1) are arranged in a matrix, a second pixel portion provided in b-th to u-th row (b and u are each an integer greater than or equal to 1 and less than or equal to m, and b is smaller than u) of the first pixel portion, a row driver circuit including a shift register circuit. The driving method (of the semiconductor device) includes a step of skipping imaging operation for a detection target in one of regions in the first pixel portion not overlapping with the second pixel portion region, a step of capturing an image of the detection target which reflects light emitted from the light-emitting apparatus and reading out the captured image from the pixels in the b-th to u-th rows of the second pixel portion, and a step of skipping imaging operation for the detection target in the other region in the first pixel portion which is not overlapping with the second pixel portion.

In the above, the detection target is preferably a finger of a user of the semiconductor device, and the image captured by the imaging apparatus is preferably a fingerprint image of the user.

In addition, one embodiment of the present invention is a method for driving a semiconductor device including a light-emitting apparatus and an imaging apparatus. The imaging apparatus includes a pixel portion where pixels of m rows and n columns (m and n is integers greater than or equal to 1) are arranged in a matrix and a row driver circuit including a shift register circuit. The driving method of the semiconductor device includes a first mode of detecting a detection target that is located on the pixels in the p-th to q-th rows (p and q are each an integer greater than or equal to 1 and less than or equal to m, and p is smaller than q) of the pixel portion and a second mode of capturing an image of the detection target which reflects light emitted from the light-emitting apparatus in pixels in the first to the q-th rows in the pixel portion and reading out the captured image. A step of skipping imaging operation for the detection target in pixels in the first to p-th- rows in the pixel portion is performed after the first mode, the second step is performed after the step, and a step of skipping imaging operation for the detection target in pixels in the q+1-th to m-th rows in the pixel portion is performed after the second mode.

In the above, the first mode is preferably performed in every x rows and in every y columns (x and y are each an integer greater than or equal to 1 and less than or equal to q-p) of pixels arranged in m rows and n columns of the pixel portion.

In the above, the detection target is preferably a finger of a user of the semiconductor device, and the image captured by the imaging apparatus is preferably a fingerprint image of the user.

Effect of the Invention

According to one embodiment of the present invention, a semiconductor device and an electronic device capable of performing authentication in a short time and a method for driving the semiconductor device can be provided. A semiconductor device and an electronic device capable of performing highly accurate authentication and a driving method thereof can be provided. A highly reliable semiconductor device and an electronic device and a driving method thereof can be provided. A novel semiconductor device and an electronic device and a driving method thereof can be provided.

Note that the description of these effects does not preclude the existence of other effects. Note that one embodiment of the present invention does not need to have all the effects. Note that other effects can be derived from the description of the specification, the drawings, and the claims.

BRIEF DESCRIPTION OF THE DRAWINGS

FIG. 2B1 is a circuit diagram illustrating a configuration example of an imaging apparatus. FIG. 2B2 is a timing chart showing an example of a driving method for an imaging apparatus.

MODE FOR CARRYING OUT THE INVENTION

Figure 1A:
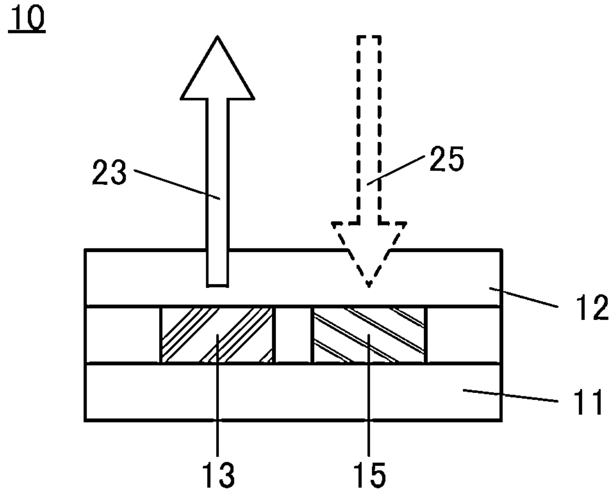
FIG. 1A and FIG. 1B are schematic views each illustrating a structure example of a semiconductor device.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description of embodiments below. Note that in the structures of the invention described below, the same portions or portions having similar functions are denoted with the same reference numerals in different drawings, and description of such portions is not repeated.

The position, size, range, and the like of each component illustrated in the drawings and the like do not represent the actual position, size, range, and the like in some cases for easy understanding of the invention. Therefore, the disclosed invention is not necessarily limited to the position, size, range, or the like disclosed in the drawings and the like. For example, in an actual manufacturing process, a resist mask or the like might be unintentionally reduced in size by treatment such as etching, which is not reflected in the drawings for easy understanding in some cases.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

In this specification and the like, the resistance value of a "resistor" is sometimes determined depending on the length of a wiring. Alternatively, the resistance value is sometimes determined through the connection of a conductive layer used for a wiring to a conductive layer with resistivity different from that of the conductive layer. Alternatively, the resistance value is sometimes determined by impurity doping in a semiconductor layer.

In this specification and the like, a "terminal" in an electric circuit refers to a portion that inputs or outputs current or voltage or receives or transmits a signal. Accordingly, part of a wiring or an electrode functions as a terminal in some cases.

Note that the term "over", "above", "under", or "below" in this specification and the like does not necessarily mean that a component is placed directly over and in contact with or directly under and in contact with another component. For example, the expression "electrode B over insulating layer A" does not necessarily mean that the electrode B is formed on and in direct contact with the insulating layer A, and does not exclude the case where another component is provided between the insulating layer A and the electrode B. Additionally, the expression "conductive layer D above conductive layer C" does not necessarily mean that the conductive layer D is formed on and in direct contact with the conductive layer C, and does not exclude the case where another component is provided between the conductive layer C and the conductive layer D. The term "above" or "below" does not exclude the case where a component is placed in an oblique direction.

Furthermore, functions of a source and a drain are interchanged with each other depending on operation conditions, for example, when a transistor with a different conductivity type is employed or when the direction of current flow is changed in circuit operation; therefore, it is difficult to define which is the source or the drain. Therefore, the terms source and drain can be switched in this specification.

In this specification and the like, the expression "electrically connected" includes the case where components are directly connected to each other and the case where components are connected through an "object having any electric function". Here, there is no particular limitation on the "object having any electric function" as long as electric signals can be transmitted and received between components that are connected through the object. Thus, even when the expression "electrically connected" is used, there is a case where no physical connection is made and a wiring just extends in an actual circuit. In addition, the expression "directly connected" includes the case where different conductive layers are connected to each other through a contact to form a wiring.

In this specification and the like, the terms "identical", "same", "equal", "uniform", and the like used in describing calculation values and actual measurement values allow for a margin of error of ±20% unless otherwise specified.

A voltage refers to a potential difference between a given potential and a reference potential (e.g., a ground potential or a source potential) in many cases. Therefore, a voltage and a potential difference can be replaced with each other in many cases. In this specification and the like, a voltage and a potential difference can be replaced with each other unless otherwise specified.

Note that a "semiconductor" has characteristics of an "insulator" when the conductivity is sufficiently low, for example. Thus, a "semiconductor" and an "insulator" can be replaced with each other. In this case, a "semiconductor" and an "insulator" cannot be strictly distinguished from each other because a border therebetween is not clear. Accordingly, a "semiconductor" and an "insulator" in this specification can be replaced with each other in some cases.

Furthermore, a "semiconductor" has characteristics of a "conductor" when the conductivity is sufficiently high, for example. Thus, a "semiconductor" and a "conductor" can be replaced with each other. In this case, a "semiconductor" and a "conductor" cannot be strictly distinguished from each other because a border therebetween is not clear. Accordingly, a "semiconductor" and a "conductor" in this specification can be replaced with each other in some cases.

Note that ordinal numbers such as "first" and "second" in this specification and the like are used in order to avoid confusion among components and do not denote the priority or the order such as the order of steps or the stacking order. A term without an ordinal number in this specification and the like may be provided with an ordinal number in the SCOPE OF CLAIMS in order to avoid confusion among components. Furthermore, a term with an ordinal number in this specification and the like may be provided with a different ordinal number in the SCOPE OF CLAIMS. Furthermore, even when a term is provided with an ordinal number in this specification and the like, the ordinal number might be omitted in the SCOPE OF CLAIMS and the like.

Note that in this specification and the like, an "on state" of a transistor refers to a state in which a source and a drain of the transistor are regarded as being electrically short-circuited (also referred to as a "conduction state"). Furthermore, an "off state" of a transistor refers to a state in which a source and a drain of the transistor are regarded as being electrically disconnected (also referred to as a "non-conduction state"). For example, the transistor in the on state can operate in a linear region.

In addition, in this specification and the like, an "on-state current" sometimes refers to a current that flows between a source and a drain when a transistor is in an on state. Furthermore, an "off-state current" sometimes refers to a current that flows between a source and a drain when a transistor is in an off state.

In this specification and the like, a gate refers to part or the whole of a gate electrode and a gate wiring. A gate wiring refers to a wiring for electrically connecting one gate electrode of at least one transistor to another electrode or another wiring.

In this specification and the like, a source refers to part or the whole of a source region, a source electrode, and a source wiring. A source region refers to a region in a semiconductor layer where the resistivity is lower than or equal to a given value. A source electrode refers to part of a conductive layer which is connected to a source region. A source wiring refers to a wiring for electrically connecting one source electrode of at least one transistor to another electrode or another wiring.

In this specification and the like, a drain refers to part or the whole of a drain region, a drain electrode, and a drain wiring. A drain region refers to a region in a semiconductor layer where the resistivity is lower than or equal to a given value. A drain electrode refers to part of a conductive layer which is connected to a drain region. A drain wiring refers to a wiring for electrically connecting one drain electrode of at least one transistor to another electrode or another wiring.

Embodiment 1

In this embodiment, a semiconductor device of one embodiment of the present invention is described.

A semiconductor device of one embodiment of the present invention includes a light-emitting apparatus and an imaging apparatus. The light-emitting apparatus has a function of, for example, emitting infrared light or visible light. The imaging apparatus has a function of sensing light. For example, a detection target is irradiated with light emitted from the light-emitting apparatus, and the light which is reflected by the detection target can be sensed with the imaging apparatus. When a detection target is a finger of a user of a semiconductor device of one embodiment of the present invention, for example, the semiconductor device of one embodiment of the present invention can perform a fingerprint authentication or the like.

The imaging apparatus included in the semiconductor device of one embodiment of the present invention includes a pixel portion in which pixels are arranged in a matrix and a row driver circuit having a function of selecting pixels from which captured-image data is read out row by row.

For example, in the case where a fingerprint authentication is performed using the semiconductor device of one embodiment of the present invention, first, the row driver circuit selects pixels in a specific row of the pixel portion (or in a specified row in the pixel portion) and reads out first captured-image data. In this manner, the position in the pixel portion of a finger that touches or approaches the pixel portion is detected, for example. Next, the row driver circuit selects only pixels at rows which the finger touches or approaches and at peripheral rows of the rows and reads out second captured-image data, i.e., a user's fingerprint. In this manner, the semiconductor device of one embodiment of the present invention performs fingerprint authentication.

Here, when the first captured-image data is read out, detection of the position of a finger is only required, and the reading out of the fingerprint image is not required. Therefore, the readout of the first captured image data is not necessarily performed on the pixels in all of the rows and columns in the pixel portion. For example, the readout of the first captured image data may be performed on a limited number of pixels in every plurality of rows and every plurality of columns.

Accordingly, as compared with the case where the first captured-image data is read out from all of the pixels in the pixel portion, the readout period for the pixels in one row can be shortened. When the second captured-image data is read out, the readout period for the pixels in one row is longer than that in the case where the first captured-image data is read out, since the fingerprint image needs to be read out from all pixels in a specified region. In the semiconductor device of one embodiment of the present invention, pixels from which the second captured-image data is read out for fingerprint authentication can be only some of the pixels provided in the pixel portion. Thus, fingerprint authentication can be performed in a shorter time than the time taken in the case where the second captured-image data is read out from all pixels.

Structure Example_1 of Semiconductor Device

FIG. 1A is a diagram illustrating a structure example of a semiconductor device 10. The semiconductor device 10 includes a substrate 11 and a substrate 12, and a light-emitting apparatus 13 and an imaging apparatus 15 are provided between the substrate 11 and the substrate 12. The light-emitting apparatus 13 and the imaging apparatus 15 are provided over the same plane.

The light-emitting apparatus 13 has a function of emitting light 23. The light 23 can be infrared light or visible light.

The imaging apparatus 15 has a function of detecting incident light 25. Specifically, the imaging apparatus 15 is provided with a light-receiving element and has a function of detecting the light 25 incident on the light-receiving element.

In this specification and the like, the term "element" can be replaced with the term "device" as appropriate. For example, a light-receiving element can be referred to as a light-receiving device.

A photoelectric conversion element that detects incident light and generates charge can be used as the light-receiving element. The amount of generated electric charge depends on the amount of light incident on the light-receiving element. As the light-receiving element, a pn photodiode or a pin photodiode can be used, for example.

As the light-receiving element, an organic photodiode including an organic compound in a photoelectric conversion layer is preferably used. An organic photodiode is easily made thin and lightweight and easily has a large area. In addition, an organic photodiode can be used in a variety of pieces of imaging apparatus because of its high flexibility in shape and design. Alternatively, a photodiode containing amorphous silicon, crystalline silicon (e.g., single crystal silicon, polycrystalline silicon, or microcrystalline silicon), a metal oxide, or the like can be used as the light-receiving element.

In the case where an organic compound is used in a photoelectric conversion layer of a photodiode, selecting an appropriate material can make the photodiode have sensitivity to light ranging from ultraviolet light to infrared light. In the case where amorphous silicon is used in the photoelectric conversion layer, the photodiode mainly has sensitivity to visible light; in the case where crystalline silicon is used in the photoelectric conversion layer, the photodiode has sensitivity to light ranging from visible light to infrared light. Since a metal oxide has a wide band gap, a photodiode containing a metal oxide in a photoelectric conversion layer has high sensitivity to mainly light having a higher energy than visible light. Note that an In-M-Zn oxide (the element M is one or more kinds selected from aluminum, gallium, yttrium, tin, titanium, and the like) can be used as the metal oxide, for example.

The semiconductor device 10, for example, emits the light 23 to a detection target, and the light reflected by the detection target can be detected as the light 25 with the imaging apparatus 15.

Figure 1B:
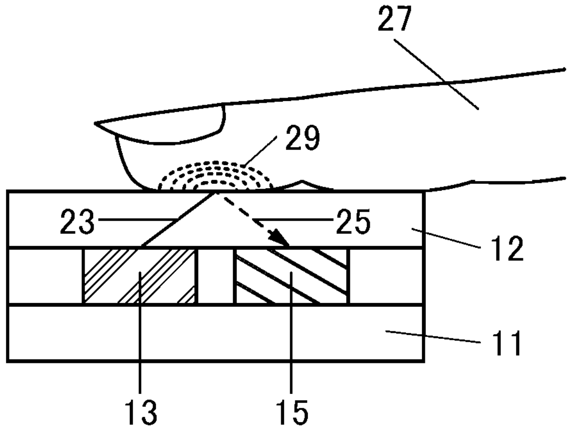

FIG. 1B is a diagram illustrating an example of a function of the semiconductor device 10. In FIG. 1B, the detection target is a finger 27. The finger 27 can be a finger of the user of the semiconductor device 10, for example.

In the case illustrated in FIG. 1B, the light 23 is emitted to the finger 27 and the imaging apparatus 15 detects the light reflected by the finger 27 as the light 25, whereby a fingerprint 29 of the finger 27 can be detected. In this manner, authentication such as fingerprint authentication can be performed.

Note that the light-emitting apparatus 13 and the imaging apparatus 15 are not necessarily provided over the same plane, and the light-emitting apparatus 13 can be provided below the imaging apparatus 15. For example, light emitted from the light-emitting apparatus 13 can be reflected by a detection target through the imaging apparatus 15, and the imaging apparatus 15 can detect the reflected light.

Structure Example of Imaging Apparatus

Figure 2A:
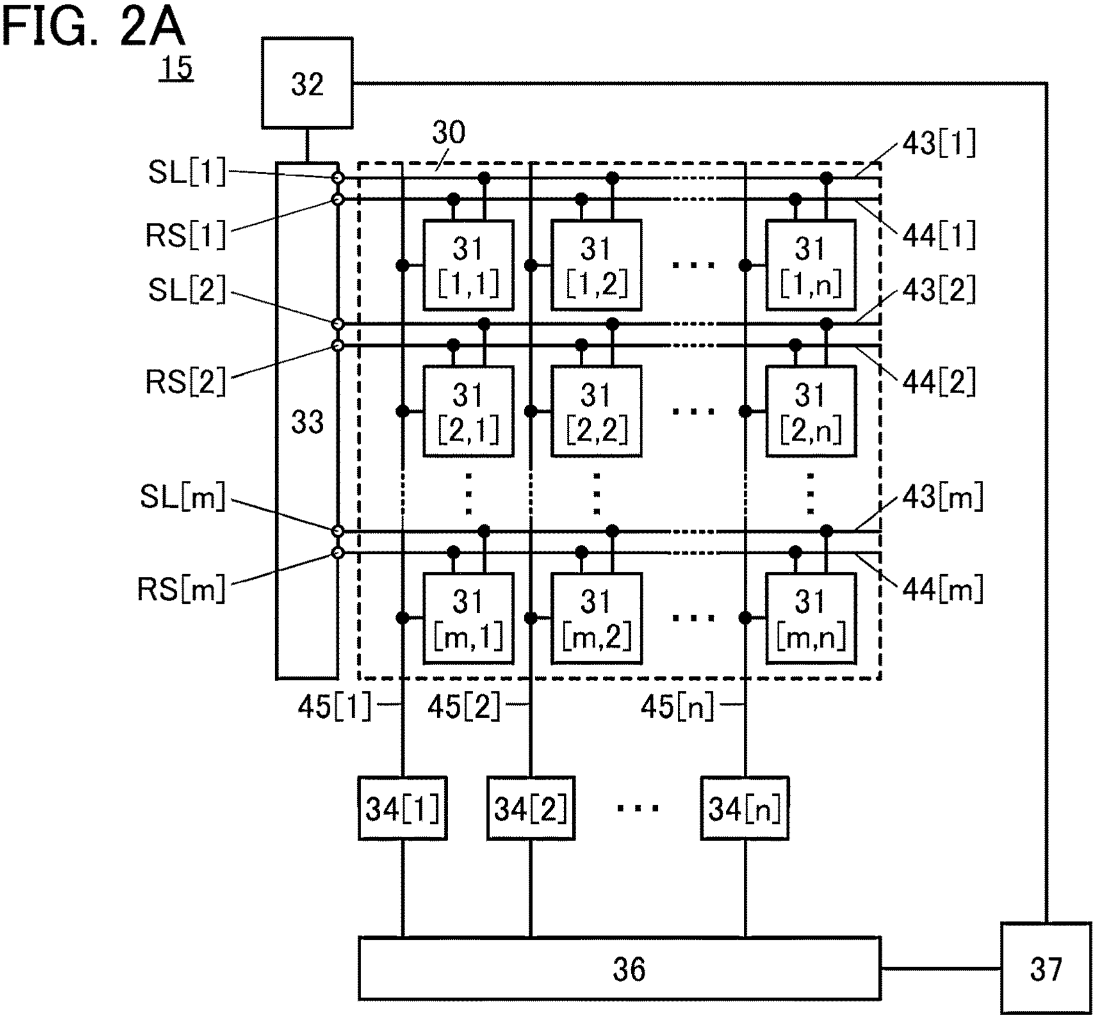
FIG. 2A is a block diagram illustrating a configuration example of an imaging apparatus.

FIG. 2A is a block diagram illustrating a structure example of the imaging apparatus 15. The imaging apparatus 15 includes a pixel portion 30 in which pixels 31 in m rows and n columns (m and n are integers greater than or equal to 1) are arranged in a matrix, a control circuit 32, a row driver circuit 33, a CDS (Correlated Double Sampling) circuit 34, a readout circuit 36, and a detection circuit 37. Here, the row driver circuit 33 includes a shift register circuit, which is not illustrated in FIG. 2A. A specific structure example of the shift register circuit is described later. The CDS circuit 34 can be provided for each column of the pixels 31. FIG. 2A illustrates an example in which n CDS circuits 34 are provided.

In this specification and the like, when a plurality of components are denoted by the same reference numerals and in particular need to be distinguished from each other, an identification sign such as "[ ]", "< >", "( )", or " " is sometimes added to the reference numerals. For example, the pixel 31 in the first row and the first column is denoted with a pixel 3[1,1], and the pixel 31 in the m-th row and the n-th column is denoted with a pixel 31[m,n]. Furthermore, the CDS circuit 34 in the first column is denoted with a CDS circuit 34[1], and the CDS circuit 34 in the n-th column is denoted with a CDS circuit 34[n].

The row driver circuit 33 is electrically connected to the pixels 31 through a wiring 43. The row driver circuit 33 is electrically connected to the pixels 31 through a wiring 44. Here, the wiring 43 is electrically connected to a terminal SL, and the wiring 44 is electrically connected to a terminal RS.

The CDS circuit 34 is electrically connected to the pixels 31 through a wiring 45. The CDS circuit 34 is electrically connected to the readout circuit 36.

FIG. 2A illustrates a structure in which the pixels 31 in the same row are electrically connected to the same the wiring 43 (the terminal SL) and the same the wiring 44 (the terminal RS), and the pixels 31 in the same column are electrically connected to the same the wiring 45. In this specification and the like, for example, the wiring 43 (the terminal SL) electrically connected to the pixels 31 in the first row is referred to as a wiring 43[1] (a terminal SL[1]) and the wiring 43 (the terminal SL) electrically connected to the pixels 31 in the m-th row is referred to as a wiring 43[m] (a terminal SL[m]). For example, the wiring 44 (the terminal RS) electrically connected to the pixels 31 in the first row is referred to as a wiring 44[1] (a terminal RS[1]) and the wiring 44 (the terminal RS) electrically connected to the pixels 31 in the m-th row is referred to as a wiring 44[m] (a terminal RS[m]). For example, the wiring 45 electrically connected to the pixels 31 in the first column is referred to as a wiring 45[1], and the wiring 45 electrically connected to the pixels 31 in the n-th column is referred to as a wiring 45[n].

The control circuit 32 has a function of generating a signal for controlling driving of the row driver circuit 33. The control circuit 32 has a function of generating, for example, a start pulse signal, a clock signal, and the like, and supplying such signals to the row driver circuit 33. The signals generated by the control circuit 32 will be described in detail later.

The row driver circuit 33 has a function of selecting the pixels 31 from which captured-image data is read out. Specifically, the pixels 31 from which the acquired captured-image data is read out can be selected by supplying a signal to the wiring 43 (the terminal SL). The row driver circuit 33 also has a function of selecting the pixels 31 to be subjected to the reset of the captured-image data. Specifically, the pixels 31 to be subjected to the reset of the acquired captured-image data can be selected by supplying a signal to the wiring 44 (the terminal RS). Note that the row driver circuit is also referred to as a gate driver circuit or a scan driver circuit.

In this specification and the like, a high-potential signal is simply referred to as a "signal" in some cases. For example, "a high-potential signal is supplied" is simply referred to as "a signal is supplied", and "a low-potential signal is supplied" is simply referred to as "supply of a signal is stopped" in some cases.

The CDS circuit 34 has a function of performing correlated double sampling on the captured-image data read out from the pixels 31. The correlated double sampling is to take a difference between a potential output from the pixel 31 when captured-image data is read out and a potential output from the pixel 31 when the captured-image data is reset. The correlated double sampling can reduce noise in the captured-image data that is read out.

The readout circuit 36 has a function of sequentially outputting the captured-image data output from the CDS circuit 34[1] to the CDS circuit 34[n] to the detection circuit 37 or the like.

The detection circuit 37 has a function of detecting an object or the like on the basis of data output from the readout circuit 36. For example, when the semiconductor device 10 is driven as illustrated in FIG. 1B, the detection circuit 37 has a function of detecting the position of the finger 27. Furthermore, the detection circuit 37 has a function of detecting the fingerprint 29 of the finger 27 and authenticating it.

The result of detection by the detection circuit 37 is supplied to the control circuit 32. Thus, the row driver circuit 33 can be driven in accordance with the result of detection by the detection circuit 37.

Note that all the circuits illustrated in FIG. 2A are not necessarily provided in the imaging apparatus 15. For example, the control circuit 32 and the detection circuit 37 may be provided outside the imaging apparatus 15.

Structure Example_1 of Pixel

FIG. 2B1 is a circuit diagram illustrating a structure example of the pixel 31. The pixel 31 with a structure illustrated in FIG. 2B1 includes a light-receiving element 50, a transistor 51, a transistor 52, a transistor 53, a transistor 54, a capacitor 56, and a capacitor 57. Note that the capacitor 56 is not necessarily provided when the parasitic capacitance between a transistor connected to the capacitor 56 and a wiring 49 can be sufficiently high for the operation. In addition, the capacitor 57 is not necessarily provided when the parasitic capacitance of the light-receiving element 50 connected to the capacitor 57 can be sufficiently high for the operation. Note that in the following descriptions, the transistor 51 to the transistor 54 are n-channel transistors; however, the description below can also be referred to for the case where a p-channel transistor is included by reversing the magnitude relationship of potentials as appropriate, for example. Moreover, the connection direction of the light-receiving element 50 can be reversed by changing the magnitude relationship of potentials as appropriate.

One electrode of the light-receiving element 50 is electrically connected to one electrode of the capacitor 57. The one electrode of the capacitor 57 is electrically connected to one of a source and a drain of the transistor 51. The other of the source and the drain of the transistor 51 is electrically connected to a gate of the transistor 52. One of a source and a drain of the transistor 52 is electrically connected to one of a source and a drain of the transistor 53. The gate of the transistor 52 is electrically connected to one of a source and a drain of the transistor 54. One of the source and the drain of the transistor 54 is electrically connected to one electrode of the capacitor 56. Note that a node where the other of the source and the drain of the transistor 51, the gate of the transistor 52, one of the source and the drain of the transistor 54, and the one electrode of the capacitor 56 are electrically connected to each other is referred to as a node FD.

A gate of the transistor 51 is electrically connected to a wiring 41. A gate of the transistor 53 is electrically connected to the wiring 43 (the terminal SL). A gate of the transistor 54 is electrically connected to the wiring 44 (the terminal RS). The other of the source and the drain of the transistor 53 is electrically connected to the wiring 45. The other electrode of the light-receiving element 50 and the other electrode of the capacitor 57 are electrically connected to a wiring 46. The other of the source and the drain of the transistor 52 is electrically connected to a wiring 47. The other of the source and the drain of the transistor 54 is electrically connected to a wiring 48. The other electrode of the capacitor 56 is electrically connected to the wiring 49.

A power supply potential can be supplied to the wiring 46 to the wiring 49. Thus, it can be said that the wiring 46 to the wiring 49 each have a function of a power supply line. For example, a high potential can be supplied to the wiring 47, and a low potential can be supplied to the wiring 49. In the case where a cathode of the light-receiving element 50 is electrically connected to the wiring 46 as illustrated in FIG. 2B1, the wiring 46 can have a high potential and the wiring 48 can have a low potential. In contrast, in the case where an anode of the light-receiving element 50 is electrically connected to the wiring 46, the wiring 46 can have a low potential and the wiring 48 can have a high potential.

Figure 2A:
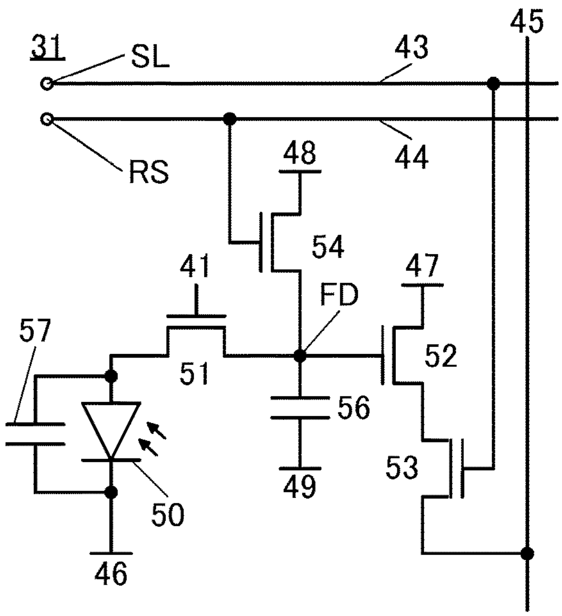
Figure 2A:
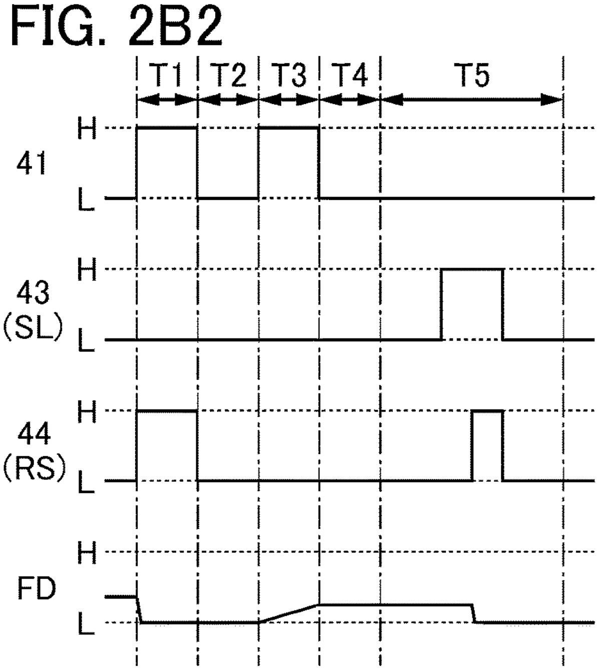

FIG. 2B2 is a timing chart showing an example of a driving method of the pixel 31 with the structure illustrated in FIG. 2B1. Here, the potential of the wiring 46 is set to a high potential, and the potential of the wiring 48 is set to a low potential. Note that in FIG. 2B2, "H" means a high potential and "L" means a low potential. The same applies to other timing charts. FIG. 2B2 illustrates Period T1 to Period T5 as a driving period of the pixel 31.

In Period T1, the potentials of the wiring 41 and the wiring 44 (the terminal RS) are set to high potentials, and the potential of the wiring 43 (the terminal SL) is set to a low potential. Accordingly, the transistor 51 and the transistor 54 are turned on and the transistor 53 is turned off. The transistor 54 is turned on, whereby the potential of the node FD becomes a low potential that is the potential of the wiring 48. Furthermore, since the transistor 51 is turned on in addition to the transistor 54, the potential of one electrode of the light-receiving element 50 also becomes a low potential that is the potential of the wiring 48, which is not illustrated in FIG. 2B2. Therefore, electric charges stored in the capacitor 56, the capacitor 57, and the like are reset. Thus, Period T1 can be referred to as a reset period, and the operation in Period T1 can be referred to as the reset operation.

In Period T2, the potentials of the wiring 41 and the wiring 44 (the terminal RS) are set to low potentials. Thus, the transistor 51 and the transistor 54 are turned off. When light is incident on the light-receiving element 50 in this state, electric charges corresponding to energy of light that enters the light-receiving element 50 are stored in the capacitor 57. Thus, Period T2 can be referred to as an exposure period, and the operation in Period T2 can be referred to as an exposure operation.

In Period T3, the potential of the wiring 41 is set to a high potential. Thus, the transistor 51 is turned on, whereby the electric charges stored in the capacitor 57 are transferred to the node FD. Accordingly, the potential of the node FD is increased. Thus, Period T3 can be referred to as a transfer period, and the operation in Period T3 can be referred to as a transfer operation.

In Period T4, the potential of the wiring 41 is set to a low potential. Accordingly, the transistor 51 is turned off, whereby transfer of electric charges from the capacitor 57 to the node FD is completed.

In the above manner, captured-image data is acquired by the pixel 31. Specifically, the potential of the node FD becomes a potential corresponding to the captured-image data. Thus, Period T1 to Period T4 can be referred to as an acquisition period, and an operation performed in Period T1 to Period T4 can be referred to as an acquisition operation.

Next, an example of the driving method for Period T5 will be described. In Period T5, the potential of the wiring 43 (the terminal SL) is set to a high potential. Thus, the transistor 53 is turned on, and a signal representing the captured-image data acquired by the pixel 31 is output to the wiring 45. Specifically, the potential of the wiring 45 becomes a potential corresponding to the potential of the node FD. Accordingly, the captured-image data acquired by the pixel 31 is read out.

As described above, a high potential signal is supplied to the wiring 43 (the terminal SL), whereby the captured-image data acquired by the pixel 31 is read out. In other words, the pixel 31 from which the captured-image data is read out can be selected by the signal supplied to the wiring 43 (the terminal SL). Thus, the signal supplied to the wiring 43 (the terminal SL) can be referred to as a selection signal.

After the captured-image data is read out, the potential of the wiring 44 (the terminal RS) is set to a high potential. Thus, the transistor 54 is turned on, and the captured-image data acquired by the pixel 31 is reset. Specifically, the potential of the node FD becomes a low potential that is the potential of the wiring 48. Here, since the transistor 53 is in the on state, the potential of the wiring 45 is changed in accordance with the potential change of the node FD. Therefore, the CDS circuit 34 electrically connected to the wiring 45 can perform correlated double sampling.

As described above, a high potential signal is supplied to the wiring 44 (the terminal RS), whereby the captured-image data acquired by the pixel 31 is reset. Thus, a signal supplied to the wiring 44 (the terminal RS) can be referred to as a reset signal.

After the correlated double sampling is performed, the potential of the wiring 44 (the terminal RS) is set to be a low potential to turn off the transistor 54, while the potential of the wiring 43 (the terminal SL) is set to a low potential to turn off the transistor 53.

The above is an example of the driving method in Period T5. In Period T5, the captured-image data acquired by the pixel 31 is read out. Thus, Period T5 can be referred to as a readout period, and the operation in Period T5 can be referred to as a readout operation.

The acquisition of the captured-image data by the pixel 31[1,1] to the pixel 31[m,n] is preferably performed with the global shutter mode. Here, the global shutter mode refers to a method of acquiring the captured-image data in all the pixels at the same time. When the captured-image data is acquired by the global shutter mode, simultaneousness of image capturing can be secured; thus, an image with few distortions can be easily obtained even though an object moves fast.

In contrast, captured-image data is read out from the pixel 31[1,1] to the pixel 31[m,n] row by row, for example. Therefore, in the case of acquisition of captured-image data with the global shutter mode, there are some the pixels 31 with long periods from acquisition of captured-image data to readout of the captured-image data. Therefore, in the case of acquisition of captured-image data with the global shutter mode, it is preferable that electric charges transferred from the capacitor 57 to the node FD can be held for a long time.

In order to hold electric charges in the node FD for a long time, the transistor electrically connected to the node FD may be a transistor with a low off-state current. Examples of the transistor with a low off-state current include a transistor including a metal oxide in a channel formation region (hereinafter, an OS transistor). Thus, the transistor 51 and the transistor 54 are preferably OS transistors.

An OS transistor preferably includes a metal oxide in the channel formation region. The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

The off-state current per channel width of 1 μm of an OS transistor can be as low as approximately 1 yA/μm (y: yocto, $10^{-24}$) to 1 zA/μm (z: zepto, $10^{-21}$).

In addition, for the OS transistor, a CAAC (C-Axis-Aligned Crystalline)-OS or a CAC (Cloud-Aligned Composite)-OS is preferably used. The details of the CAAC-OS and the CAC-OS will be described in a subsequent embodiment.

As the transistor 51 to the transistor 54, a transistor other than the OS transistor can be used if having a low off-state current. For example, a transistor including a wide-bandgap semiconductor may be used. In some cases, a wide-bandgap semiconductor refers to a semiconductor with a bandgap of 2.2 eV or more. Examples include silicon carbide, gallium nitride, and diamond.

Note that the transistor 51 and the transistor 54 can be transistors including silicon in their channel formation regions (hereinafter, Si transistors), for example. A Si transistor has a higher off-state current than an OS transistor. However, by making the capacitance of the capacitor 56 large, for example, captured-image data can be acquired by the pixel 31[1,1] to the pixel 31[m,n] with the global shutter mode even when the off-state currents of the transistor 51 and the transistor 54 are high. Note that the captured-image data may be acquired by the pixel 31[1,1] to the pixel 31[m,n] with the rolling shutter mode. In this case, the capacitance of the capacitor 56 does not need to be increased even when the transistor 51 and the transistor 54 are transistors with a high off-state current.

The transistor 52 and the transistor 53 may be Si transistors or OS transistors. For example, the on-state currents of the transistor 52 and the transistor 53 can be increased when transistors including crystalline silicon (typically, low-temperature polysilicon (also referred to LTPS), single crystal silicon, or the like) are used as the transistor 52 and the transistor 53. This enables high-speed readout of captured-image data. In contrast, when all of the transistor 51 to the transistor 54 are OS transistors, all the transistors included in the pixel 31 can be formed in the same layer. When all of the transistors including the transistor 51 to the transistor 54 included in the semiconductor device 10 are OS transistors, all of the transistors included in the semiconductor device 10 can be formed in the same layer. Therefore, the fabrication process of the semiconductor device 10 can be simplified. Note that transistors including amorphous silicon in their channel formation regions may be used as the transistor 51 to the transistor 54. Note that for the transistor 51 to the transistor 54, Si transistors (typically, LTPS transistors) and OS transistors may be used in combination. Note that a structure in which an LTPS transistor and an OS transistor are used in combination is referred to as LTPO in some cases. For example, the display device with high display quality can be obtained by using an OS transistor as a transistor or the like functioning as a switch for controlling conduction and non-conduction between wirings and an LTPS transistor as a transistor or the like for controlling a current.

Structure Example of Shift Register Circuit

Figure 3:
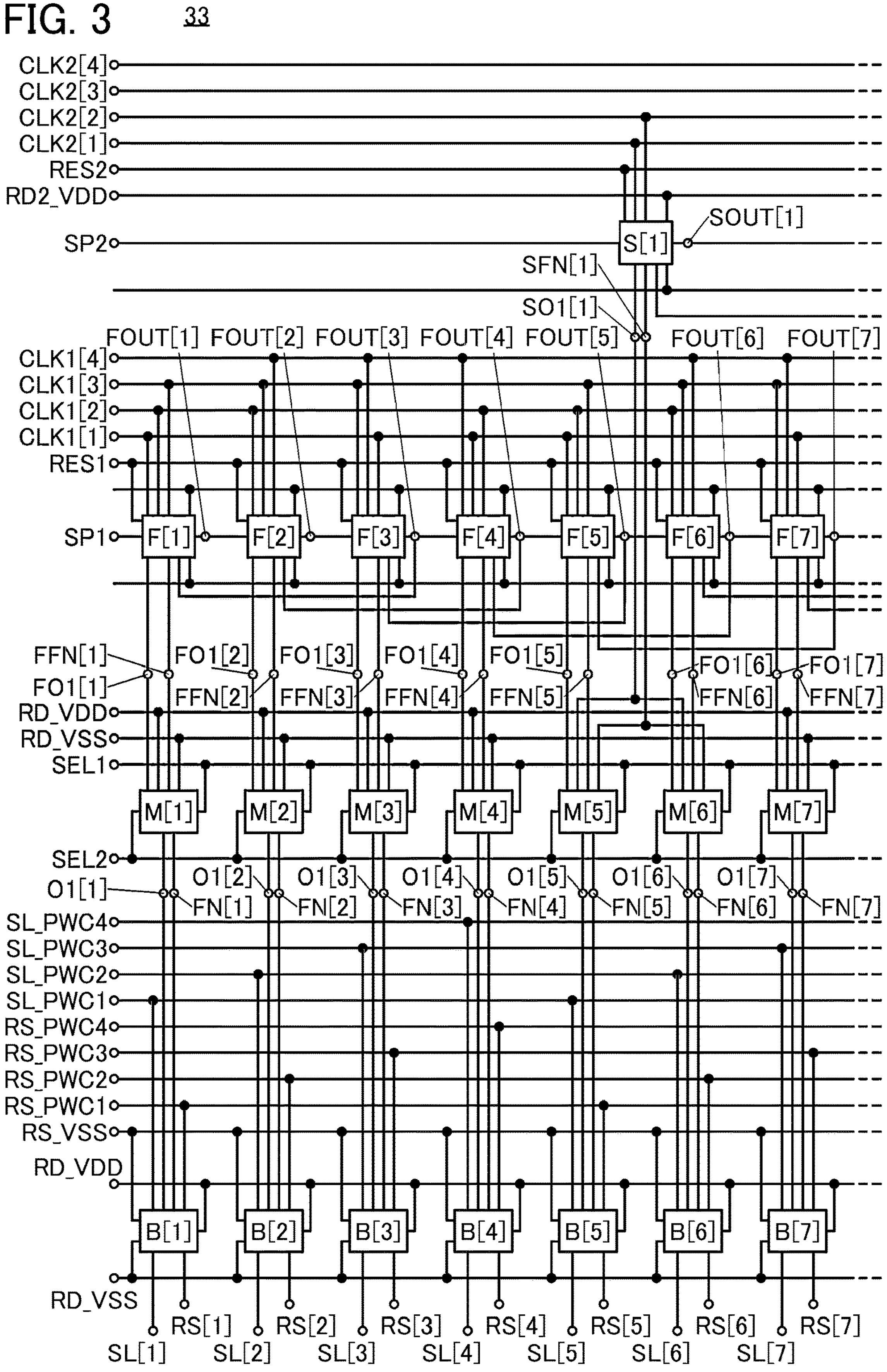
FIG. 3 is a block diagram illustrating a configuration example of a row driver circuit.

FIG. 3 is a diagram illustrating a structure example of the row driver circuit 33. Specifically, FIG. 3 is a diagram illustrating a structure example of a shift register circuit included in the row driver circuit 33. The shift register circuit includes a register circuit F, a register circuit S, a selection circuit M, and a signal supply circuit B. Here, m register circuits F, m selection circuits M, and m signal supply circuits B can be provided in the shift register circuit. That is, the number of each of the selection circuits M, the register circuits F, and the signal supply circuits B can be equal to the number of rows of the pixels 31 provided in m rows and n columns in the pixel portion 30 described in FIG. 2A. In addition, t register circuits S (t is an integer of greater than or equal to 1) can be provided. Here, the relation between m and t can be shown by m=t×50. That is, the register circuits S can be provided in every 50 rows of the pixels 31 included in the pixel portion 30.

An input terminal to which a signal is input and an output terminal from which a signal is output are electrically connected to each of the register circuit F, the register circuit S, the selection circuit M, and the signal supply circuit B.

Note that in this specification and the like, an input terminal electrically connected to the register circuit F is referred to as an input terminal of the register circuit F or an input terminal included in the register circuit F in some cases. An output terminal electrically connected to the register circuit F is referred to an output terminal of the register circuit F or an output terminal included in the register circuit F in some cases. The same applies to other circuits and the like.

A terminal SP1 is electrically connected to an input terminal of a register circuit F[1]. A signal output from the register circuit F[1] is input to a register circuit F[2] through a terminal FOUT[1]. Note that the terminal SP1 is referred to as a terminal FOUT[0] in some cases.

Two output terminals are included between the register circuit F[1] and a selection circuit M[1]. One of the output terminals is electrically connected to an input terminal of the selection circuit M[1] through a terminal FO1[1], and the other of the output terminals is electrically connected to other input terminal of the selection circuit M[1] through a terminal FFN[1].

Similarly, two output terminals are included between the register circuit F[2] and a selection circuit M[2]; one of the output terminals is electrically connected to an input terminal of the selection circuit M[2] through a terminal FO1[2], and the other of the output terminals is electrically connected to another input terminal of the selection circuit M[2] through a terminal FFN[2]. Two output terminals are included between a register circuit F[3] and a selection circuit M[3]; one of the output terminals is electrically connected to an input terminal of the selection circuit M[3] through a terminal FO1[3], and the other of the output terminals is electrically connected to another input terminal of the selection circuit M[3] through a terminal FFN[3]. Two output terminals are included between a register circuit F[4] and a selection circuit M[4]; one of the output terminals is electrically connected to an input terminal of the selection circuit M[4] through a terminal FO1[4], and the other of the output terminals is electrically connected to another input terminal of the selection circuit M[4] through a terminal FFN[4].

That is, two output terminals are provided between each of the register circuit F[1] to a register circuit F[m] and the respective one of the selection circuit M[1] to a selection circuit M[m]; one of the output terminals is electrically connected to an input terminal of each of the selection circuit M[1] to the selection circuit M[m] through a terminal FO1, and the other of the output terminals is electrically connected to another input terminal of each of the selection circuit M[1] to the selection circuit M[m] through a terminal FFN (the register circuit F[m] and the selection circuit M[m] are not illustrated in FIG. 3).

As described above, a signal output from the register circuit F[1] is input to the register circuit F[2] through the terminal FOUT[1] which is electrically connected to the register circuit F[1]. Similarly, a signal output from the register circuit F[2] is input to the register circuit F[3] through a terminal FOUT[2] which is electrically connected to the register circuit F[2]. Furthermore, a signal output from the register circuit F[3] is input to the register circuit F[4] through a terminal FOUT[3] which is electrically connected to the register circuit F[3]. A signal output from the register circuit F[4] is input to a register circuit F[5] through a terminal FOUT[4] which is electrically connected to the register circuit F[4].

That is, signals output from the register circuit F[1] to a register circuit F[m−1] are respectively input to the register circuit F[2] to the register circuit F[m] in the subsequent stages through the terminal FOUT[1] to a terminal FOUT [m−1] (not illustrated in FIG. 3) electrically connected to the register circuit F[1] to the register circuit F[m−1].

A signal output from the register circuit F[3] is input to the register circuit F[1] through the terminal FOUT[3]. A signal output from the register circuit F[4] is input to the register circuit F[2] through the terminal FOUT[4]. A signal output from the register circuit F[5] is input to the register circuit F[3] through a terminal FOUT[5].

That is, signals output from the register circuit F[3] to the register circuit F[m] are respectively input to the register circuit F[1] to a register circuit F[m−2] in the stages before the previous stages through the terminal FOUT[3] to a terminal FOUT[m].

In addition, three terminals CLK1 of a terminal CLK1[1] to a terminal CLK1[4] are electrically connected to the input terminals of the register circuit F[1] to the register circuit F[m], for example. For example, as illustrated in FIG. 3, the terminal CLK1[1], a terminal CLK1[2], and a terminal CLK1[3] are electrically connected to the register circuit F[1], the terminal CLK1[2], the terminal CLK1[3], and the terminal CLK1[4] are electrically connected to the register circuit F[2], the terminal CLK1[3], the terminal CLK1[4], and the terminal CLK1[1] are electrically connected to the register circuit F[3], and the terminal CLK1[4], the terminal CLK1[1], and the terminal CLK1[2] are electrically connected to the register circuit F[4]. Note that the number of terminals CLK1 included in the row driver circuit 33 is not limited to four, and the number of terminals CLK1 electrically connected to one register circuit F is not limited to three.

In addition, the register circuit F[1] to the register circuit F[m] are each electrically connected to a terminal RES1.

A terminal SP2 is electrically connected to an input terminal of a register circuit S[1]. A signal output from the register circuit S[1] is input to a register circuit S[2] (not illustrated in FIG. 3) through a terminal SOUT[1]. Note that the terminal SP2 may be referred to as a terminal SOUT[0].

Two output terminals are included between the register circuit S[1] and each of a selection circuit M[5] and a selection circuit M[6]. One of the output terminals is electrically connected to input terminals of the selection circuit M[5] and the selection circuit M[6] through a terminal SO1[1], and the other of the output terminals is electrically connected to other input terminals of the selection circuit M[5] and the selection circuit M[6] through a terminal SFN[1].

Although not illustrated in FIG. 3, a signal output from the register circuit S[2] which is in the stage subsequent to the register circuit S[1] is input to the register circuit S[1] through the terminal SOUT[2] electrically connected to the register circuit S[2]. Similarly, signals output from a register circuit S[3] to a register circuit S[t] are input to the register circuit S[2] to a register circuit S[t−1] in the previous stages through a terminal SOUT[3] to a terminal SOUT[t] which are electrically connected to the register circuit S[3] to the register circuit S[t].

In addition, two terminals CLK2 of a terminal CLK2[1] to a terminal CLK2[4] are electrically connected to the input terminals of the register circuit S[1] to the register circuit S[t], for example. As illustrated in FIG. 3, the terminal CLK2[1] and a terminal CLK2[2] are electrically connected to the register circuit S[1], for example. Although not illustrated in FIG. 3, the terminal CLK2[2] and a terminal CLK2[3] are electrically connected to the register circuit S[2], the terminal CLK2[3] and the terminal CLK2[4] are electrically connected to the register circuit S[3], and the terminal CLK2[4] and the terminal CLK2[1] are electrically connected to the register circuit S[t]. Note that the number of terminals CLK2 included in the row driver circuit 33 is not limited to four, and the number of terminals CLK2 electrically connected to one register circuit S is not limited to two.

In addition, the register circuit S[1] to the register circuit S[t] are each electrically connected to a terminal RES2. The register circuit S[1] to the register circuit S[t] are each electrically connected to a terminal RD2_VDD. Here, the terminal RD2_VDD is a terminal supplying a potential from a high potential power source.

As described above, two output terminals are included between the register circuit S[1] and each of the selection circuit M[5] and the selection circuit M[6]; one of the output terminals is electrically connected to input terminals of the selection circuit M[5] and the selection circuit M[6] through the terminal SO1[1], and the other of the output terminals is electrically connected to other input terminals of the selection circuit M[5] and the selection circuit M[6] through the terminal SFN[1]. Although not illustrated in FIG. 3, two output terminals are included between the register circuit S[2] and each of a selection circuit M[10] and a selection circuit M[11]; one of the output terminals is electrically connected to input terminals of the selection circuit M[10] and the selection circuit M[11] through a terminal SO1[2], and the other of the output terminals is electrically connected to other input terminals of the selection circuit M[10] and the selection circuit M[11] through a terminal SFN[2]. Two output terminals are included between the register circuit S[3] and each of a selection circuit M[15] and a selection circuit M[16]; one of the output terminals is electrically connected to input terminals of the selection circuit M[15] and the selection circuit M[16] through a terminal SO1[3], and the other of the output terminals is electrically connected to other input terminals of the selection circuit M[15] and the selection circuit M[16] through a terminal SFN[3]. That is, in the case of the register circuit S[t], two output terminals are included between the register circuit S[t] and each of a selection circuit M[5*t*] and a selection circuit M[5*t*+1]; one of the outputs is electrically connected to input terminals of the selection circuit M[5*t*] and the selection circuit M[5*t*+1] through a terminal SO1[t], and the other of the outputs is electrically connected to other input terminals of the selection circuit M[5*t*] and the selection circuit M[5*t*+1] through a terminal SFN[t]. As above, all register circuits S are electrically connected to the selection circuits M in accordance with the above-described rule.

In FIG. 3, the selection circuits M except the selection circuit M[5] and the selection circuit M[6], that is, the selection circuits M not electrically connected to the register circuit S[1], are electrically connected to a terminal RD_VDD. Here, the terminal RD_VDD is a terminal supplying a potential from a high potential power source. In addition, the selection circuits M except the selection circuit M[5] and the selection circuit M[6] are also electrically connected to a terminal RD_VSS. Here, the terminal RD_VSS is a terminal supplying a potential from a low potential power source.

Although only the selection circuit M[1] to a selection circuit M[7] are illustrated in FIG. 3, the selection circuits M not electrically connected to the register circuit S of all the selection circuits M (the selection circuit M[1] to the selection circuit M[m]) included in the row driver circuit 33 are electrically connected to the terminal RD_VDD as described above. In addition, the selection circuits M are also electrically connected to the terminal RD_VSS.

In addition, two output terminals are included between the selection circuit M[1] and a signal supply circuit B[1]. One of the output terminals is electrically connected to one of input terminals of the signal supply circuit B[1] through a terminal O1[1], and the other of the output terminals is electrically connected to another input terminal of the signal supply circuit B[1] through a terminal FN[1].

Similarly, two output terminals are included between the selection circuit M[2] and a signal supply circuit B[2]; one of the output terminals is electrically connected to one of input terminals of the signal supply circuit B[2] through a terminal O1[2], and the other of the output terminals is electrically connected to another input terminal of the signal supply circuit B[2] through a terminal FN[2]. In addition, two output terminals are included between the selection circuit M[3] and a signal supply circuit B[3]; one of the output terminals is electrically connected to one of input terminals of the signal supply circuit B[3] through a terminal O1[3], and the other of the output terminals is electrically connected to another input terminal of the signal supply circuit B[3] through a terminal FN[3]. Furthermore, two output terminals are included between the selection circuit M[4] and a signal supply circuit B[4]; one of the output terminals is electrically connected to one of input terminals of the signal supply circuit B[4] through a terminal O1[4], and the other of the output terminals is electrically connected to another input terminal of the signal supply circuit B[4] through a terminal FN[4].

That is, two output terminals are included between each of the selection circuit M[1] to the selection circuit M[m] and the respective one of the signal supply circuit B[1] to a signal supply circuit M[m]; one of the output terminals is electrically connected to an input terminal of each of the signal supply circuit B[1] to a signal supply circuit B[m] through a terminal O1, and the other of the output terminals is electrically connected to another input terminal of each of the signal supply circuit B[1] to the signal supply circuit B[m] through a terminal FN (in FIG. 3, the selection circuit M[m] and the signal supply circuit B[m] are not illustrated).

In addition, a terminal SEL1 and a terminal SEL2 are electrically connected to each of the selection circuit M[1] to the selection circuit M[m]. Here, the terminal SEL1 and the terminal SEL2 are circuit selection signal terminals.

For example, in FIG. 3, it is selected whether an output signal supplied from the register circuit F[5] and the register circuit F[6] or an output signal supplied from the register circuit S[1] is input to the selection circuit M[5] and the selection circuit M[6]. At this time, either terminals FO1[5] and FO1[6] or the terminal SO1[1] is selected in accordance with selection signals supplied from the terminal SEL1 and the terminal SEL2, and one of the output signals described above is input to the selection circuit M[5] and the selection circuit M[6]. Then, the input signals supplied to the selection circuit M[5] and the selection circuit M[6] are supplied to a signal supply circuit B[5] and a signal supply circuit B[6] through a terminal O1[5] and a terminal O1[6].

Similarly, although not illustrated in FIG. 3, it is selected whether an output signal supplied from a register circuit F[10] and a register circuit F[11] or an output signal supplied from the register circuit S[2] is input to the selection circuit M[10] and the selection circuit M[11] in accordance with the selection signals supplied from the terminal SEL1 and the terminal SEL2. The signals input to the selection circuit M[10] and the selection circuit M[11] are supplied to a signal supply circuit B[10] and a signal supply circuit B[11] through a terminal O1[10] and a terminal O1[11]. In addition, it is selected whether an output signal supplied from a register circuit F[15] and a register circuit F[16] or an output signal supplied from the register circuit S[3] is input to the selection circuit M[15] and the selection circuit M[16] in accordance with the selection signals supplied from the terminal SEL1 and the terminal SEL2. The signals input to the selection circuit M[15] and the selection circuit M[16] are supplied to a signal supply circuit B[15] and a signal supply circuit B[16] through a terminal O1[15] and a terminal O1[16]. That is, in the case of the selection circuit M[5*t*] and the selection circuit M[5*t*+1], it is selected whether an output signal supplied from a register circuit F[5*t*] and a register circuit F[5*t*+1] or an output signal supplied from the register circuit S[t] is input in accordance with the selection signals supplied from the terminal SEL1 and the terminal SEL2. The signals input to the selection circuit M[5*t*] and the selection circuit M[5*t*+1] are supplied to a signal supply circuit B[5*t*] and a signal supply circuit B[5*t*+1] through a terminal O1[5*t*] and a terminal O1[5*t*+1].

As for the selection circuit M of the selection circuit M[1] to the selection circuit M[m] that is not described above, that is, the selection circuit M not electrically connected to the register circuit S, it is selected whether signals supplied from the terminal FO1[1] to a terminal FO1[m] or a signal (low potential) supplied from the terminal RD_VSS is input. At this time, one of the two kinds of signals described above is selected in accordance with the selection signal supplied from the terminal SEL1 and the terminal SEL2, and the selected signal is output to the terminal O1[1] to a terminal O1[m]. In addition, as for the selection circuit M of the selection circuit M[1] to the selection circuit M[m] that is not described above, that is, the selection circuit M not electrically connected to the register circuit S, it is selected whether signals supplied from the terminal FFN[1] to a terminal FFN[m] or a signal (low potential) supplied from the terminal RD_VSS is input. At this time, one of the two kinds of signals described above is selected in accordance with the selection signal supplied from the terminal SEL1 and the terminal SEL2, and the selected signal is output to the terminal FN[1] to a terminal FN[m].

In FIG. 3, the signal supply circuits B are electrically connected to the terminal RD_VDD. Here, the terminal RD_VDD is a terminal supplying a potential from a high potential power source. In addition, the signal supply circuits B are also electrically connected to the terminal RD_VSS. Here, the terminal RD_VSS is a terminal supplying a potential from a low potential power source. Furthermore, the signal supply circuits B are also electrically connected to a terminal RS_VSS.

In addition, one terminal SL_PWC of a terminal SL_PWC1 to a terminal SL_PWC4 is electrically connected to an input terminal of the signal supply circuit B. For example, as illustrated in FIG. 3, the terminal SL_PWC1 is electrically connected to the signal supply circuit B[1], a terminal SL_PWC2 is electrically connected to the signal supply circuit B[2], a terminal SL_PWC3 is electrically connected to the signal supply circuit B[3], and the terminal SL_PWC4 is electrically connected to the signal supply circuit B[4]. Note that the number of the terminals SL_PWC included in the row driver circuit 33 is not limited to four.

Moreover, one terminal RS_PWC of a terminal RS_PWC1 to a terminal RS_PWC4 is electrically connected to an input terminal of the signal supply circuit B. For example, as illustrated in FIG. 3, the terminal RS_PWC1 is electrically connected to the signal supply circuit B[1], a terminal RS_PWC2 is electrically connected to the signal supply circuit B[2], a terminal RS_PWC3 is electrically connected to the signal supply circuit B[3], and the terminal RS_PWC4 is electrically connected to the signal supply circuit B[4]. Note that the number of the terminals RS_PWC included in the row driver circuit 33 is not limited to four.

The terminal SL[1] to the terminal SL[m] and the terminal RS[1] to the terminal RS[m] are electrically connected to the output terminals of the signal supply circuit B[1] to the signal supply circuit B[m], respectively. As described in FIG. 2, a signal output to the terminal SL can be a selection signal and a signal output to the terminals RS can be a reset signal. Thus, the terminal SL can be referred to as a selection signal output terminal, and the terminal RS can be referred to as a reset signal output terminal.

A start pulse signal is input to the terminal SP1 and the terminal SP2. Thus, the terminal SP1 and the terminal SP2 are start pulse signal input terminals. The start pulse signal is input to the terminal SP1 or the terminal SP2, whereby driving of the shift register circuit illustrated in FIG. 3 can be started.

A clock signal is input to each of the terminal CLK1[1] to the terminal CLK1[4]. Thus, the terminal CLK1[1] to the terminal CLK1[4] are clock signal input terminals. For example, clock signals input to the terminal CLK1[1] to the terminal CLK1[4] can be signals with different phases, and the register circuit F[1] to the register circuit F[m] can be driven in response to the clock signals.

Specifically, when the start pulse signal is input to the terminal SP1, any of the register circuit F[1] to the register circuit F[m] outputs a signal to the terminal FO1 and the terminal FFN. The signal output to a terminal FOUT can be input to the register circuit F in the subsequent stage, and thus the register circuit F in the subsequent stage can output a signal. Thus, the signal output to the terminal FOUT from the register circuit F and the signal input to the register circuit F through the terminal FOUT can each be referred to as a scan signal.

In addition, when the start pulse signal is input to the terminal SP2, any of the register circuit S[1] to the register circuit S[t] outputs a signal to a terminal SO1 and a terminal SFN. The signal output to a terminal SOUT can be input to the register circuit S in the subsequent stage, and thus the register circuit S in the subsequent stage can output a signal. Thus, the signal output to the terminal SOUT from the register circuit S and the signal input to the register circuit S through the terminal SOUT can each be referred to as a scan signal.

As described above, the signals output to the terminal FO1 and the terminal FFN from the register circuitF are input to the selection circuit M. In addition, signals output to the terminal SO1 and the terminal SFN from the register circuit S are input to the selection circuit M. The selection circuit M outputs one of the input signals of the terminal FO1 and the terminal SO1 to the signal supply circuit B through the terminal O1 in accordance with an input from the terminal SEL1 and the terminal SEL2. In addition, the selection circuit M outputs one of the input signals of the terminal FFN and the terminal SFN to the signal supply circuit B through the terminal FN, in accordance with an input from the terminal SEL1 and the terminal SEL2. The signal supply circuit B outputs the selection signal to the pixel 31 through the terminal SL, and outputs the reset signal to the pixel 31 through the terminal RS in accordance with an input from the terminal O1 and the terminal FN.

Figure 4A:
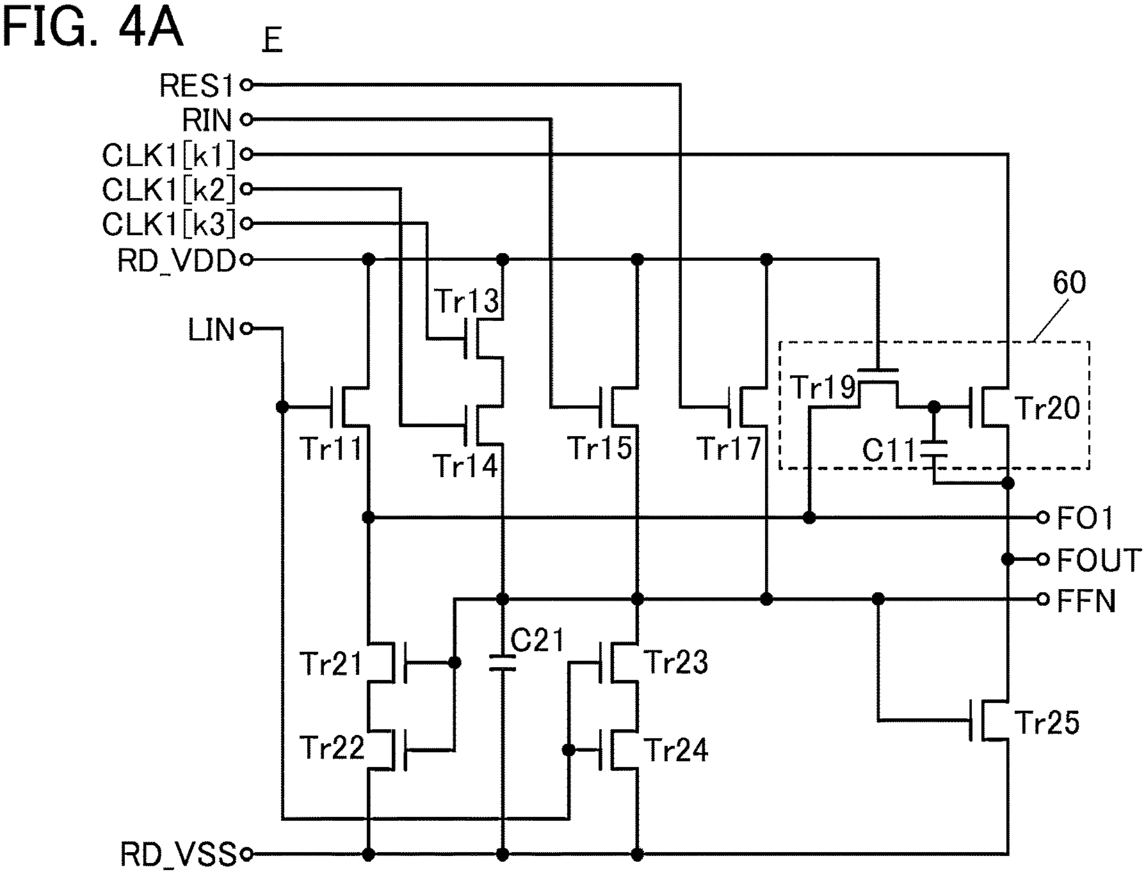
FIG. 4A and FIG. 4B are circuit diagrams each illustrating a structure example of a register circuit.

FIG. 4A is a circuit diagram illustrating a structure example of the register circuit F. The register circuit F includes a transistor Tr11, a transistor Tr13, a transistor Tr14, a transistor Tr15, a transistor Tr17, a transistor Tr19, a transistor Tr20, a transistor Tr21, a transistor Tr22, a transistor Tr23, a transistor Tr24, a transistor Tr25, a capacitor C11, and a capacitor C21. Here, a circuit 60 is configured with the transistor Tr19, the transistor Tr20, and the capacitor C11 in FIG. 4A or the like.

A terminal CLK1[k1], a terminal CLK1[k2], and a terminal CLK1[k3] illustrated in FIG. 4A or the like can be any of the above-described plurality of terminals CLK1. For example, the register circuit F included in the row driver circuit 33 includes the terminal CLK1[1] to the terminal CLK1[4]. In this case, the terminal CLK1[k1] can be any one of the terminal CLK1[1] to the terminal CLK1[4], the terminal CLK1[k2] can be any one of the terminal CLK1[1] to the terminal CLK1[4] excluding the terminal CLK1 which is the same as the terminal CLK1[k1], and the terminal CLK1[k3] can be any one of the terminal CLK1[1] to the terminal CLK1[4] excluding the terminal CLK1 which is the same as the terminal CLK1[k1] and the terminal CLK1[k2].

Specifically, in the register circuit F[1], the terminal CLK1[k1] can be the terminal CLK1[1], the terminal CLK1 [k2] can be the terminal CLK1[2], and the terminal CLK1 [k3] can be the terminal CLK1[3]. Furthermore, in the register circuit F[2], the terminal CLK1[k1] can be the terminal CLK1[2], the terminal CLK1[k2] can be the terminal CLK1[3], and the terminal CLK1[k3] can be the terminal CLK1[4]. Moreover, in the register circuit F[3], the terminal CLK1[k1] can be the terminal CLK1[3], the terminal CLK1[k2] can be the terminal CLK1[4], and the terminal CLK1[k3] can be the terminal CLK1[1].

In the register circuit F having the structure illustrated in FIG. 4A, the terminal CLK1[k1] is electrically connected to one of a source and a drain of the transistor Tr20. The terminal CLK1[k2] is electrically connected to a gate of the transistor Tr14. The terminal CLK1[k3] is electrically connected to a gate of the transistor Tr13. A terminal RIN is electrically connected to a gate of the transistor Tr15. Here, the terminal RIN refers to the terminal FOUT in all of the terminals FOUT electrically connected to the register circuit F described in FIG. 3, which is input to the register circuit F in the stage before the previous stage. That is, of the terminal FOUT[1] to the terminal FOUT[m], the terminal FOUT[3] to the terminal FOUT[m] correspond to the terminals RIN. For example, the terminal FOUT[3] corresponds to a terminal RIN[1]. The terminal FOUT[4] corresponds to a terminal RIN[2]. The terminal FOUT[5]

corresponds to a terminal RIN[3]. The terminal RES1 is electrically connected to a gate of the transistor Tr17. The terminal RD_VDD is electrically connected to one of a source and a drain of the transistor Tr11, one of a source and a drain of the transistor Tr13, one of a source and a drain of the transistor Tr15, one of a source and a drain of the transistor Tr17, and a gate of the transistor Tr19. A terminal LIN is electrically connected to a gate of the transistor Tr11, a gate of the transistor Tr23, and a gate of the transistor Tr24. Here, the terminal LIN refers to the terminal FOUT provided three-stage after the above-described terminal RIN. For example, the FOUT[3] corresponds to a terminal LIN[4]. The terminal FOUT[4] corresponds to a terminal LIN[5]. The terminal FOUT[5] corresponds to a terminal LIN[6]. The terminal RD_VSS is electrically connected to one of a source and a drain of the transistor Tr22, one electrode of the capacitor C21, one of a source and a drain of the transistor Tr24, and one of a source and a drain of the transistor Tr25. The terminal FO1 is electrically connected to the other of the source and the drain of the transistor Tr11, one of a source and a drain of the transistor Tr21, and one of a source and a drain of the transistor Tr19. The terminal FFN is electrically connected to a gate of the transistor Tr21, a gate of the transistor Tr22, one of a source and a drain of the transistor Tr14, the other electrode of the capacitor C21, the other of the source and the drain of the transistor Tr15, one of a source and a drain of the transistor Tr23, the other of the source and the drain of the transistor Tr17, and a gate of the transistor Tr25. The terminal FOUT is electrically connected to the other of the source and the drain of the transistor Tr20, the other of the source and the drain of the transistor Tr25, and one electrode of the capacitor C11.

Note that in the case where the gate capacitance of the transistor Tr21, the gate capacitance of the transistor Tr25, or the like is sufficiently high, the register circuit F does not necessarily include the capacitor C21.

The other of the source and the drain of the transistor Tr13 is electrically connected to the other of the source and the drain of the transistor Tr14. The other of the source and the drain of the transistor Tr21 is electrically connected to the other of the source and the drain of the transistor Tr22. The other of the source and the drain of the transistor Tr23 is electrically connected to the other of the source and the drain of the transistor Tr24.

The other of the source and the drain of the transistor Tr19, a gate of the transistor Tr20, and the other electrode of the capacitor C11 are electrically connected to each other. By providing the transistor Tr19 in the register circuit F, the circuit 60 can be a bootstrap circuit. Note that the register circuit F does not necessarily include the transistor Tr19. In this case, the capacitor C11 can also be omitted.

In the following description, the transistor Tr11, the transistor Tr13, the transistor Tr14, the transistor Tr15, the transistor Tr17, the transistor Tr19, the transistor Tr20, the transistor Tr21, the transistor Tr22, the transistor Tr23, the transistor Tr24, and the transistor Tr25 are n-channel transistors; however, the description below can also be referred to for the case where a p-channel transistor is included by reversing the magnitude relationship of potentials as appropriate, for example.

A high potential can be supplied to one of the source and the drain of the transistor Tr11, one of the source and the drain of the transistor Tr13, one of the source and the drain of the transistor Tr15, one of the source and the drain of the transistor Tr17, and the gate of the transistor Tr19. In addition, a low potential can be supplied to one of the source and the drain of the transistor Tr22, one of the source and the drain of the transistor Tr24, one of the source and the drain of the transistor Tr25, and one electrode of the capacitor C21.

When a high-potential signal is input to the terminal LIN, the transistor Tr11, the transistor Tr23, and the transistor Tr24 are turned on. When the transistor Tr11 is turned on and the transistor Tr21 and the transistor Tr22 are turned off, a high-potential signal is output from the terminal FO1 and the potential of the gate of the transistor Tr20 becomes a high potential. Furthermore, when the potential of the gate of the transistor Tr20 becomes a high potential, the transistor Tr20 is turned on. Thus, a signal input to the terminal CLK1[k1] can be output to the terminal FOUT.

When a high-potential signal is input to the terminal CLK1[k2] and the terminal CLK1[k3], the transistor Tr14 and the transistor Tr13 are turned on. Thus, the potentials of the gate of the transistor Tr21, the gate of the transistor Tr22, and the gate of the transistor Tr25 become high potentials. When the potentials of the gate of the transistor Tr21 and the gate of the transistor Tr22 become high potentials, the transistor Tr21 and the transistor Tr22 are turned on. Thus, when the transistor Tr1 is in an off state, the potential of the terminal FO1 becomes a low potential. Furthermore, when the potential of the gate of the transistor Tr25 becomes a high potential, the transistor Tr25 is turned on. When the transistor Tr21 and the transistor Tr25 are turned on, the potential of the terminal FOUT becomes a low potential. Similarly, in the case where a high-potential signal is input to the terminal RIN or the terminal RES1, the potential of the terminal FO1 and the potential of the terminal FOUT become low potentials.

Here, the transistor Tr19 is preferably a transistor having a low off-state current, such as an OS transistor. Thus, after the potential of the terminal LIN becomes a low potential and the transistor Tr11 is turned off, the potential of the gate of the transistor Tr20 can be held for a long time. Thus, until the potential of the terminal CLK1[k2], the terminal RIN, or the terminal RES1 becomes a high potential, the signal input to the terminal CLK1[k1] can be kept being output to the terminal FOUT.

In addition, the transistor Tr11, the transistor Tr13, the transistor Tr14, the transistor Tr15, the transistor Tr17, the transistor Tr20, the transistor Tr21, the transistor Tr22, the transistor Tr23, the transistor Tr24, and the transistor Tr25 may also be OS transistors. When all of the transistors included in the register circuit F are OS transistors, all the transistors included in the register circuit F can be fabricated in the same process.

In addition, Si transistors can be used for the transistor Tr11, the transistor Tr13, the transistor Tr14, the transistor Tr15, the transistor Tr17, the transistor Tr19, the transistor Tr20, the transistor Tr21, the transistor Tr22, the transistor Tr23, the transistor Tr24, and the transistor Tr25. In particular, when transistors including crystalline silicon in their channel formation regions are used as these transistors, on-state current can be increased. Thus, the register circuit F can be driven at high speed. In addition, transistors including amorphous silicon in their channel formation regions may be used as the transistor Tr11, the transistor Tr13, the transistor Tr14, the transistor Tr15, the transistor Tr17, the transistor Tr19, the transistor Tr20, the transistor Tr21, the transistor Tr22, the transistor Tr23, the transistor Tr24, and the transistor Tr25.

Figure 4B:
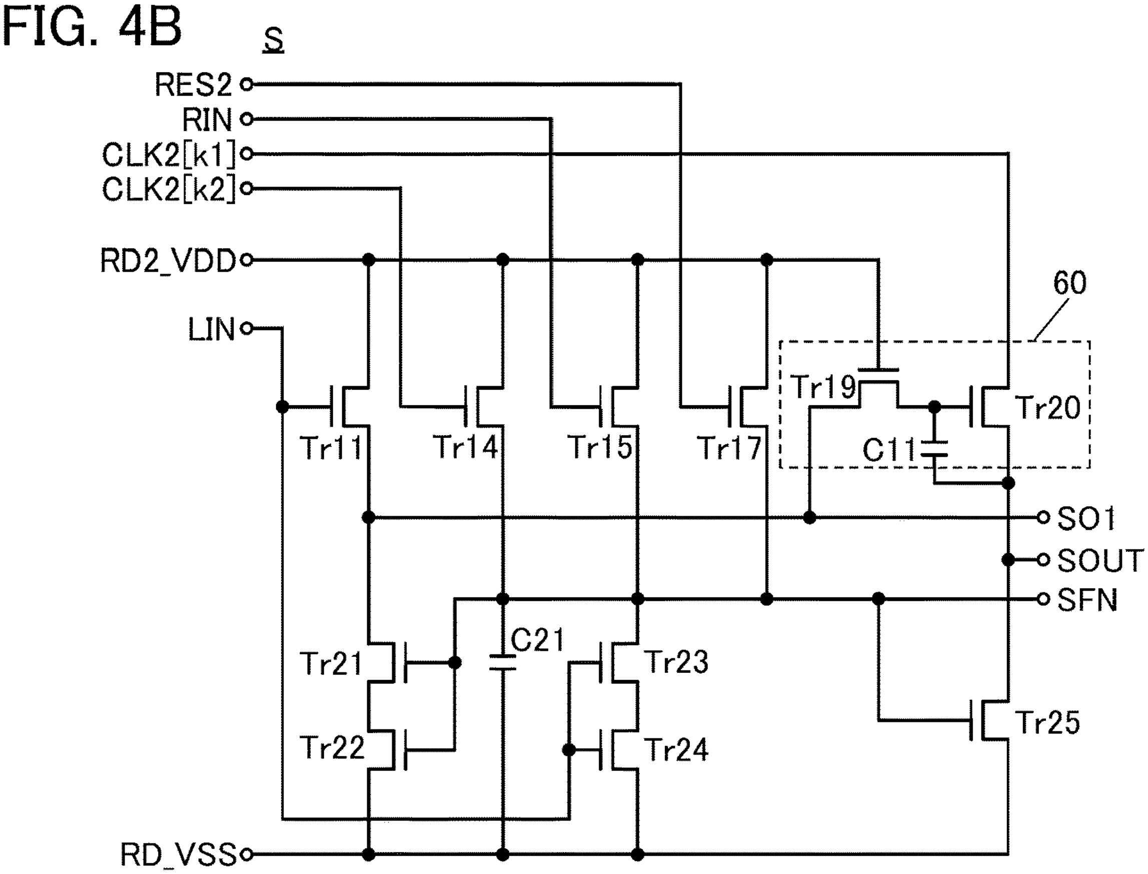

FIG. 4B is a circuit diagram illustrating a structure example of the register circuit S. The register circuit S is different from the register circuit F in that the transistor Tr3 is not included. In addition, the register circuit S is different from the register circuit F in that the gate of the transistor Tr17 is electrically connected to the terminal RES2. In addition, the register circuit S is different from the register circuit F in that one of the source and the drain of the transistor Tr11, one of the source and the drain of the transistor Tr14, one of the source and the drain of the transistor Tr15, one of the source and the drain of the transistor Tr17, and the gate of the transistor Tr19 are electrically connected to the terminal RD2_VDD. Moreover, the register circuit S is different from the register circuit F in that the other of the source and the drain of the transistor Tr11, one of the source and the drain of the transistor Tr21, and one of the source and the drain of the transistor Tr19 are electrically connected to the terminal SO1. In addition, the register circuit S is different from the register circuit F in that the gate of the transistor Tr21, the gate of the transistor Tr22, the other of the source and the drain of the transistor Tr14, the other electrode of the capacitor C21, the other of the source and the drain of the transistor Tr15, one of the source and the drain of the transistor Tr23, the other of the source and the drain of the transistor Tr17, and the gate of the transistor Tr25 are electrically connected to the terminal SFN. Moreover, the register circuit S is different from the register circuit F in that the other of the source and the drain of the transistor Tr20, the other of the source and the drain of the transistor Tr25, and one electrode of the capacitor C11 are electrically connected to the terminal SOUT.

Figure 5A:
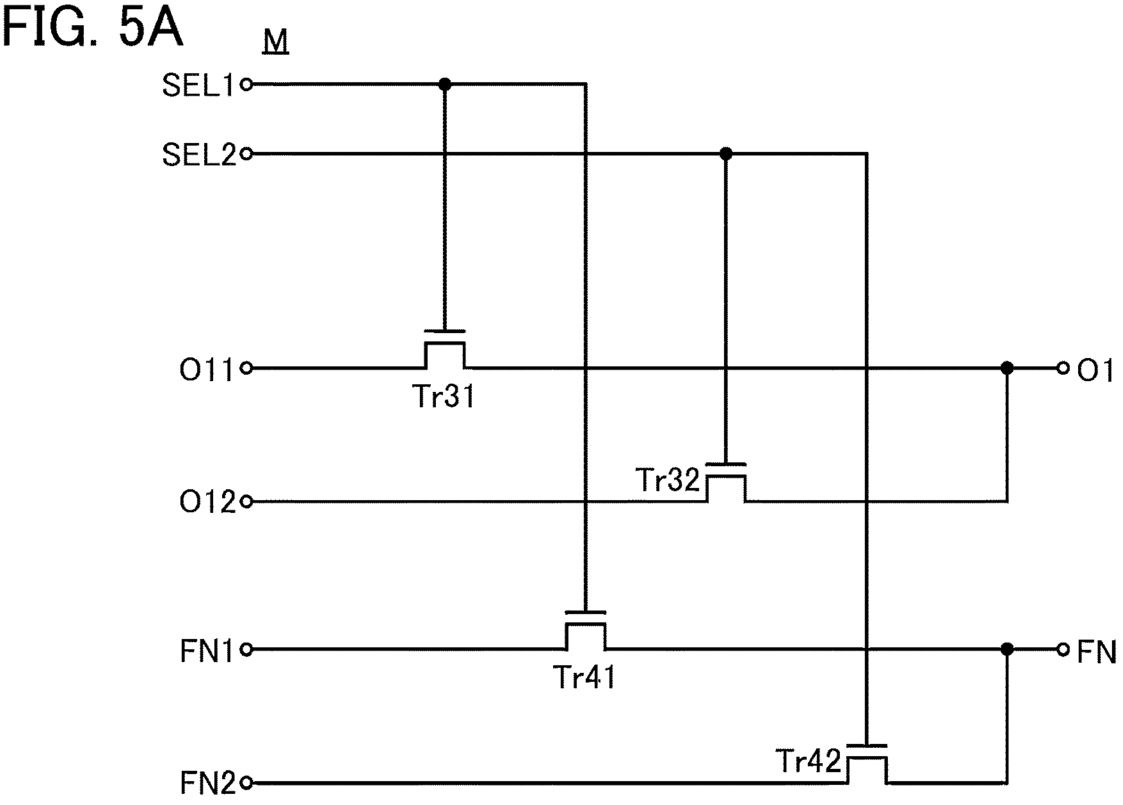
FIG. 5A is a circuit diagram illustrating a structure example of a selection circuit.

FIG. 5A is a circuit diagram illustrating a structure example of the selection circuit M. The selection circuit M includes a transistor Tr31, a transistor Tr32, a transistor Tr41, and a transistor Tr42.

In the selection circuit M with the structure illustrated in FIG. 5A, the terminal SEL1 is electrically connected to a gate of the transistor Tr31 and a gate of the transistor Tr41. The terminal SEL2 is electrically connected to a gate of the transistor Tr32 and a gate of the transistor Tr42. A terminal O11 is electrically connected to one of a source and a drain of the transistor Tr31. A terminal O12 is electrically connected to one of a source and a drain of the transistor Tr32. A terminal FN1 is electrically connected to one of a source and a drain of the transistor Tr41. A terminal FN2 is electrically connected to one of a source and a drain of the transistor Tr42. The terminal O1 is electrically connected to the other of the source and the drain of the transistor Tr31 and the other of the source and the drain of the transistor Tr32. The terminal FN is electrically connected to the other of the source and the drain of the transistor Tr41 and the other of the source and the drain of the transistor Tr42.

Figure 5B:
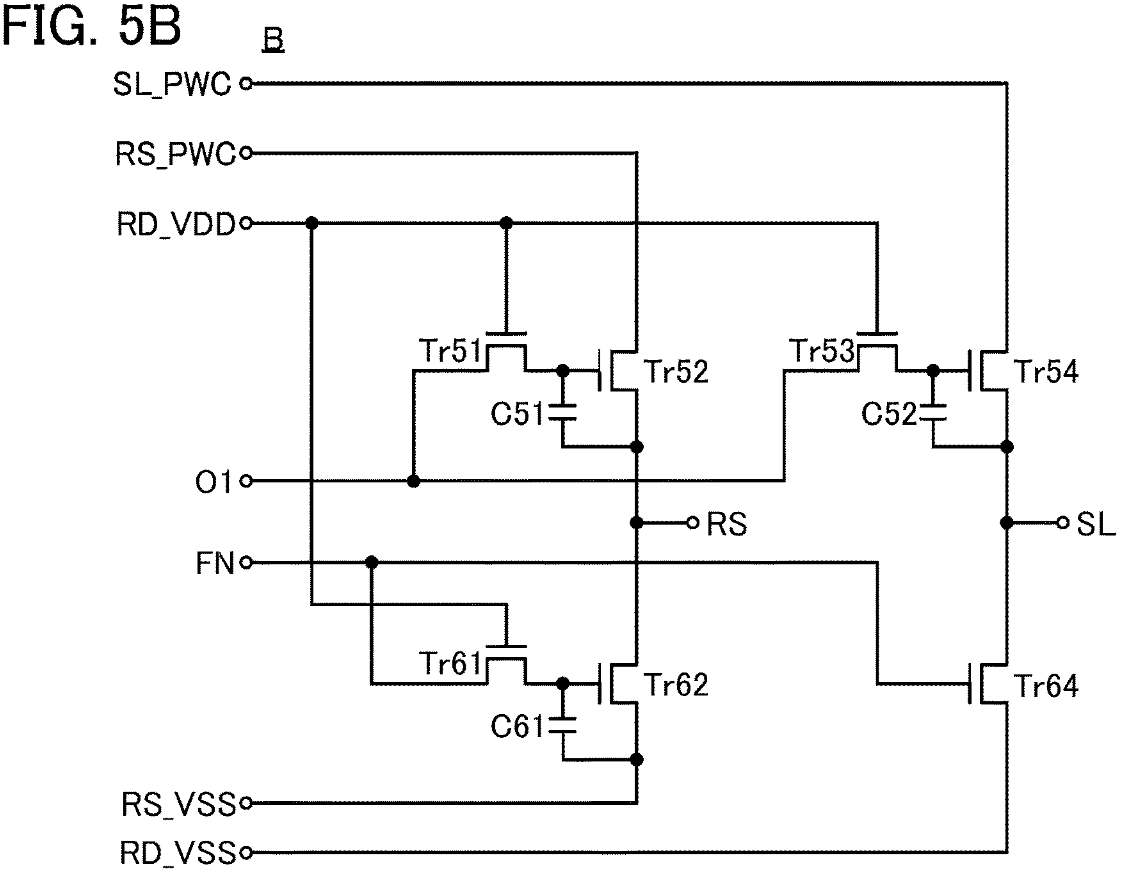
FIG. 5B is a circuit diagram illustrating a structure example of a signal supply circuit.

FIG. 5B is a circuit diagram illustrating a structure example of the signal supply circuit B. The signal supply circuit B includes a transistor Tr51, a transistor Tr52, a transistor Tr53, a transistor Tr54, a transistor Tr61, a transistor Tr62, a transistor Tr64, a capacitor C51, a capacitor C52, and a capacitor C61.

In the signal supply circuit B illustrated in FIG. 5B, the terminal SL_PWC is electrically connected to one of a source and a drain of the transistor Tr54. A terminal RS_PWC is electrically connected to one of a source and a drain of the transistor Tr52. The terminal RD_VDD is electrically connected to a gate of the transistor Tr61, a gate of the transistor Tr51, and a gate of the transistor Tr53. The terminal O1 is electrically connected to one of a source and a drain of the transistor Tr51 and one of a source and a drain of the transistor Tr53. The terminal FN is electrically connected to one of a source and a drain of the transistor Tr61 and a gate of the transistor Tr64. The terminal RS_VSS is electrically connected to one electrode of the capacitor C61 and one of a source and a drain of the transistor Tr62. The terminal RD_VSS is electrically connected to one of a source and a drain of the transistor Tr64. The terminal RS is electrically connected to one electrode of the capacitor C51, the other of the source and the drain of the transistor Tr52, and the other of the source and the drain of the transistor Tr62. The terminal SL is electrically connected to one electrode of the capacitor C52, the other of the source and the drain of the transistor Tr54, and the other of the source and the drain of the transistor Tr64.

The other of the source and the drain of the transistor Tr51, a gate of the transistor Tr52, and the other electrode of the capacitor C51 are electrically connected to each other. The other of the source and the drain of the transistor Tr53, a gate of the transistor Tr54, and the other electrode of the capacitor C52 are electrically connected to each other. The other of the source and the drain of the transistor Tr61, a gate of the transistor Tr62, and the other electrode of the capacitor C61 are electrically connected to each other.

An example of a method for driving the row driver circuit 33 is described below. Specifically, an example of a method for driving the shift register circuit included in the row driver circuit 33 in Period T5, which is the readout period illustrated in FIG. 2B2, is described. The semiconductor device of one embodiment of the present invention can perform authentication such as fingerprint authentication by the driving method described below, for example.

Figure 6:
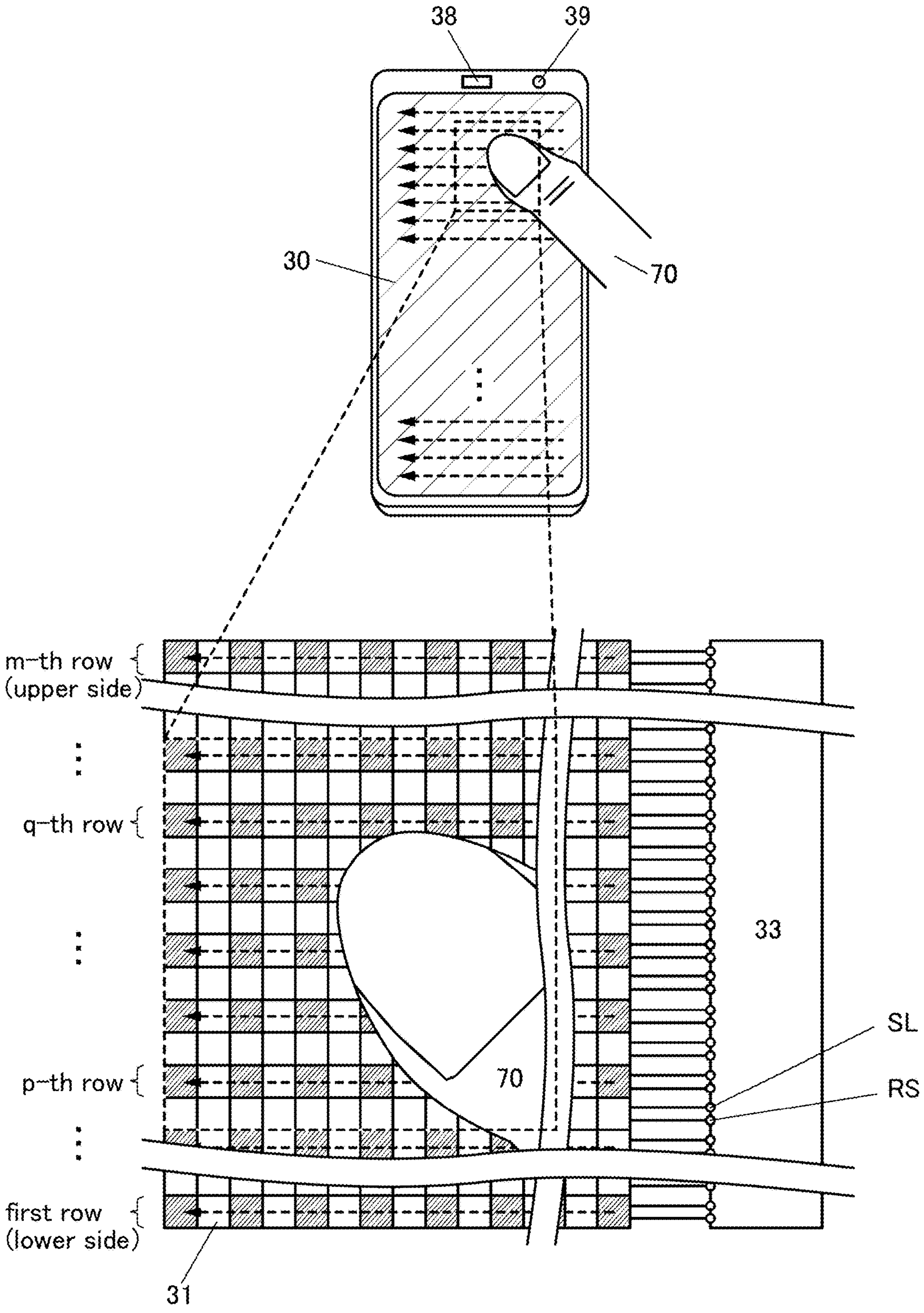
FIG. 6 is a schematic view illustrating an example of a driving method for a row driver circuit.
Figure 7:
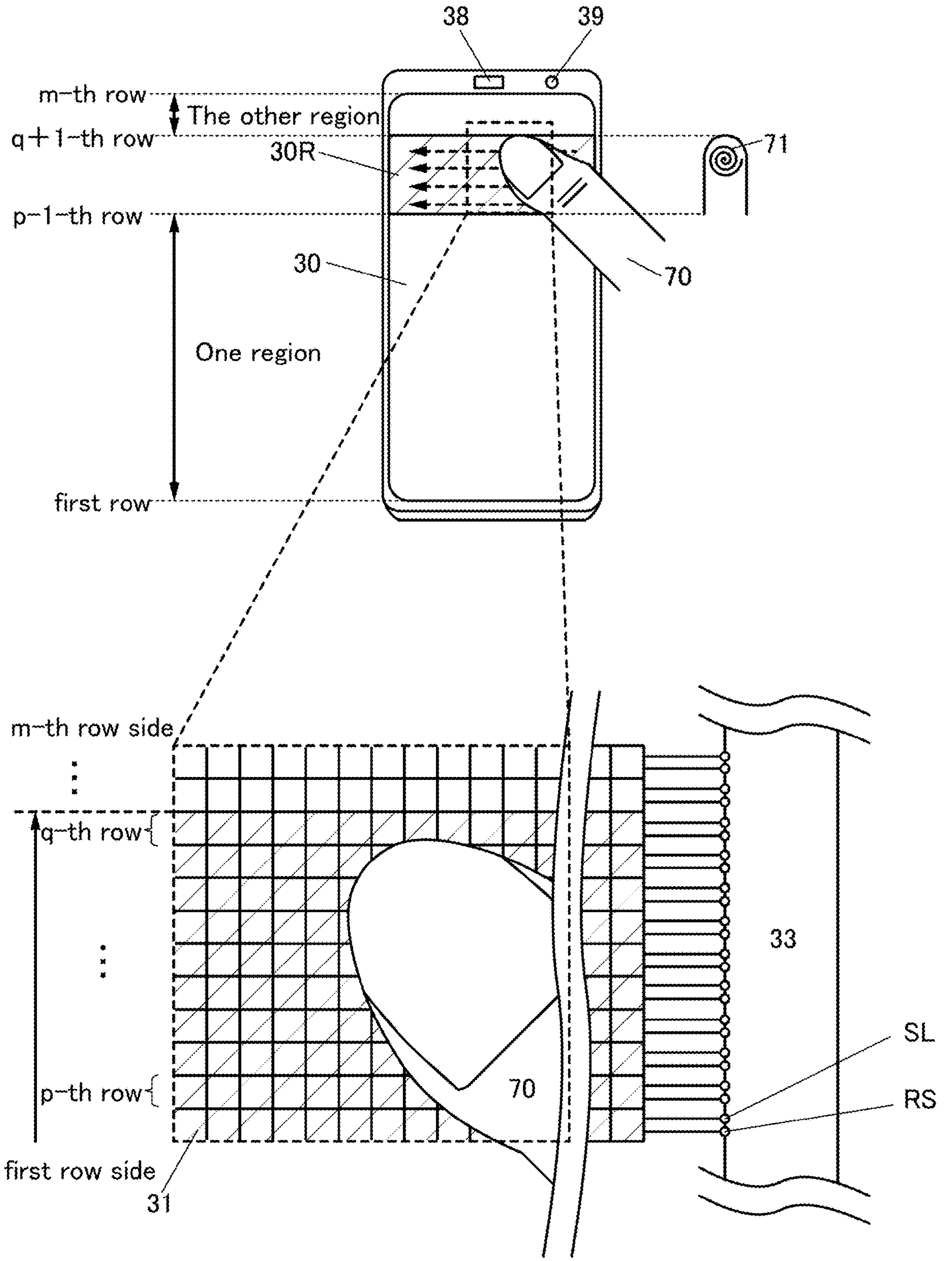
FIG. 7 is a schematic view illustrating an example of a driving method for a row driver circuit.

FIG. 6 and FIG. 7 are schematic views each illustrating an example of a method for driving the row driver circuit 33 in the readout period. In FIG. 6 and FIG. 7, a region including the pixels 31 from which captured-image data is read out in the pixel portion 30 is hatched. The same applies to other drawings in some cases.

In this specification and the like, the driving method illustrated in FIG. 6 is referred to as a first mode in some cases. In addition, the driving method illustrated in FIG. 7 is referred to as a second mode in some cases.

For example, in the case where fingerprint authentication is performed, first, the row driver circuit 33 scans the specific pixel 31 in the pixel portion 30. At this time, the z-th stage (z is an integer greater than or equal to 1 and less than or equal to m) of a shift register circuit included in the row driver circuit 33 operates the pixels 31 in the z-th row. Thus, captured-image data is read out from the above-described specific pixel 31. FIG. 6 shows an example where the captured image data is read out from the pixels 31 in every other rows and in every other columns which are hatched. The readout captured-image data is supplied to the detection circuit 37 illustrated in FIG. 2A, for example. The detection circuit 37 detects the position of a finger 70 over the pixel portion 30 on the basis of the captured-image data.

Here, the pixel portion 30 is structured by the pixels arranged in a matrix of m rows and n columns as described in <Structure example of imaging apparatus>. Accordingly, the detection of the position of the finger 70 over the pixel portion 30 means the detection of the finger 70 that is positioned over the pixels in the p-th to q-th rows (p and q are integers greater than or equal to 1 and less than or equal to m) of the pixel portion 30 as illustrated in FIG. 6.

Next, the control circuit 32 illustrated in FIG. 2A or the like, for example, determines rows of the pixel portion 30 from which the captured-image data is read out for detecting a fingerprint on the basis of the detected position of the finger 70. After determining, the control circuit 32, for example, generates data indicating a row in which the row driver circuit 33 starts scanning when the captured-image data is read out for detection of a fingerprint.

Then, as illustrated in FIG. 7, the row driver circuit 33 scans part of the pixel portion 30 based on the determination results. Thus, captured-image data can be read out only from the pixels 31 in the rows which the finger 70 touches or approaches, for example. Alternatively, captured-image data can be read out only from the pixels 31 in the rows which the finger 70 touches or approaches and the pixels 31 in rows peripheral to the rows. In FIG. 7, a region including the pixels 31 from which captured-image data is read out in the pixel portion 30 is referred to as a pixel portion 30R.

The captured-image data read out by the method illustrated in FIG. 7 is supplied to, for example, the detection circuit 37 illustrated in FIG. 2A. The detection circuit 37 performs authentication of a fingerprint 71 of the finger 70 on the basis of on the captured-image data. Thus, the semiconductor device of one embodiment of the present invention can perform fingerprint authentication.

Here, in the period to which the driving method illustrated in FIG. 6 is applied, only the detection of the position of the finger 70 is needed and the readout of the fingerprint image is not necessarily performed. Thus, as described above, the detection of the position of the finger 70 may be performed on a limited number of pixels in every plurality of rows and every plurality of columns of the pixels 31 included in the pixel portion 30. As a result, the readout period for one row of the pixel portion 30 can be shortened as compared with that in the case where the readout of the fingerprint image is performed. In contrast, since the readout of the fingerprint image needs to be performed in the period to which the driving method illustrated in FIG. 7 is applied, the readout period for one row of the pixel portion 30 is longer than that in the case where the driving method illustrated in FIG. 6 is applied. However, in the semiconductor device of one embodiment of the present invention, as illustrated in FIG. 7, the pixels 31 from which captured-image data is read out for fingerprint authentication can be only the pixels in the vicinity of the position where the finger is detected, i.e., some of the pixels 31 provided in the pixel portion 30. Thus, the fingerprint authentication can be performed in a short time as compared with the case where captured-image data is read out from all the pixels 31 included in the pixel portion 30 for fingerprint authentication.

Although the case where the driving method illustrated in FIG. 7 is applied after the driving method illustrated in FIG. 6 is applied is described above, one embodiment of the present invention is not limited thereto. In one embodiment of the present invention, without using the driving method illustrated in FIG. 6, the region where the fingerprint picture is read out may be limited to a specified region in the pixel portion 30 in advance; fingerprint authentication may be performed only by applying the driving method illustrated in FIG. 7 to the region.

An example of a driving method of the row driver circuit 33 combining the first mode and the second mode described above will be described below with reference to a flow chart and the like.

Figure 8:
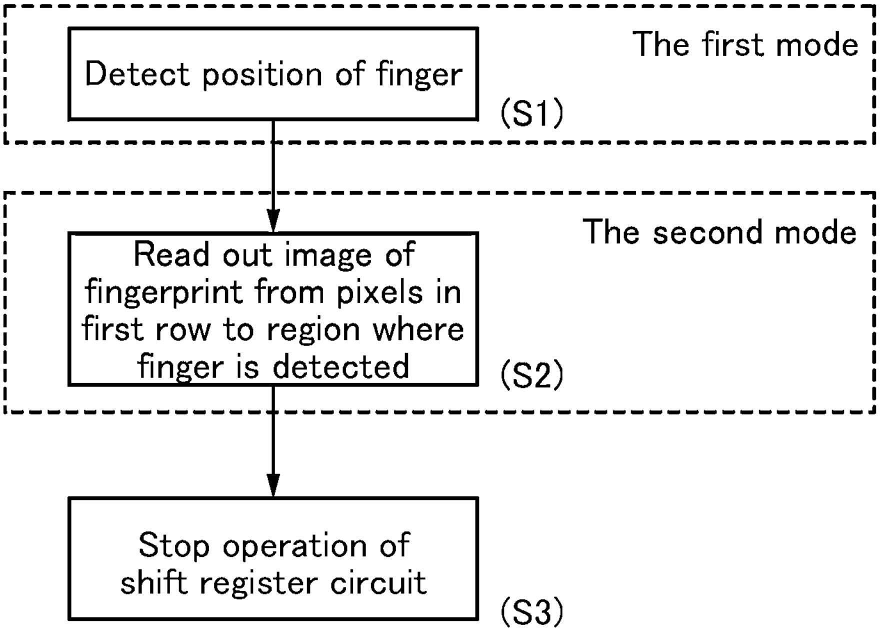
FIG. 8 is a flow chart showing an example of a driving method for a row driver circuit.

FIG. 8 is a flow chart showing an example of a driving method of one embodiment of the present invention of the row driver circuit 33. The semiconductor device of one embodiment of the present invention can perform fingerprint authentication of a user in a short time by the driving method.

First, the position of a finger of a user is detected in Step S1. For example, in FIG. 6, at which position in the pixel portion 30 the finger 70 of the user is placed is detected. That is, Step S1 is the driving method illustrated in FIG. 6 and is the first mode.

Note that as described above, in Step S1, the processing for detecting the position of the user's finger is not necessarily performed on all of the pixels 31 in the pixel portion 30. For example, the process may be performed on limited pixels in every plurality of rows and in every plurality of columns of the pixels 31 included in the pixel portion 30. For example, in the case where the pixel portion includes the pixels of 2560 rows and 1440 columns, the first captured-image data may be read out from the pixels of two rows and thirty-six columns in every fifty rows. Accordingly, the position of the user's finger can be detected in a short time as compared with the case where the process is performed on all of the pixels 31 in the pixel portion 30.

The pixel portion 30 is composed of the pixels arranged in a matrix of m rows and n columns as described in <Structure example of imaging apparatus>. Accordingly, the expression "detecting at which position over the pixel portion 30 the finger 70 is placed" means the expression "detecting that the finger 70 is positioned over the pixels in the p-th to q-th rows (p and q are integers greater than or equal to 1 and less than or equal to m) of the pixel portion 30".

Note that the above-described pixels in the p-th to q-th rows of the pixel portion 30 are preferably included in the pixels in the first to m/2-th rows.

Here, pixels in the first row of the pixel portion 30 refer to pixels in the lowermost row of the pixel portion 30 illustrated in FIG. 6. For example, in the case where FIG. 6 illustrates a schematic view of a smartphone including the pixel portion 30, a speaker 38 or a camera 39 may be provided outside of the pixel portion 30 as illustrated in FIG. 6. In this case, pixels in a row which is farthest from the speaker 38 or the camera 39 are pixels in a first row (lowermost row) and pixels in a row which is nearest to the speaker 38 or the camera 39 are pixels in an m-th row (uppermost row). In addition, the pixels in the first row of the pixel portion 30 can also be referred to as pixels in a row to which the first row of a shift register circuit is connected. Moreover, the pixels in the m-th row of the pixel portion 30 can also be referred to as pixels in a row to which the last row of the shift register circuit from which a selection signal is output is connected. Note that a schematic view illustrated in FIG. 6 is not limited to a smartphone.

Next, in Step S2, the fingerprint image is read out row by row from the above-described first row of the pixel portion 30 to the region where the finger is detected in Step S1 (pixels in the q-th row of the pixel portion 30). As described in FIG. 1, the semiconductor device 10 of one embodiment of the present invention includes a light-emitting apparatus and an imaging apparatus, and light emitted from the light-emitting apparatus is reflected by a finger or the like and the imaging apparatus detects the light. Thus, it can be said that in Step S2, the pixels that detect light reflected by the finger among the light emitted from the light-emitting apparatus capture the fingerprint of the finger and processing for the captured-image data is performed.

Step S2 is the driving method illustrated in FIG. 7 and is the second mode.

In other words, in FIG. 7, the processing for detecting the fingerprint 71 is performed to the pixels from the lowermost row of the pixel portion 30 (first row) to the uppermost row of the pixel portion 30R (q-th row) where the user's finger 70 is detected while the detection row is shifted row by row in the upward direction.

For example, in the case where Step S1 is performed to the limited pixels in every x rows and every y columns (x and y are integers greater than or equal to 1 and less than or equal to q-p) of the pixels 31 included in the pixel portion 30, Step S2 may be performed to the pixels in the first to q+x rows in the pixel portion 30. Step S2 is performed to the pixels in x rows, i.e., the pixels in the uppermost row (q-th row) where the position of the finger is detected and extra rows, so that image of the user's fingerprint can be surely captured.

Here, row-by-row shifting by the shift register circuit from the above-described pixels in the first row of the pixel portion 30 in an upward direction, for example, to the pixels in the q-th row, i.e., row-by-row shifting by the shift register circuit from the pixels in the row (first row) farthest from the speaker 38 or the camera 39 to the pixels in the row (q-th row) nearest to the speaker 38 or the camera 39 of the rows where the finger 70 is detected in the case where the above-described smartphone is used as an example.

When the readout of the fingerprint image from the pixels in all the target rows (first to q-th row in the pixel portion 30) is completed in Step S2, the operation of the shift register circuit is stopped (Step S3).

As above, in the driving method of one embodiment of the present invention, the position of the user's finger is detected in the first mode (Step S1), and the readout of the fingerprint image is performed only to part of the region of the pixel portion 30 in the second mode (Step S2). The fingerprint image is not read out from a region other than the above-described part of the region of the pixel portion 30. That is, in the driving method of one embodiment of the present invention, the captured image is extracted only from the region in the pixel portion 30 where the finger is detected, and the fingerprint authentication is performed.

Figure 9:
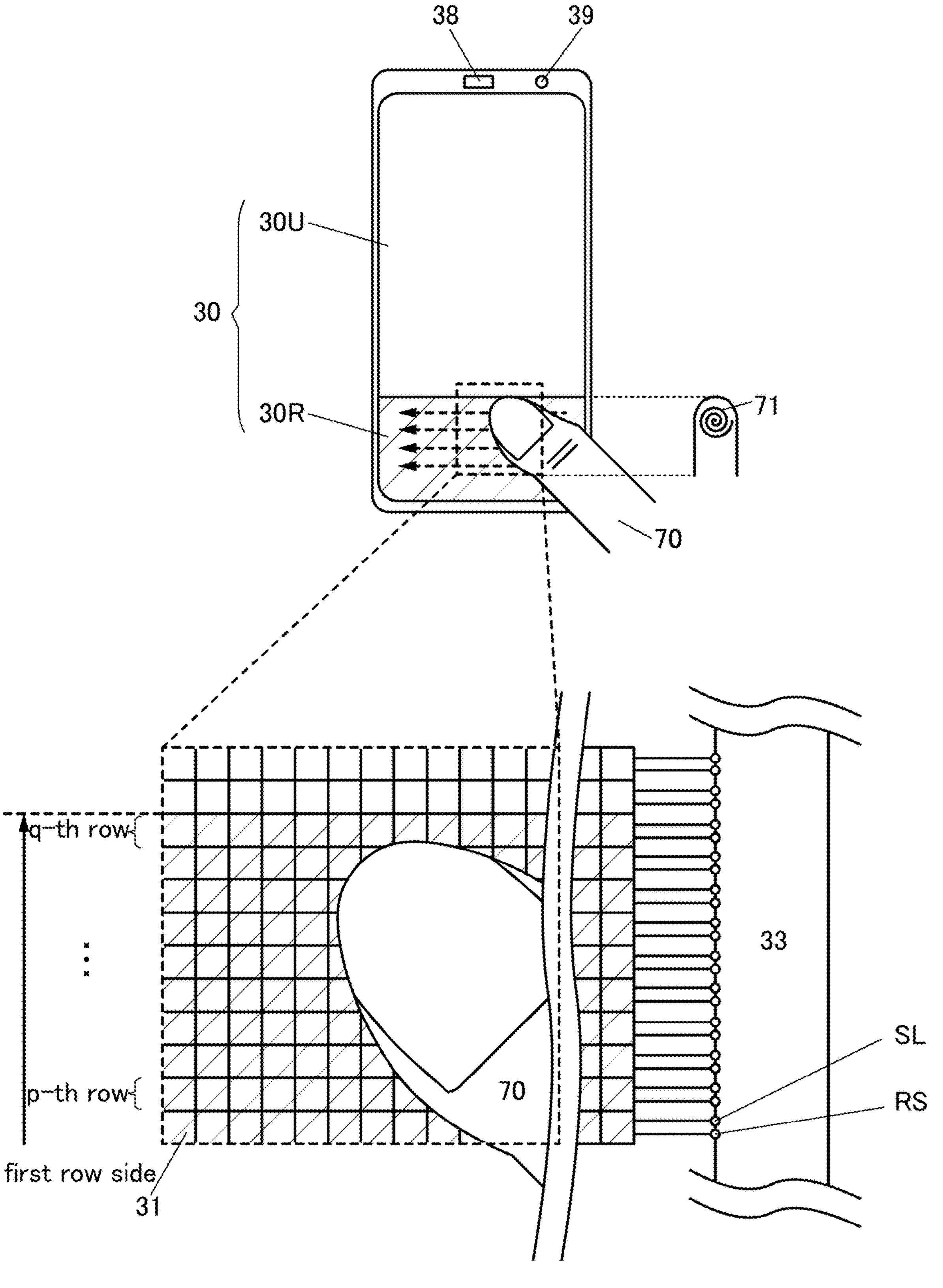
FIG. 9 is a schematic view showing an example of a driving method for a row driver circuit.

FIG. 9 is a schematic view illustrating an example of a driving method of the row driver circuit 33 described with the flow chart in FIG. 8.

In FIG. 9, the pixel portion 30R is positioned in the lower side in the pixel portion 30. The pixel portion 30R is a region including the pixels in the first to q-th rows of the pixel portion 30.

In FIG. 9, a pixel portion 30U is a region in the upper side than the pixel portion 30R in the pixel portion 30. That is, the pixel portion 30U is a region including pixels in the q+1 to m-th rows in the pixel portion 30.

As described above, when the readout of the fingerprint image is completed in the pixel portion 30R (a region including the pixels in the first to the q-th row of the pixel portion 30) in Step S2, the operation of the shift register circuit is stopped in Step S3. Accordingly, any processing relating to the image capturing are not performed in the pixel portion 30U.

That is, in the driving method of one embodiment of the present invention, after the first mode is performed to the pixel portion 30 and then the second mode is performed only to the pixel portion 30R. As above, since the region where the readout of the fingerprint image is performed is limited to part of the pixel portion 30, a frame frequency for the readout of the fingerprint image by the row driver circuit 33 can be increased compared with the case where the readout of the fingerprint image is performed to the entire pixel portion 30. Thus, fingerprint authentication can be performed in short time.

For example, the case where FIG. 9 illustrates a schematic view of a smartphone including the pixel portion 30 is considered. For example, when a user operates a smartphone by one hand, the user holds the vicinity of a lower side of the smartphone, and the finger 70 often touches a lower region of the pixel portion 30 (a region including the pixels in a first to m/2-th rows of the pixel portion 30). Accordingly, the position of the finger 70 is preferably detected in the lower region of the pixel portion 30. In this case, fingerprint authentication is performed only to the lower region where the finger 70 touches, and the driving method of one embodiment of the present invention is preferable. Note that FIG. 9 is not limited to the schematic view of a smartphone.

Figure 10:
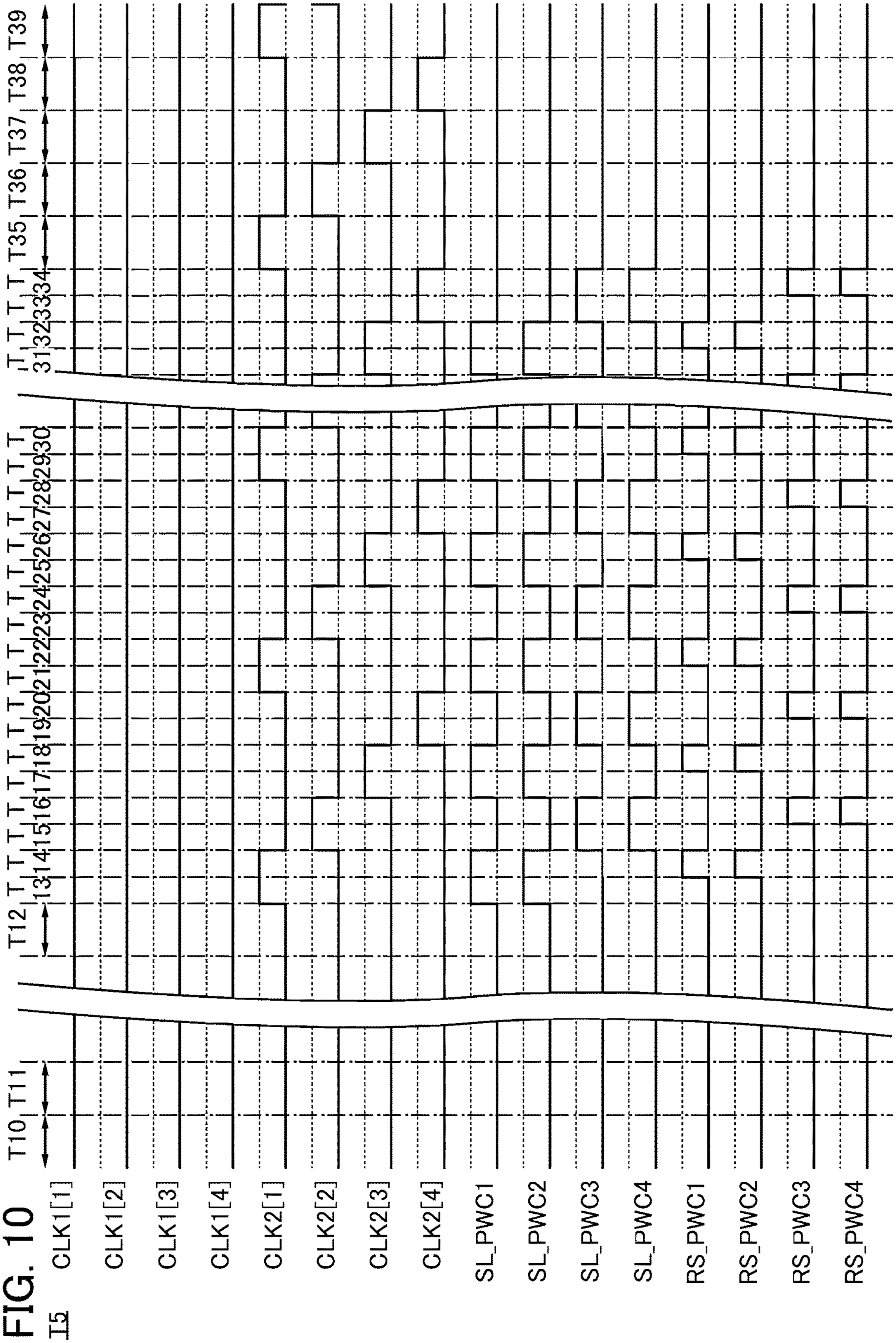
FIG. 10 is a timing chart showing an example of a driving method for a row driver circuit.
Figure 11:
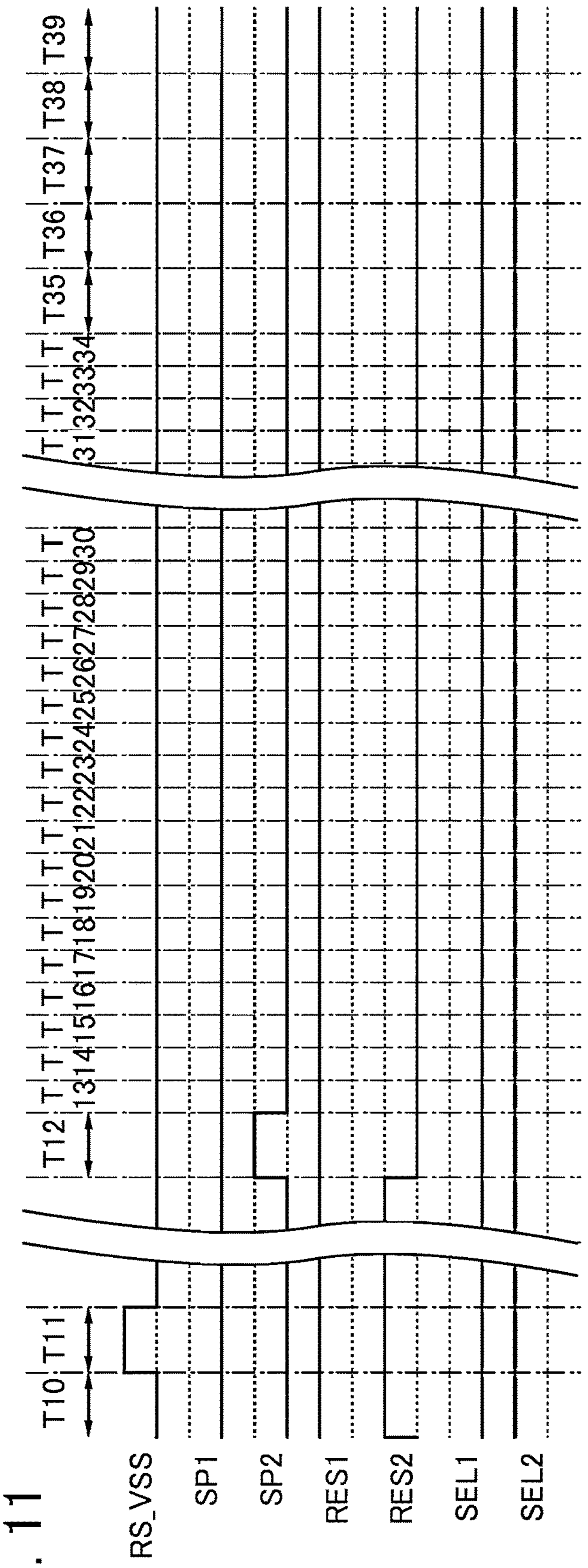
FIG. 11 is a timing chart showing an example of a driving method for a row driver circuit.

Examples of details of the driving methods in FIG. 6, FIG. 7, and the like will be described with reference to FIG. 10 to FIG. 13. FIG. 10 and FIG. 11 are timing charts showing the example of the details of the driving method of FIG. 6 and illustrate an example of a driving method of the row driver circuit 33 with divided periods, Period T10 to Period T39.

In Period T12 to Period T39 (FIG. 11), the potential of the terminal SEL2 is a high potential and the potential of the terminal SEL1 is a low potential. In Period T12 to Period T39 (FIG. 11), the potential of the terminal SP1 is a low potential. In Period T12 to Period T39 (FIG. 10), the potentials of the terminal CLK1[1] to the terminal CLK1[4] are low potentials.

In Period T12 (FIG. 11), by inputting a high-potential signal as a start pulse signal to the terminal SP2, a high-potential signal is output from the register circuit S[1] to the terminal SO1[1]. In addition, a low-potential signal is output from the register circuit S[1] to the terminal SFN[1]. At this time, the potential of the terminal SEL2 which is an input terminal of the selection circuit M[5] and the selection circuit M[6] is a high potential and the potential of the terminal SEL1 which is another input terminal of the selection circuit M[5] and the selection circuit M[6] is a low potential; therefore, a signal of the terminal SO1[1] is output to the terminal O1[5] and the terminal O1[6] by the selection circuit M[5] and the selection circuit M[6]. Thus, the potentials of the terminal O1[5] and the terminal O1[6] become high potentials. In addition, a signal of the terminal SFN[1] is output to a terminal FN[5] and a terminal FN[6]. Thus, the potentials of the terminal FN[5] and the terminal FN[6] become low potentials. Note that in Period T12 (FIG. 10), the potentials of the terminal CLK2[1] to the terminal CLK2[4] are low potentials.

Next, in Period T13 to Period T14 (FIG. 10), the potentials of the terminal SL_PWC1 and the terminal SL_PWC2 become high potentials. Here, the potentials of the terminal O1[5] and the terminal O1[6] are high potentials and the potentials of the terminal FN[5] and the terminal FN[6] are low potentials subsequently to above Period T12, whereby the potentials of a terminal SL[5] and a terminal SL[6] become high potentials with output from the signal supply circuit B[5] and the signal supply circuit B[6]. That is, a selection signal is output to the terminal SL[5] and the terminal SL[6]. Next, in Period T15 (FIG. 10), the potentials of the terminal SL_PWC1 and the terminal SL_PWC2 become low potentials, whereby the potentials of the terminal SL[5] and the terminal SL[6] become low potentials with the output from the signal supply circuit B[5] and the signal supply circuit B[6]. Note that in Period T13 to Period T14 (FIG. 10), the potentials of the terminal SL_PWC3 and the terminal SL_PWC4 are low potentials.

In addition, in Period T14 (FIG. 10), the potentials of the terminal RS_PWC1 and the terminal RS_PWC2 become high potentials. Here, the potentials of the terminal O1[5] and the terminal O1[6] are high potentials and the potentials of the terminal FN[5] and the terminal FN[6] are low potentials subsequently to above Period T12, whereby the potentials of a terminal RS[5] and a terminal RS[6] become high potentials with the output from the signal supply circuit B[5] and the signal supply circuit B[6]. That is, a reset signal is output to the terminal RS[5] and the terminal RS[6]. Subsequently, in Period T15 (FIG. 10), the potentials of the terminal RS_PWC1 and the terminal RS_PWC2 become low potentials. Therefore, the potentials of the terminal RS[5] and the terminal RS[6] become low potentials with the output from the signal supply circuit B[5] and the signal supply circuit B[6]. Note that in Period T14 (FIG. 10), the potentials of the terminal RS_PWC3 and the terminal RS_PWC4 are low potentials.

In addition, in Period T13 to Period T14 (FIG. 10), the potential of the terminal CLK2[1] becomes a high potential. Therefore, in Period T13 to Period T14, the potential of the terminal SOUT[1] output from the register circuit S[1] becomes a high potential. As described above, the signal output from the register circuit S[1] is input to the register circuit S[2] (not illustrated in FIG. 3) through the terminal SOUT[1], whereby a high-potential signal is output to the terminal SO1[2] from the register circuit S[2]. In addition, a low-potential signal is output from the register circuit S[2] to the terminal SFN[2]. Here, in Period T13 to Period T14 (FIG. 11), the potential of the terminal SEL1 is a low potential, and the potential of the terminal SEL2 is a high potential. As described above, the terminal SEL1 and the terminal SEL2 are electrically connected to the selection circuit M[1] to the selection circuit M[m]. Therefore, although not illustrated in FIG. 3, a selection circuit M[55] and a selection circuit M[56] which are electrically connected to the terminal SEL1 and the terminal SEL2 output a signal which is output from the register circuit S[2] to the terminal SO1[2] to a terminal O1[55] and a terminal O1[56]. Thus, the potentials of the terminal O1[55] and the terminal O1[56] become high potentials. In addition, a signal which is output from the register circuit S[2] to the terminal SFN[2] is output to the terminal FN[55] and the terminal FN[56]. Therefore, the potentials of the terminal FN[55] and the terminal FN[56] become low potentials. Note that in Period T13 to Period T14 (FIG. 10), the potentials of the terminal CLK2[2] to the terminal CLK2[4] are low potentials subsequently to Period T12.

Next, in Period T15 to Period T16 (FIG. 10), the potentials of the terminal SL_PWC3 and the terminal SL_PWC4 become high potentials. Subsequently to Period T14, the potentials of the above-described terminal O[55] and terminal O[56] are high potentials, and the potentials of the above-described terminal FN[55] and terminal FN[56] are low potentials, whereby the potentials of a terminal SL[55] and a terminal SL[56] become high potentials with output from the signal supply circuit M[55] and the signal supply circuit M[56] although not illustrated in FIG. 3. That is, a selection signal is output to the terminal SL[55] and the terminal SL[56]. Subsequently, in Period T17, the potentials of the terminal SL_PWC3 and the terminal SL_PWC4 become low potentials. Therefore, the potentials of the terminal SL[55] and the terminal SL[56] become low potentials with output from the signal supply circuit B[55] and the signal supply circuit B[56]. Note that in Period T15 to Period T16 (FIG. 10), the potentials of the terminal SL_PWC1 and the terminal SL_PWC2 are low potentials.

In addition, in Period T16 (FIG. 10), the potentials of the terminal RS_PWC3 and the terminal RS_PWC4 become high potentials. Subsequently to Period T14, the potentials of the above-described terminal O[55] and terminal O[56] are high potentials, and the potentials of the above-described terminal FN[55] and terminal FN[56] are low potentials; the potentials of a terminal RS[55] and a terminal RS[56] become high potentials with the output from the signal supply circuit B[55] and the signal supply circuit B[56] although not illustrated in FIG. 3. That is, a reset signal is output to the terminal RS[55] and the terminal RS[56]. Next, in Period T17, the potentials of the terminal RS_PWC3 and the terminal RS_PWC4 become low potentials, whereby the potentials of the terminal RS[55] and the terminal RS[56] become low potentials with the output from the signal supply circuit B[55] and the signal supply circuit B[56]. Note that in Period T16 (FIG. 10), the potentials of the terminal RS_PWC1 and the terminal RS_PWC2 are low potentials.

Note that in Period T15 to Period T16 (FIG. 10), the potential of the terminal CLK2[2] becomes a high potential. Therefore, in Period T15 to Period T16, the potential of the terminal SOUT[1] output from the register circuit S[1] becomes a high potential. In addition, the potential of the terminal SO1[1] becomes a low potential and the potential of the terminal SFN[1] becomes a high potential with the output from the register circuit S[1].

As described above, in Period T15 to Period T16 (FIG. 10), the potential of the terminal CLK2[2] becomes a high potential. As described above, the signal output from the register circuit S[1] is input to the register circuit S[2] (not illustrated in FIG. 3) through the terminal SOUT[1]. In addition, the signal output from the register circuit S[2] is input to the terminal SOUT[2] (not illustrated in FIG. 3). Therefore, in Period T15 to Period T16, the potential of the terminal SOUT[2] becomes a high potential. Similarly, the signal output from the register circuit S[2] is input to the register circuit S[3] (not illustrated in FIG. 3) through the terminal SOUT[2]. The signal output from the register circuit S[3] is input to the terminal SOUT[3] (not illustrated in FIG. 3). Thus, a high-potential signal is output from the register circuit S[3] to the terminal SO1[3]. Furthermore, a low-potential signal is output from the register circuit S[3] to the terminal SFN[3]. Here, in Period T15 to Period T16 (FIG. 11), the potential of the terminal SEL1 is a low potential, and the potential of the terminal SEL2 is a high potential. As described above, the terminal SEL1 and the terminal SEL2 are electrically connected to the selection circuit M[1] to the selection circuit M[m]. Thus, although not illustrated in FIG. 3, a selection circuit M[105] and a selection circuit M[106] which are electrically connected to the terminal SEL1 and the terminal SEL2 output a signal which is output from the register circuit S[3] to the terminal SO1[3] to a terminal O1[105] and the terminal O1[106]. In addition, the signal output from the register circuit S[3] to the terminal SFN[3] is output to a terminal FN[105] and a terminal FN[106]. Note that in Period T15 to Period T16 (FIG. 10), the potentials of the terminal CLK2[1], the terminal CLK2[3], and the terminal CLK2[4] are low potentials.

As described above, in FIG. 10 and FIG. 11, when the above-described operations are performed repeatedly, the scan signal can be sequentially supplied to the pixels 31. That is, when a start pulse signal is input to the terminal SP2 in Period T12 (FIG. 11), the start pulse signal is supplied to the register circuit S[1]. Next, the start pulse signal is sequentially supplied to the selection circuit M[5] and the selection circuit M[6] and the signal supply circuit B[5] and the signal supply circuit B[6], and the selection signal is output to the terminal SL[5] and the terminal SL[6] and the reset signal is output to the terminal RS[5] and the terminal RS[6] sequentially in accordance with the scan signal.

In addition, although not illustrated in FIG. 3, the start pulse signal input to the register circuit S[1] is output to the terminal SOUT[1] and is input to the register circuit S[2] electrically connected to the terminal SOUT[1]. The input signal is sequentially supplied to the selection circuit M[55] and the selection circuit M[56] and the signal supply circuit B[55] and the signal supply circuit B[56], the selection signal is output to the terminal SL[55] and the terminal SL[56], and the reset signal is output to the terminal RS[55] and the terminal RS[56] sequentially in accordance with the scan signal. In addition, the signal input to the register circuit S[2] is output to the terminal SOUT[2] and is input to the register circuit S[3] electrically connected to the terminal SOUT[2]. In addition, the input signal is sequentially supplied to the selection circuit M[105] and the selection circuit M[106] and a signal supply circuit B[105] and a signal supply circuit B[106], the selection signal is output to a terminal SL[105] and a terminal SL[106], and the reset signal is output to a terminal RS[105] and a terminal RS[106] sequentially in accordance with the scan signal. Moreover, the signal input to the register circuit S[3] is output to the terminal SOUT[3], and is input to a register circuit S[4] which is electrically connected to the terminal SOUT[3]. In addition, the input signal is sequentially supplied to a selection circuit M[155] and a selection circuit M[156] and a signal supply circuit B[155] and a signal supply circuit B[156], the selection signal is output to a terminal SL[155] and a terminal SL[156], and the reset signal is output to a terminal RS[155] and a terminal RS[156] sequentially in accordance with the scan signal. That is, the signal input to the register circuit S[t] is output to a terminal SOUT[t+1], and is input to a register circuit S[t+1] which is electrically connected to the terminal SOUT [t]. In addition, the input signal is sequentially supplied to selection circuit M[5+50t] and a selection circuit M[6+50t] and a signal supply circuit B[5+50t] and a signal supply circuit B[6+50t], the selection signal is output to a terminal SL[5+50t] and a terminal SL[6+50t], and the reset signal is output to a terminal RS[5+50t] and a terminal RS[6+50t] sequentially in accordance with the scan signal. Accordingly, the captured-image data can be sequentially read out from the pixels 31 in every 50 rows in the fifth and sixth rows to the 5+50t-th and 6+50t-th rows of the pixel portion 30. Note that in the driving method illustrated in FIG. 6, the start pulse signal is not input to the terminal SP1.

Figure 12:
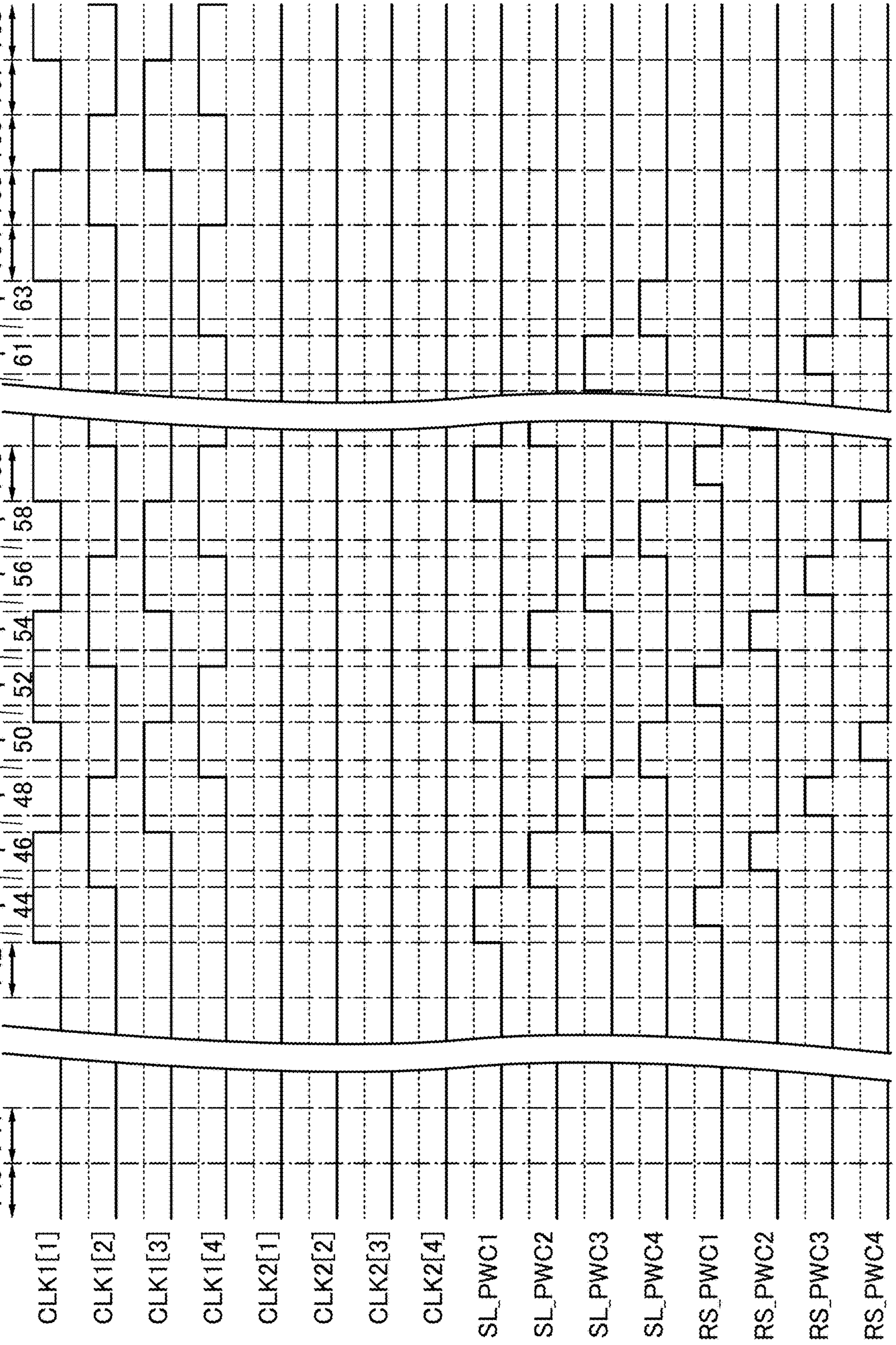
FIG. 12 is a timing chart showing an example of a driving method for a row driver circuit.
Figure 13:
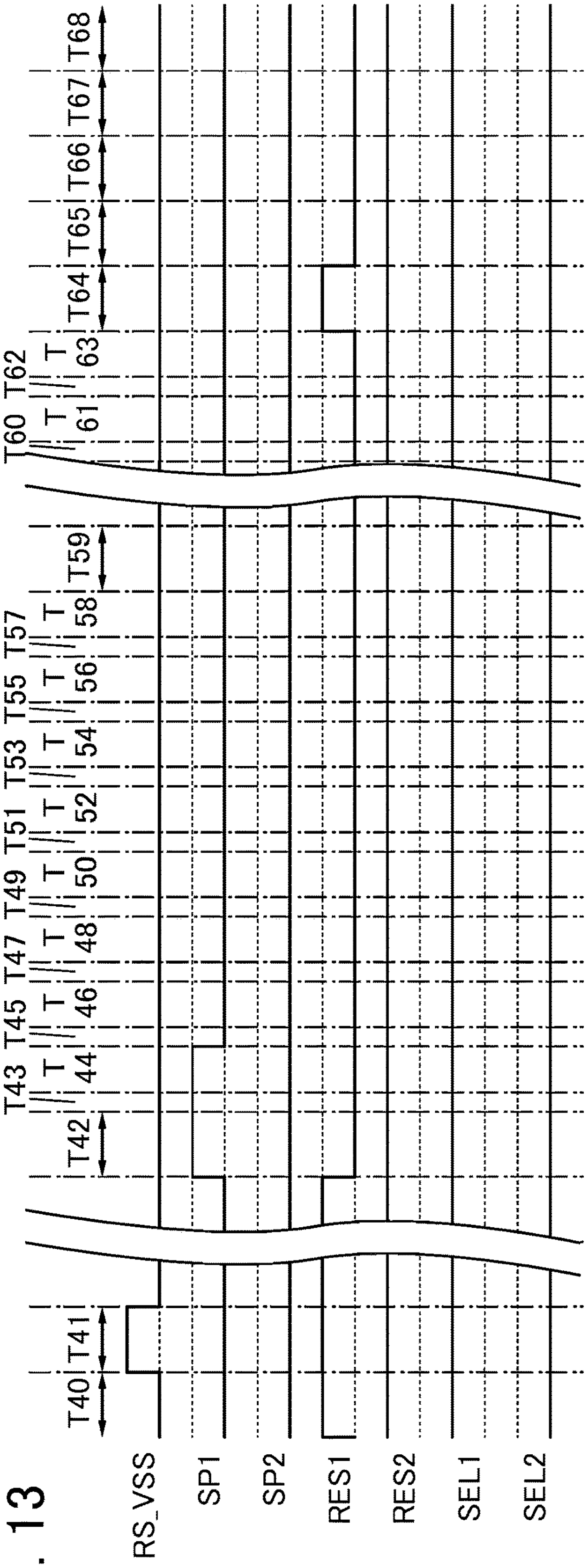
FIG. 13 is a timing chart showing an example of a driving method for a row driver circuit.

FIG. 12 and FIG. 13 are timing charts showing the example of the details of the driving method of FIG. 7 (FIG. 9), and illustrate an example of a driving method of the row driver circuit 33, with divided periods, Period T40 to Period T68.

In Period T42 to Period T68 (FIG. 13), the potential of the terminal SEL1 is a high potential and the potential of the terminal SEL2 is a low potential. In Period T42 to Period T68 (FIG. 13), the potential of the terminal SP2 is a low potential. In Period T42 to Period T68 (FIG. 12), the potentials of the terminal CLK2[1] to the terminal CLK2[4] are low potentials.

In Period T42 (FIG. 13), when the high-potential signal is input as a pulse signal to the terminal SP1, the high-potential signal is output from the register circuit F[1] to the terminal FO1[1]. In addition, a low-potential signal is output from the register circuit F[1] to the terminal FFN[1]. At this time, the potential of the terminal SEL1 which is an input terminal of the selection circuit M[1] is a high potential, and the potential of the terminal SEL2 which is another input terminal of the selection circuit M[1] is a low potential; therefore, the signal of the terminal FO1 is output to the terminal O1[1] by the selection circuit M[1]. Therefore, the potential of the terminal O1[1] becomes a high potential. In addition, a signal of the terminal FFN[1] is output to the terminal FN[1]. Therefore, the potential of the terminal FN[1] becomes a low potential. Note that in Period T42 (FIG. 12), the potentials of the terminal CLK1[1] to the terminal CLK1[4] are low potentials.

Next, in Period T43 (FIG. 12), the potential of the terminal CLK1[1] becomes a high potential. Therefore, in Period T43, the potential of the terminal FOUT[1] output from the register circuit F[1] becomes a high potential. Note that the potentials of the terminal CLK1[2] to the terminal CLK1[4] are low potentials continuously to above Period T42.

Note that in Period T43 to Period T44 (FIG. 12), the potential of the terminal SL_PWC1 becomes a high potential. Here, the potential of the terminal O1[1] is a high potential and the potential of the terminal FN[1] is a low potential subsequently to above Period T42, whereby the potential of the terminal SL[1] becomes a high potential with the output from the signal supply circuit B[1]. That is, the selection signal is output to the terminal SL[1]. Next, in Period T45 (FIG. 12), the potential of the terminal SL_PWC1 becomes a low potential, whereby the potential of the terminal SL[1] becomes a low potential with the output from the signal supply circuit B[1]. Note that in Period T43 to Period T44 (FIG. 12), the potentials of the terminal SL_PWC2 to the terminal SL_PWC4 are low potentials.

In Period T44 (FIG. 12), the potential of the terminal RS_PWC1 becomes a high potential. Here, the potential of the terminal O1[1] is a high potential and the potential of the terminal FN [1] is a low potential subsequently to above Period T42, whereby the potential of the terminal RS[1] becomes a high potential with the output from the signal supply circuit B[1]. That is, a reset signal is output to the terminal RS[1]. Next, in Period T45 (FIG. 12), the potential of the terminal RS_PWC1 becomes a low potential. Thus, the potential of the terminal RS[1] becomes a low potential with the output from the signal supply circuit B[1]. Note that in Period T44 (FIG. 12), the potentials of the terminal RS_PWC2 to the terminal RS_PWC4 are low potentials.

Note that in Period T45 (FIG. 12), the potentials of the terminal CLK1[1] and the terminal CLK1[2] become high potentials. Therefore, in Period T45, the potential of the terminal FOUT[1] output from the register circuit F[1] becomes a high potential. As described above, since the signal output from the register circuit F[1] is input to the register circuit F[2] through the terminal FOUT[1], the high-potential signal is output from the register circuit F[2] to the terminal FO1[2]. In addition, the low-potential signal is output from the register circuit F[2] to the terminal FFN[2]. Here, in Period T45 (FIG. 13), the potential of the terminal SEL1 is a high potential and the potential of the terminal SEL2 is a low potential. Therefore, the selection circuit M[2] which is electrically connected to the terminal SEL1 and the terminal SEL2 outputs the signal, which is output from the register circuit F[2] to the terminal FO1[2], to the terminal O1[2]. Therefore, the potential of the terminal O1[2] becomes a high potential. In addition, the signal output from the register circuit F[2] to the terminal FFN[2] is output to the terminal FN[2]. Therefore, the potential of the terminal FN[2] becomes a low potential.

In addition, in Period T45 to Period T46 (FIG. 12), the potential of the terminal SL_PWC2 becomes a high potential. Here, the potential of the terminal O1[2] is a high potential and the potential of the terminal FN [2] is a low potential subsequently to above Period T43, whereby the potential of a terminal SL[2] becomes a high potential with the output from the signal supply circuit B[2]. That is, the selection signal is output to the terminal SL[2]. In Period T47 (FIG. 12), the potential of the terminal SL_PWC2 is a low potential, so that the potential of the terminal SL[2] becomes a low potential with the output from the signal supply circuit B[2]. Note that in Period T45 to Period T46 (FIG. 12), the potentials of the terminal SL_PWC1, the terminal SL_PWC3, and SL_PWC4 are low potentials.

In addition, in Period T46 (FIG. 12), the potential of the terminal RS_PWC2 becomes a high potential. Here, the potential of the terminal O1[2] is a high potential and the potential of the terminal FN[2] is a low potential subsequently to above Period T43, whereby the potential of the terminal RS[2] becomes a high potential with the output from the signal supply circuit B[2]. That is, a reset signal is output to the terminal RS[2]. Continuously, in Period T47 (FIG. 12), the potential of the terminal RS_PWC2 becomes a low potential. Therefore, the potential of the terminal RS[2] becomes a low potential with the output from the signal supply circuit B[2]. Note that in Period T46 (FIG. 12), the potentials of the terminal RS_PWC1, the terminal RS_PWC3, and the terminal RS_PWC4 are low potentials.

As describe above, in Period T45, the potential of the terminal FOUT[1] output from the register circuit F[1] becomes a high potential. As described above, the signal output from the register circuit F[1] is input to the register circuit F[2] through the terminal FOUT[1]. The signal output from the register circuit F[2] is input to the terminal FOUT[2]. Therefore, in Period T45, the potential of the terminal FOUT[2] becomes a high potential. Similarly, the signal output from the register circuit F[2] is input to the register circuit F[3] through the terminal FOUT[2]. Thus, the high-potential signal is output from the register circuit F[3] to the terminal FO1[3]. Furthermore, the low-potential signal is output from the register circuit F[3] to the terminal FFN[3]. Here, in Period T45 (FIG. 13), the potential of the terminal SEL1 is a high potential, and the potential of the terminal SEL2 is a low potential. Therefore, the selection circuit M[3] which is electrically connected to the terminal SEL1 and the terminal SEL2 outputs the signal, which is output from the register circuit F[3] to the terminal FO1[3], to the terminal O1[3]. Thus, the potential of the terminal O1[3] becomes a high potential. In addition, the signal output from the register circuit F[3] to the terminal FFN[3] is output to the terminal FN[3]. Thus, the potential of the terminal FN[3] becomes a low potential.

Next, in Period T47 to Period T50 (FIG. 12), the potential of the terminal CLK1[3] becomes a high potential. Therefore, in Period T47 to Period T50, the potential of the terminal FOUT[3] output from the register circuit F[3] becomes a high potential. Here, as described above, the signal output from the register circuit F[3] is input to the register circuit F[1] in the stage before the previous stage through the terminal FOUT[3]. Therefore, in Period T47 to Period T50, the high-potential signal is input to the register circuit F[1]. Therefore, the potential of the terminal FO1[1] becomes a low potential with the output from the register circuit F[1]. In addition, the potential of the terminal FFN[1] becomes a high potential with the output from the register circuit F[1].

As described above, in FIG. 12 and FIG. 13, when the above-described operations are performed repeatedly, the scan signal can be sequentially supplied to the pixels 31. That is, in Period T42 (FIG. 13), when the start pulse signal is input to the terminal SP1, the start pulse signal is supplied to the register circuit F[1]. At the same time, the scan signal is supplied to the selection circuit M[1] and the signal supply circuit B[1]. After that, the scan signal is sequentially supplied to the register circuit F[2] to the register circuit F[m], the selection circuit M[2] to the selection circuit M[m], and the signal supply circuit B[2] to the signal supply circuit B[m]. In response to the scan signal, the selection signals are output to the terminal SL[1] to the terminal SL[m] sequentially, and the reset signals are output to the terminal RS[1] to the terminal RS[m] sequentially. Thus, captured-image data can be sequentially read out from the pixels 31 in the first row to the m-th row of the pixel portion 30. Note that in the driving method illustrated in FIG. 7, the start pulse signal is not input to the terminal SP2.

In the following description, another example of the details of the driving method illustrated in FIG. 7, specifically, an example of a driving method to stop the operation of the shift register circuit (to reset the data retained by the pixels 31) shown in Step S3 in the flow chart in FIG. 8 is described.

In Period T40 to Period T68 (FIG. 13), the potential of the terminal SEL2 is a low potential, and the potential of the terminal SEL1 is a high potential. In Period T40 to Period T68 (FIG. 13), the terminal RES2 has a high potential. In Period T40 to Period T68 (FIG. 13), the terminal SP2 has a low potential. In Period T40 to Period T68 (FIG. 12), the terminal CLK2[1] to the terminal CLK2[4] have low potentials.

In Period T40 (FIG. 13), the low-potential signal is output from the register circuit F[1] to the register circuit F[m] to the terminal FO1[1] to the terminal FO1[m] by inputting a high-potential signal to the terminal RES1. The terminal SEL1 which is the input terminal of the selection circuit M[1] to the selection circuit M[m] has a high potential, and the terminal SEL2 which is the other input terminal of the selection circuit M[1] to the selection circuit M[m] has a low potential; therefore, the signals of the terminal FO1[1] to the terminal FO1[m] are input to the terminal O1[1] to the terminal O1[m] by the selection circuit M[1] to the selection circuit M[m]. Therefore, the potentials of the terminal O1[1] to the terminal O1[m] become high potentials. In addition, the signals of the terminal FFN[1] to the terminal FFN[m] are output to the terminal FN[1] to the terminal FN[m]. Thus, the potentials of the terminal FN[1] to the terminal FN[m] become low potentials.

In following Period T41 (FIG. 13), the terminal O1[1] to the terminal O1[m] are high potentials and the terminal FN[1] to the terminal FN[m] are low potentials subsequently to above Period T40. Thus, by inputting the high-potential signal to the terminal RS_VSS, the high potential is output to the terminal RS[1] to the terminal RS[m] by the signal supply circuit B[1] to the signal supply circuit B[m]. Thus, the data retained by the pixels in the first row to the m-th row of the pixel portion 30 (that is, all of the pixels 31) can be reset.

As above, when the row driver circuit 33 performs the operation illustrated in FIG. 10 to FIG. 13 in the readout period, the semiconductor device of one embodiment of the present invention can perform authentication such as fingerprint authentication. Note that in this specification and the like, the driving method illustrated in FIG. 10 and FIG. 11 may be referred to as the first mode. In addition, the driving method illustrated in FIG. 12 and FIG. 13 may be referred to as the second mode.

Figure 14:
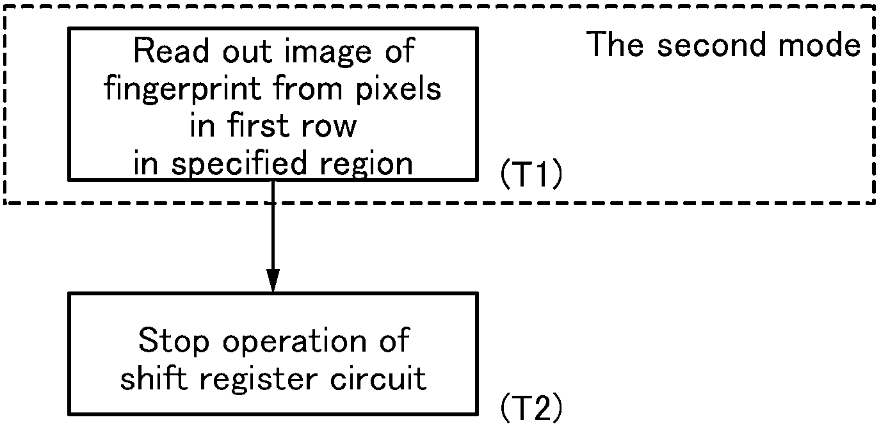
FIG. 14 is a flow chart showing an example of a driving method of a row driver circuit.

FIG. 14 is a flow chart showing an example of a driving method of one embodiment of the present invention of the row driver circuit 33 and which is different from the flow chart in FIG. 8. The semiconductor device of one embodiment of the present invention can perform the user's fingerprint authentication in a short time by the driving method.

First, in Step T1, the fingerprint image is read out row by row from the pixels in the first row to the pixels in the r-th row in the specified region of the pixel portion 30, for example, in the region where the pixels in the first to r-th rows (r is an integer greater than or equal to 1 and less than or equal to m) of the pixel portion 30 are included. As described in FIG. 1, the semiconductor device 10 of one embodiment of the present invention includes a light-emitting apparatus and an imaging apparatus, and light emitted from the light-emitting apparatus is reflected by a finger or the like and the imaging apparatus detects the light. Thus, in Step T1, the pixel can detect light reflected by the finger among the light emitted by the light-emitting apparatus, and the pixel can capture the fingerprint of the finger and read out the captured-image data. Note that as described above, pixels in the first row of the pixel portion 30 refer to the lowermost row of the pixel portion 30 illustrated in FIG. 6. In addition, the pixels in the first row of the pixel portion 30 also refer to the lowermost row of the pixel portion 30R illustrated in FIG. 9. For example, in the case where FIG. 6, FIG. 7, and FIG. 9 illustrate the schematic views of a smartphone including the pixel portion 30, the speaker 38 or the camera 39 may be provided outside of the pixel portion 30 as illustrated. In this case, pixels in a row which is farthest from the speaker 38 or the camera 39 is a pixel in the first row (lowermost row) and pixels in a row which is nearest to the speaker 38 or the camera 39 is a pixel in the m-th row (uppermost row).

Here, the number of rows r of the above-described pixel portion 30 can be set arbitrarily in the range greater than or equal to 1 and less than or equal to m. For example, in the case where FIG. 6, FIG. 7, and FIG. 9 illustrate the schematic views of electronic devices such as a smartphone, a fabricator or a user of the electronic device can set the value of r arbitrarily in advance. The pixels in the r-th row of the pixel portion 30 are preferably included in the pixels in the first to m/2-th rows.

Therefore, the pixels in the r-th and preceding rows in the pixel portion 30 (the first to the r-th rows) correspond to pixels in the rows from which the fingerprint image is read out.

That is, in the driving method of one embodiment of the present invention, the processing for detecting the fingerprint 71 is performed to the pixels in the lowermost row (first row) to the r-th row of the pixel portion 30 by upward row-by-row shift.

Here, in Step T1, row-by-row shifting by the shift register circuit from the above-described pixels in the first row of the pixel portion 30 in an upward direction, for example, to the pixels in the r-th row, i.e., row-by-row shifting from the pixels in the row (first row) farthest from the speaker 38 or the camera 39 to the pixels in the r-th row nearer to the speaker 38 or the camera 39 than the pixels in the first row are in the case where the above smartphone is used as an example.

Here, Step T1 in FIG. 14 is a driving method corresponding to Step S2 in FIG. 8, that is, the second mode. Therefore, Step T1 in FIG. 14 can be referred to as the second mode.

When the readout of the fingerprint image from the pixels in all the target rows (the first to r-th row of the pixel portion 30) is completed in Step T2, the operation of the shift register circuit is stopped (Step T2).

Note that the flow chart shown in FIG. 14 does not include processing corresponding to the first mode in the flow chart shown in FIG. 8. That is, the driving method of one embodiment of the present invention shown in the flow chart in FIG. 14 does not perform processing for detecting the position of the user's finger.

As described above, in the driving method of one embodiment of the present invention, the number of rows of pixels from which the fingerprint image is read out in the pixel portion 30 (first to r-th row) can be set arbitrarily. Therefore, the value of r is set larger than the number of the rows including the number of rows in the pixels assumed to be touched by the user's finger, whereby the readout of the fingerprint image can be surely performed without the first mode. Note that in the region where the pixels in the first to the r-th row of the pixel portion 30 are included, an image, a comment, or the like may be displayed to specify the region as a region where the user's finger touches or approaches.

As above, in the driving method of one embodiment of the present invention, the first mode is not performed and the readout of the fingerprint image to part of the region of the pixel portion 30 is performed only by the second mode (Step T2). In a region other than the above-described region in the pixel portion 30, the readout of the fingerprint image is not performed. That is, in the driving method of one embodiment of the present invention, fingerprint authentication is conducted only in a region of the pixel portion 30 where the finger is assumed to be detected.

Figure 15:
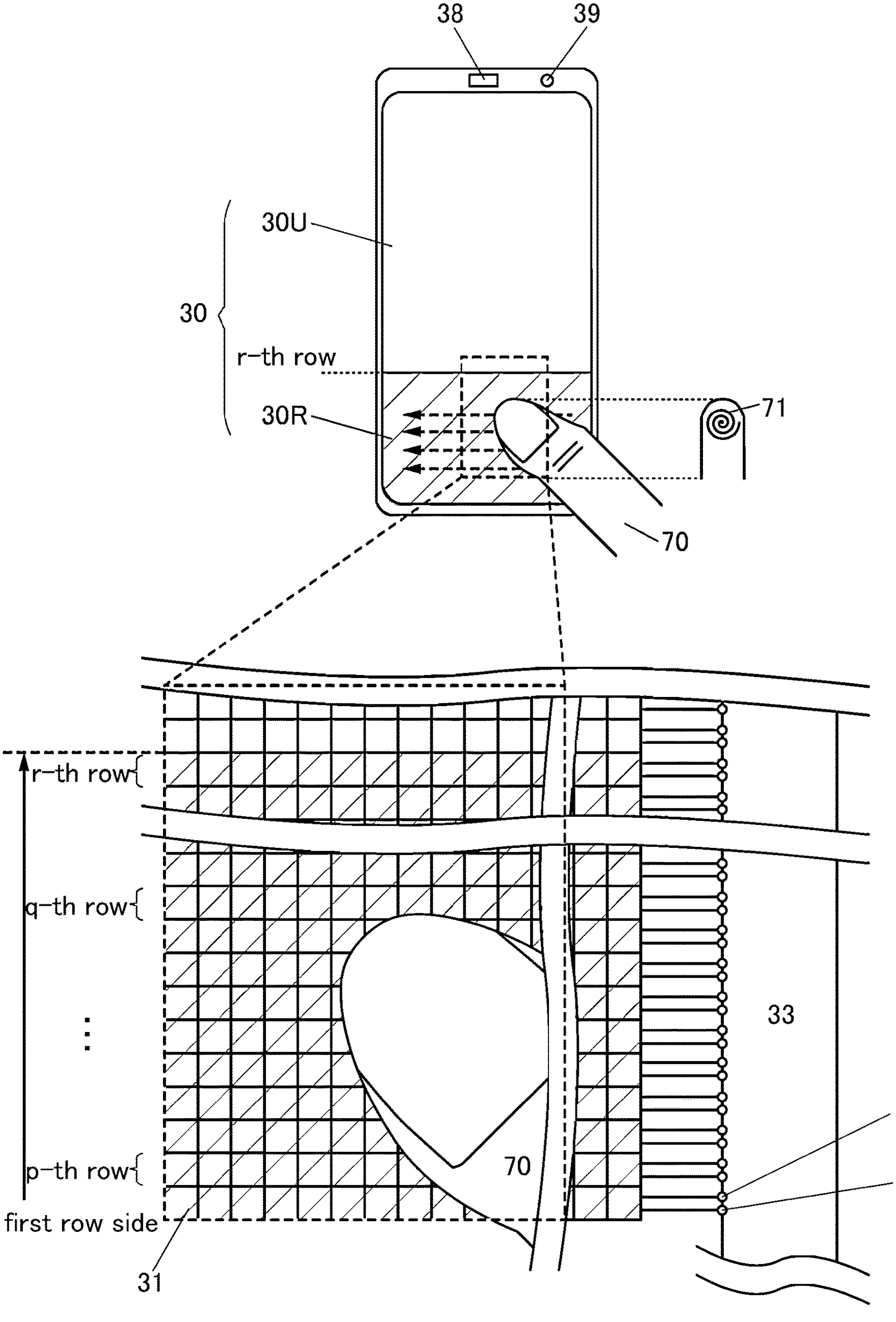
FIG. 15 is a schematic view illustrating an example of a driving method for a row driver circuit.

FIG. 15 is a schematic view illustrating an example of a driving method of the row driver circuit 33 described with reference to the flow chart in FIG. 14.

In FIG. 15, the pixel portion 30R is a region where the fingerprint image is read out in the pixel portion 30, and the region where pixels in the first to r-th rows of the pixel portion 30 are included.

In FIG. 15, the pixel portion 30U is a region in the upper side than the pixel portion 30R in the pixel portion 30. That is, the pixel portion 30U is a region including pixels in the r+1-th to m-th rows in the pixel portion 30.

As described above, when the readout of the fingerprint image is completed in the pixel portion 30R (a region including the pixels in the first to the r-th row of the pixel portion 30) in Step T1, the operation of the shift register circuit is stopped in Step T2. Accordingly, any processes of the capturing image are not performed in the pixel portion 30U.

Here, in the schematic view in FIG. 9, an upper end portion of the pixel portion 30R (a boundary portion between the pixel portion 30R and the pixel portion 30U) and a position of a tip of the user's finger 70 are substantially aligned with each other. That is, in the schematic view in FIG. 9, it can be said that the upper end portion of the pixel portion 30R and the tip of the finger 70 are positioned over the pixels in the q-th row of the pixel portion 30.

In contrast, in a schematic view in FIG. 15, the upper end portion of the pixel portion 30R is positioned above the tip of the user's finger 70. That is, in the schematic view in FIG. 15, it can be said that the pixels in the row (r-th row) of the pixel portion 30 where the readout of the fingerprint image is conducted lastly in the above-described Step T1 are positioned above the pixels in the row (q-th row) of the pixel portion 30 where the tip of the finger 70 is positioned.

Therefore, in the driving method illustrated in FIG. 14 and FIG. 15, the number of rows of pixels of the pixel portion 30 from which the fingerprint image is read out may be larger than that in the driving method illustrated in FIG. 8 and FIG. 9.

However, the driving method illustrated in FIG. 14 and FIG. 15 does not need the first mode. That is, the time for detecting the position of the user's finger is not required. Therefore, the total processing time may be shortened compared with the driving method of performing the first mode illustrated in FIG. 8 and FIG. 9.

As above, in the driving method of one embodiment of the present invention, the first mode is not performed and the second mode is conducted only to the pixel portion 30R. Accordingly, the total processing time can be shortened by not performing the first mode. In addition, since the region where the readout of the fingerprint image is performed is limited to part of the pixel portion 30, a frame frequency for the readout of the fingerprint image by the row driver circuit 33 can be increased compared with the case where the readout of the fingerprint image is performed to the entire pixel portion 30. Thus, fingerprint authentication can be performed in short time.

For example, the case where FIG. 15 illustrates the schematic view of a smartphone including the pixel portion 30 is considered. For example, when a user operates a smartphone by one hand, the user holds the vicinity of the lower side of the smartphone, and the finger 70 often touches the lower region of the pixel portion 30 (a region including the pixels in a first to m/2-th rows of the pixel portion 30). In this case, fingerprint authentication is performed only to the lower region where the finger 70 touches, and the driving method of one embodiment of the present invention is preferable. Note that the schematic view in FIG. 15 is not limited to a smartphone.

Another example of a driving method of the row driver circuit 33 which is different from the contents described in FIG. 8, FIG. 9, FIG. 14, and FIG. 15 and combines the first mode and the second mode described above will be described below with reference to a flow chart and the like.

Figure 16:
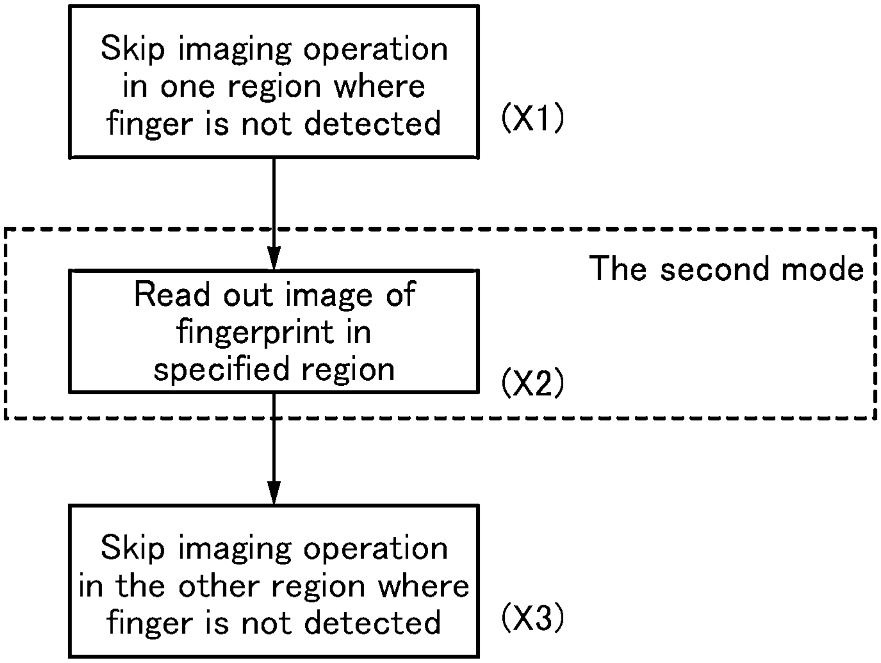
FIG. 16 is a flow chart showing an example of a driving method for a row driver circuit.

FIG. 16 is a flow chart showing another example of a driving method of one embodiment of the present invention for the row driver circuit 33. The semiconductor device of one embodiment of the present invention can perform fingerprint authentication of a user in a short time by the driving method.

First, in Step X1, processing for skipping fingerprint imaging operation is performed in one region where the finger is not detected in the pixel portion 30. For example, although the region where the fingerprint image is read out in FIG. 7 is a region including the pixels in the p-th to q-th rows of the pixel portion 30 where the position of the finger is detected in FIG. 6, the region including the pixels in the p-th to q-th rows of the pixel portion 30 is specified in advance as the region where the finger touches or approaches in one embodiment of the present invention. Therefore, in Step X1, processing for skipping fingerprint imaging operation is performed from the pixels in the first row (m-th row) to the pixels in the p−1-th row (q+1-th row) of the pixel portion 30 in FIG. 7. Note that in FIG. 7, a region where the pixels in the first to p−1-th rows of the pixel portion 30 are included is referred to as one region and a region where the pixels in the q+1-th to m-th rows of the pixel portion 30 is referred to as the other region; alternatively, these can be reversed. That is, a region where the pixels in the m-th to q+1-th rows of the pixel portion 30 can be referred to as one region, and a region where the pixels in the p−1-th to first rows of the pixel portion 30 are included can be referred to as the other region.

In addition, the pixels in the first row of the pixel portion 30 refers to the pixels in the uppermost or lowermost row of the pixel portion 30 illustrated in FIG. 6. For example, in the case where FIG. 6 illustrates a schematic view of a smartphone including the pixel portion 30, the speaker 38 or the camera 39 may be provided outside of the pixel portion 30 as illustrated. In this case, pixels in the row nearest to (farthest from) the speaker 38 or the camera 39 are pixels in the first row and pixels in the row farthest from (nearest) the speaker 38 or the camera 39 are pixels in the m-th row. In addition, the pixels in the first row of the pixel portion 30 can also be referred to as the pixels in the row where the first row of a shift register circuit is connected. Moreover, the pixels in the m-th row of the pixel portion 30 can also be referred to as the pixels in the row where the last row of the shift register circuit from which a selection signal is output is connected. Note that a schematic view illustrated in FIG. 6 is not limited to a smartphone.

In Step X2, the fingerprint image is read out row by row from pixels in the p-th row (q-th row) to pixels in the q-th row (p-th row) in a specified region of the pixel portion 30. As described in FIG. 1, the semiconductor device 10 of one embodiment of the present invention includes a light-emitting apparatus and an imaging apparatus, and light emitted from the light-emitting apparatus is reflected by a finger or the like and the imaging apparatus detects the light. Thus, in Step X2, the pixels can detect light reflected by the finger among the light emitted by the light-emitting apparatus, and the pixels can capture the fingerprint of the finger and read out the captured-image data.

Step X2 is the driving method illustrated in FIG. 7 and is the second mode.

Next, in Step X3, processing for skipping fingerprint imaging operation is performed in the other region where the finger in the pixel portion 30 is not detected, that is, from pixels in the q+1th row (p−1-th row) to pixels in the m-th row (first row) of the pixel portion 30.

As described above, in the driving method of one embodiment of the present invention, the first mode is not performed and the readout of a fingerprint image is performed by the second mode (Step X2) in the region specified in advance. The readout of the fingerprint image is not performed in the region which is not specified, and only processing for shifting is performed on the rows of the pixels included in the region (Step X1 and Step X3).

Figure 17:
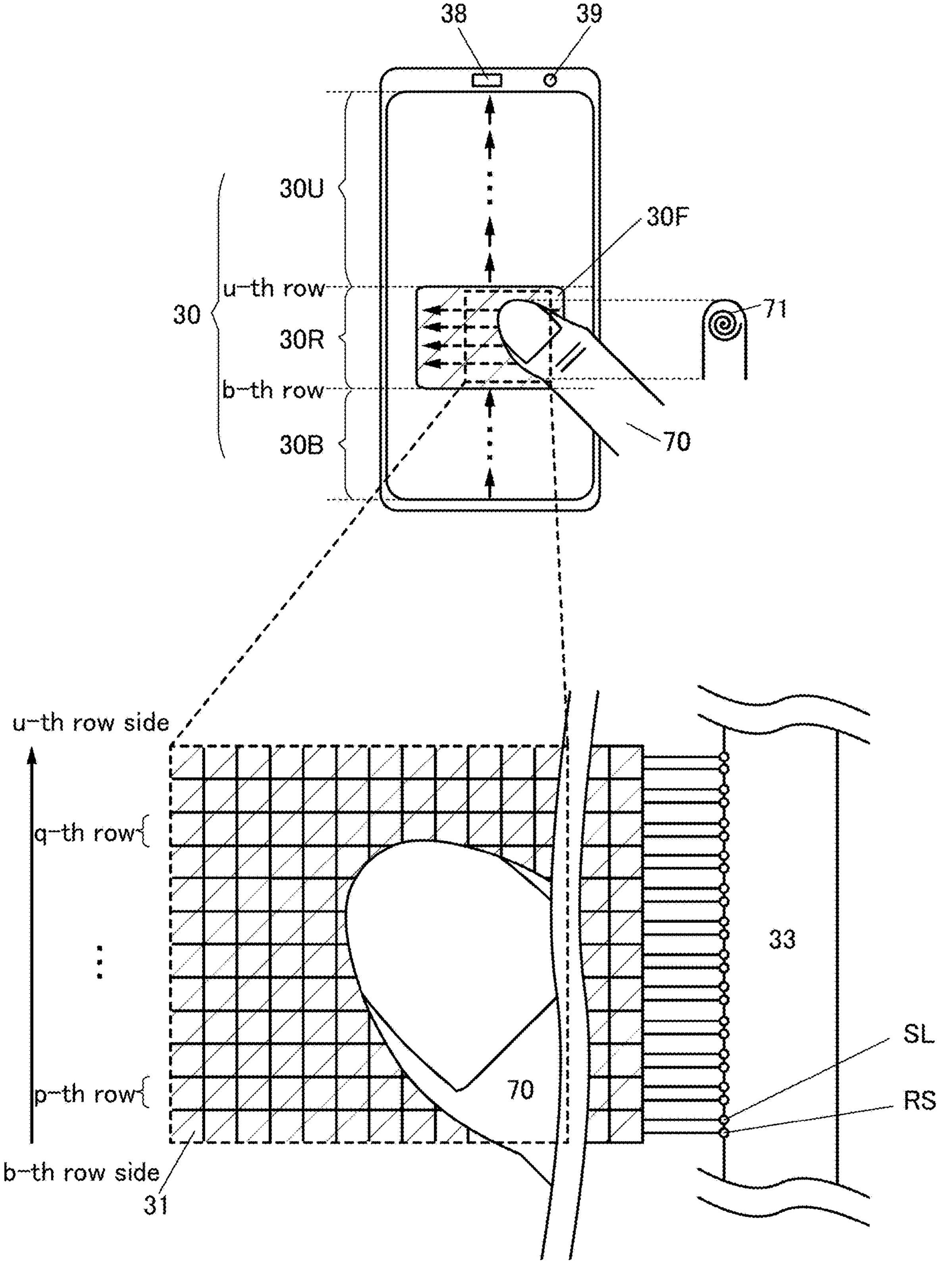
FIG. 17 is a schematic view illustrating an example of a driving method for a row driver circuit.

FIG. 17 is a schematic view illustrating an example of a driving method of the row driver circuit 33 described with reference with the flow chart in FIG. 16.

In FIG. 17, the pixel portion 30 includes a pixel portion 30B, the pixel portion 30R, and the pixel portion 30U. In addition, in FIG. 17, the pixel portion 30R includes a pixel portion 30F.

The pixel portion 30F is a specified region where the user's fingerprint image is read out in Step X2 as described above, and is a region where pixels in the b-th to u-th rows (b is an integer greater than or equal to 1 and less than or equal top, and u is an integer greater than or equal to q and less than or equal to m) of the pixel portion 30. The pixel portion 30F is provided in the pixel portion 30R.

In this specification and the like, the pixel portion 30 may be referred to as a first pixel portion, and the specified region (a region including the pixels in the b-th to u-th rows) in the pixel portion 30 (first pixel portion) may be referred to as a second pixel portion.

For example, the case where FIG. 17 illustrates the schematic view of a smartphone including the pixel portion 30 is considered. For example, when a user operates a smartphone by one hand, the user holds the vicinity of the lower side of the smartphone, and the finger 70 often touches the lower region of the pixel portion 30 (a region including the pixels in the first to m/2 rows or in the m/2+1-th to m-th rows of the pixel portion 30). In this case, the readout of the fingerprint image is performed only to the lower region where the finger 70 touches, and the pixel portion 30F is preferably provided in the lower region of the pixel portion 30.

Note that the region where the pixel portion 30F is provided is not limited to the lower region of the pixel portion 30. Note that the schematic view in FIG. 17 is not limited to a smartphone.

The pixel portion 30B is one region adjacent to the pixel portion 30R in the pixel portion 30, and is a region where the pixels in the first to b−1-th rows in the pixel portion 30 are included.

The pixel portion 30U is the other region adjacent to the pixel portion 30R in the pixel portion 30, and is a region where pixels in the u+1-th to m-th rows in the pixel portion 30 are included.

As described above, in Step X1, processing for skipping fingerprint imaging operation is performed in one region where the finger in the pixel portion 30 is not detected (also can be referred to as one region not overlapping with the second pixel portion in the first pixel portion), that is, from the pixels in the first row (m-th row) to the pixels in the b−1-th row (u+1-th row) of the pixel portion 30. That is, in the pixel portion 30B (the pixel portion 30U), the readout of the fingerprint image is not performed, and only the processing for skipping the imaging operation and shifting rows is performed.

As described above, the readout of the user's fingerprint image is performed in the pixel portion 30F in the second mode (Step X2), and then in Step X3, processing for fingerprint imaging operation is performed in the other region where the finger in the pixel portion 30 is not detected (also can be referred to as the other region not overlapping with the second pixel portion in the first pixel portion), that is, from the pixels in the u+1-th row (b−1-th row) to the pixels in the m-th row (first row) of the pixel portion 30. That is, in the pixel portion 30U (the pixel portion 30B), the readout of the fingerprint image is not performed, and only the processing for skipping the imaging operation and shifting rows is performed.

That is, in the driving method of one embodiment of the present invention, the first mode is not performed and the second mode is conducted only to the pixel portion 30F. As above, the region where the readout of the user's fingerprint is performed is specified in advance, whereby the detection of the position of the user's finger is not required and the total processing time can be shortened. In addition, since the region where the readout of the fingerprint image is performed is limited to part of the pixel portion 30, a frame frequency for the readout of the fingerprint image by the row driver circuit 33 can be increased compared with the case where the readout of the fingerprint image is performed to the entire pixel portion. Thus, fingerprint authentication can be performed in short time.

In the following, an example of details of the driving method in FIG. 16 and FIG. 17 will be described with reference to FIG. 18 and FIG. 19.

Figure 18:
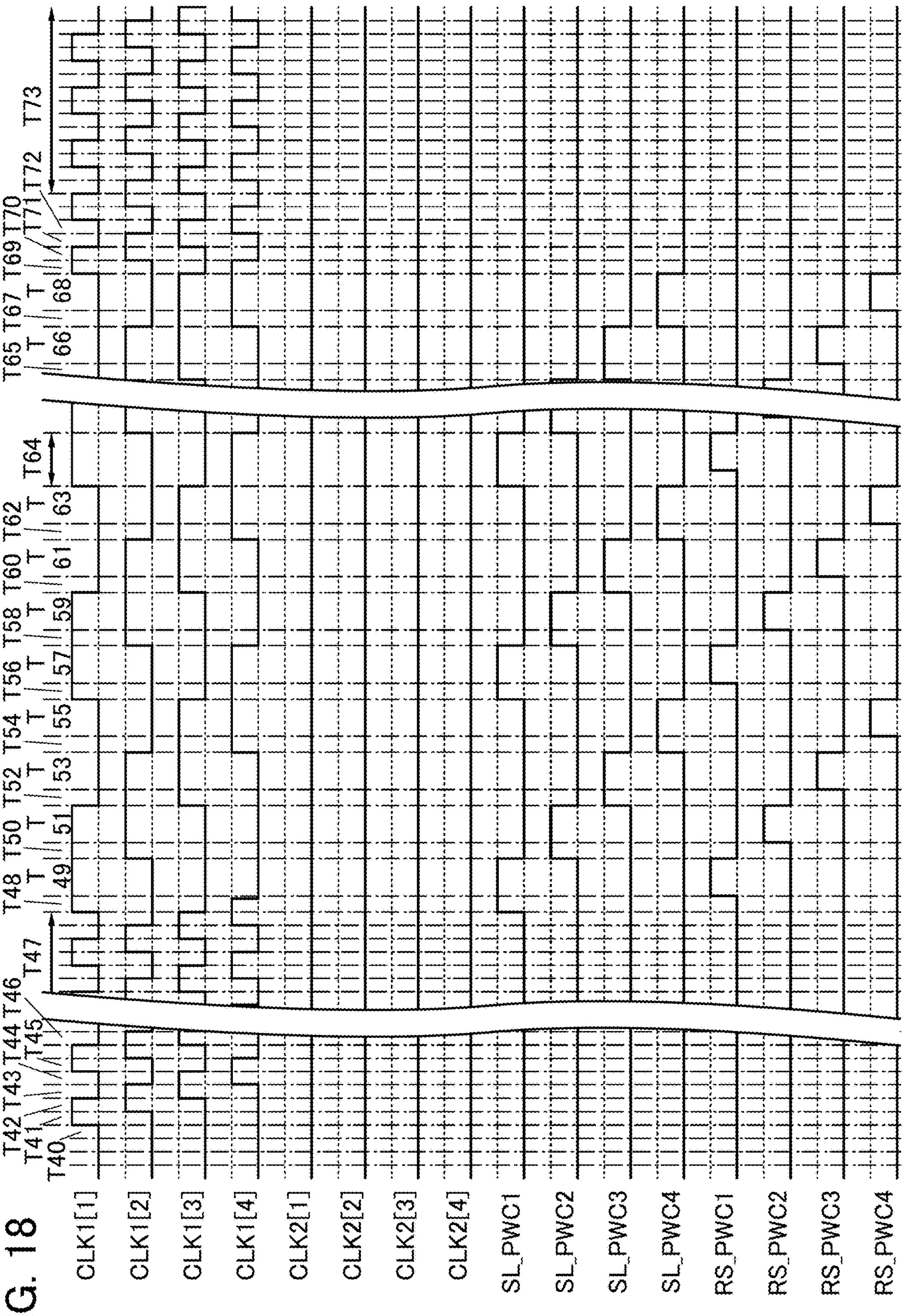
FIG. 18 is a timing chart showing an example of a driving method for a row driver circuit.
Figure 19:
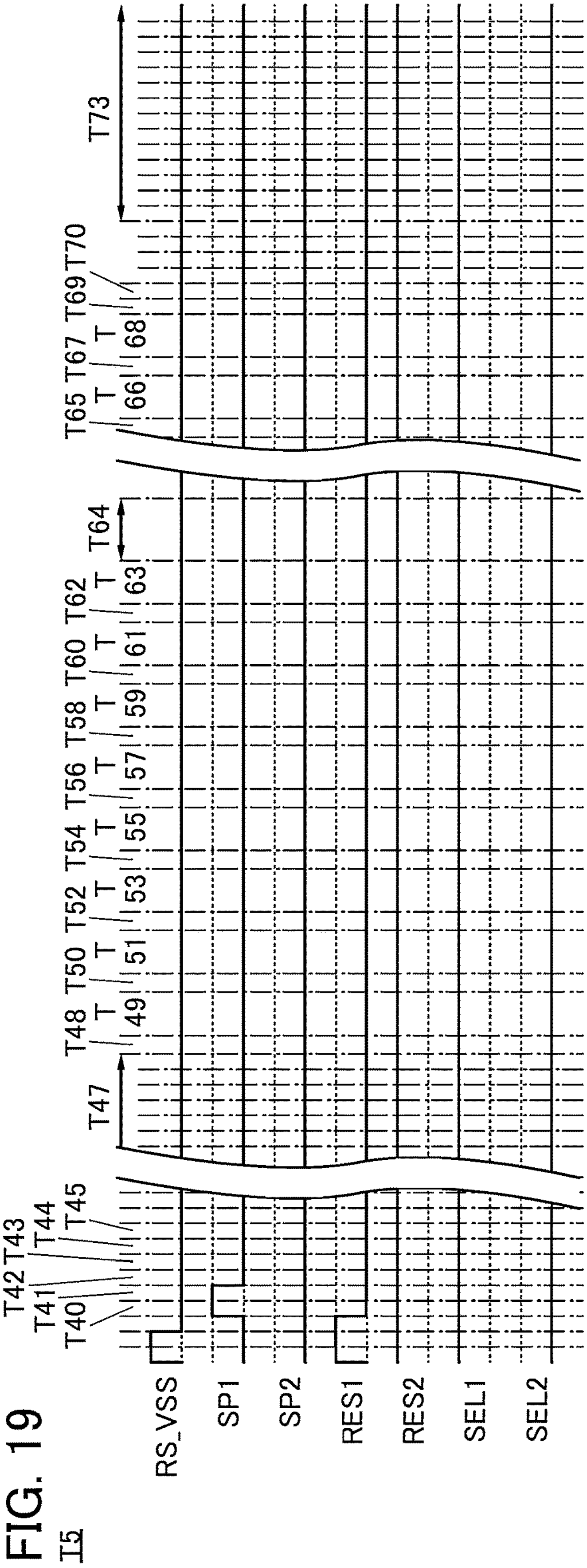
FIG. 19 is a timing chart showing an example of a driving method for a row driver circuit.

FIG. 18 and FIG. 19 are timing charts showing an example of the details of the driving method of FIG. 7 (FIG. 17), and show the example of the driving method of the row driver circuit 33, with divided periods, Period T40 to Period T73.

As described above, in Step X1 shown in the flow chart of FIG. 16, processing for skipping fingerprint imaging operation is performed in one region of the pixel portion 30 where the finger is not detected. That is, processing for skipping fingerprint imaging operation is performed in the pixels in the first row (m-th row) to the pixels in the p−1-th row (q+1-th row) of the pixel portion 30 in FIG. 7. The period during which the processing is performed in FIG. 18 and FIG. 19 corresponds to Period T40 to Period T47. In the period, the row driver circuit 33 does not perform fingerprint imaging operation and only performs operation of shifting the rows from the pixels in the first row (m-th row) to the pixels in the p−1-th row (q+1-th row) of the pixel portion 30. Therefore, the total processing time in the region can be set shorter than the case where fingerprint imaging operation is performed.

Next, in Step X2 shown in the flow chart in FIG. 16, processing (second mode) is performed in which the fingerprint image is read out row by row from the pixels in the p-th row (q-th row) to the pixels in the q-th row (p-th row) in a specified region of the pixel portion 30. The period during which the processing is performed in FIG. 18 and FIG. 19 corresponds to Period T48 to Period T68. In the period, the row driver circuit 33 performs both of processing of shifting the rows from the pixels in the p-th row (q-th row) to the pixels in the q-th row (p-th row) of the pixel portion 30 and fingerprint imaging operation in each row. Therefore, processing time in the region is set to a time width in consideration of the imaging operation.

In addition, as described above, in Step X3 shown in the flow chart of FIG. 16, processing for skipping fingerprint imaging operation is performed in the other region of the pixel portion 30 where the finger is not detected. That is, processing for skipping fingerprint imaging operation is performed in the pixels in the q+1-th row (p−1-th row) to the pixels in the m-th row (first row) of the pixel portion 30 in FIG. 7. The period during which the processing is performed in FIG. 18 and FIG. 19 corresponds to Period T69 to Period T73. In the period, the row driver circuit 33 does not perform fingerprint imaging operation and performs only processing of shifting the rows from the pixels in the q+1-th row (p−1-th row) to the m-th row (first row) of the pixel portion 30. Therefore, the total processing time in the region can be set shorter than the case where fingerprint imaging operation is performed.

In Period T40 to Period T73 (FIG. 19), the potential of the terminal SEL1 is a high potential and the potential of the terminal SEL2 is a low potential. In Period T40 to Period T73 (FIG. 19), the potential of the terminal SP2 is a low potential. In Period T40 to Period T73 (FIG. 18), the potentials of the terminal CLK2[1] to the terminal CLK2[4] are low potentials.

In Period T40 (FIG. 19), when a high-potential signal is supplied as a start pulse signal to the terminal SP1, the high-potential signal is output from the register circuit F[1] to the terminal FO1[1]. In addition, a low-potential signal is output from the register circuit F[1] to the terminal FFN[1]. At this time, the potential of the terminal SEL1 which is the input terminal of the selection circuit M[1] is a high potential, and the potential of the terminal SEL2 which is another input terminal of the selection circuit M[1] is a low potential; thus, the signal of the terminal FO1[1] is output to the terminal O1[1] by the selection circuit M[1]. Therefore, the potential of the terminal O1[1] is a high potential. In addition, the signal of the terminal FFN[1] is output to the terminal FN[1]. Therefore, the potential of the terminal FN[1] is a low potential. Note that in Period T40 (FIG. 18), the potentials of the terminal CLK1[1] to the terminal CLK1[4] are low potentials.

Next, in Period T41 (FIG. 18), the potential of the terminal CLK1[1] becomes a high potential. Therefore, in Period T41, the potential of the terminal FOUT[1] output from the register circuit F[1] becomes a high potential. Note that the potentials of the terminal CLK1[2] to the terminal CLK1[4] are low potentials continuously from Period T40 described above.

Period T41 to Period T47 are periods for performing the processing corresponding to Step X1 shown in the flow chart in FIG. 16. That is, Period T41 to Period T47 are periods for skipping fingerprint imaging operation in one region of the pixel portion 30 where the finger is not detected, and output signals are sequentially transmitted from the terminal CLK1 [1] to the terminal CLK1[4] in the periods. During these periods, the potentials of the terminal SL_PWC1 to the terminal SL_PWC4 and the terminal RS_PWC1 to the terminal RS_PWC4 are low potentials, and the potentials of the terminal SL[1] and the terminal RS[1] are low potentials.

In addition, in Period T42 (FIG. 18), the potential of the terminal CLK1[2] becomes a high potential. Therefore, in Period T42, the potential of the terminal FOUT[1] output from the register circuit F[1] becomes a high potential. As described above, since the signal output from the register circuit F[1] is input to the register circuit F[2] through the terminal FOUT[1], the high-potential signal is output from the register circuit F[2] to the terminal FO1[2]. However, during this period, the potentials of the terminal SL_PWC1 to the terminal SL_PWC4 and the terminal RS_PWC1 to the terminal RS_PWC4 are low potentials, and the potentials of the terminal SL[2] and the terminal RS[2] are low potentials.

In Period T43 (FIG. 18), the potential of the terminal CLK1[3] becomes a high potential. Therefore, in Period T43, the potential of the terminal FOUT[2] output from the register circuit F[2] becomes a high potential. As described above, since the signal output from the register circuit F[2] is input to the register circuit F[3] through the terminal FOUT[2], the high-potential signal is output from the register circuit F[3] to the terminal FO1[3]. However, during this period, the potentials of the terminal SL_PWC1 to the terminal SL_PWC4 and the terminal RS_PWC1 to the terminal RS_PWC4 are low potentials, and the potentials of the terminal SL[3] and the terminal RS[3] are low potentials.

In Period T44 (FIG. 18), the potential of the terminal CLK1[4] becomes a high potential. Therefore, in Period T44, the potential of the terminal FOUT[3] output from the register circuit F[3] becomes a high potential. As described above, since the signal output from the register circuit F[3] is input to the register circuit F[4] through the terminal FOUT[3], the high-potential signal is output from the register circuit F[4] to the terminal FO1[4]. However, during this period, the potentials of the terminal SL_PWC1 to the terminal SL_PWC4 and the terminal RS_PWC1 to the terminal RS_PWC4 are low potentials, and the potentials of the terminal SL[4] and the terminal RS[4] are low potentials.

Next, in Period T46 (FIG. 18), the potential of the terminal CLK1[3] becomes a high potential. Therefore, in Period T46, the potential of the terminal FOUT[3] output from the register circuit F[3] is a high potential. Here, as described above, the signal output from the register circuit F[3] is input to the register circuit F[1] in the stage before the previous stage through the terminal FOUT[3]. Therefore, in Period T46, the high-potential signal is input to the register circuit F[1]. Therefore, the potential of the terminal FO1[1] becomes a low potential with the output from the register circuit F[1]. In addition, the potential of the terminal FFN[1] becomes a high potential with the output from the register circuit F[1].

As above, when the processing described with reference to FIG. 18 and FIG. 19 is performed repeatedly in the pixels in the first row (m-th row) to the pixels in the p−1-th row (q+1-th row) of the pixel portion 30 in Step X1 shown in the flow chart in FIG. 16, the register circuit F performs only the above-described processing of shifting the rows. During this, the potentials of the terminal SL_PWC1 to the terminal SL_PWC4 and the terminal RS_PWC1 to the terminal RS_PWC4 are the low potentials, and the potentials of all the terminals SL and the potentials of all the terminals RS are the low potentials, so that imaging operation is not performed.

Next, Period T48 to Period T68 in which processing of Step X2 shown in the flow chart in FIG. 16 is performed will be described. As described above, in these periods, the fingerprint image is read out row by row from the pixels in the p-th row (q-th row) to the pixels in the q-th row (p-th row) in a specified region of the pixel portion 30. Note that for description convenience, description is made assuming that the terminal SL[5] in the structure example of the row driver circuit 33 shown in FIG. 3 is electrically connected to the pixels 31 in the q-th row of the pixel portion 30.

First, in Period T48 (FIG. 18), the potential of the terminal CLK1[1] becomes a high potential. Therefore, in Period T48, the potential of the terminal FOUT[5] output from the register circuit F[5] becomes a high potential.

In Period T48 to Period T49 (FIG. 18), the potential of the terminal SL_PWC1 is a high potential. Here, the potential of the terminal O1[5] is a high potential and the potential of the terminal FN[5] is a low potential continuously from Period T47 described above; thus, the potential of the terminal SL[5] is a high potential with the output from the signal supply circuit B[5]. That is, a selection signal is output to the terminal SL[5]. Next, in Period T50 (FIG. 18), when the potential of the terminal SL_PWC1 becomes a low potential, the potential of the terminal SL[5] becomes a low potential with the output from the signal supply circuit B[5]. Note that in Period T48 to Period T49 (FIG. 18), the potentials of the terminal SL_PWCS2 to the terminal SL_PWC4 are low potentials.

In addition, in Period T49 (FIG. 18), the potential of the terminal RS_PWC1 becomes a high potential. Here, the potential of the terminal O1[5] is a high potential and the potential of the terminal FN[1] is a low potential continuously from Period T47 described above; thus, the potential of the terminal RS[5] becomes a high potential with the output from the signal supply circuit B[5]. That is, a reset signal is output to the terminal RS[5]. Next, in Period T50 (FIG. 18), the potential of the terminal RS_PWC1 becomes a low potential. Thus, the potential of the terminal RS[5] becomes a low potential with the output from the signal supply circuit B[5]. Note that in Period T49 (FIG. 18), the potentials of the terminal RS_PWC2 to the terminal RS_PWC4 are low potentials.

In Period T50 (FIG. 18), the potentials of the terminal CLK1[1] and the terminal CLK1[2] become high potentials. Therefore, in Period T50, the potential of the terminal FOUT[5] output from the register circuit F[5] becomes a high potential. As described above, since the signal output from the register circuit F[5] is input to the register circuit F[6] through the terminal FOUT[5], the high-potential signal is output from the register circuit F[6] to the terminal FO1[6]. In addition, the low-potential signal is output from the register circuit F[6] to a terminal FFN[6]. Here, in Period T50 (FIG. 19), the potential of the terminal SEL1 is a high potential and the potential of the terminal SEL2 is a low potential. Therefore, the selection circuit M[6] electrically connected to the terminal SEL1 and the terminal SEL2 outputs the signal, which is output from the register circuit F[6] to the terminal FO1[6], to the terminal O1[6]. Therefore, the potential of the terminal O1[6] becomes a high potential. In addition, the signal output from the register circuit F[6] to the terminal FFN[6] is output to the terminal FN[6]. Therefore, the potential of the terminal FN[6] becomes a low potential.

In addition, in Period T50 to Period T51 (FIG. 18), the potential of the terminal SL_PWC2 becomes a high potential. Here, the potential of the terminal O1[6] is a high potential and the potential of the terminal FN[6] is a low potential continuously from Period T48 described above; thus, the potential of the terminal SL[6] becomes a high potential with the output from the signal supply circuit B[6]. That is, a selection signal is output to the terminal SL[6]. Next, in Period T52 (FIG. 18), the potential of the terminal SL_PWC2 becomes a low potential; thus, the potential of the terminal SL[6] becomes a low potential with the output from the signal supply circuit B[6]. Note that in Period T50 to Period T51 (FIG. 18), the potentials of the terminal SL_PWC1 and the terminals SL_PWC3 and SL_PWC4 are low potentials.

In addition, in Period T51 (FIG. 18), the potential of the terminal RS_PWC2 becomes a high potential. Here, the potential of the terminal O1[6] is a high potential and the potential of the terminal FN[6] is a low potential continuously from Period T48 described above; thus, the potential of the terminal RS[6] becomes a high potential with the output from the signal supply circuit B[6]. That is, a reset signal is output to the terminal RS[6]. Next, in Period T52 (FIG. 18), the potential of the terminal RS_PWC2 becomes a low potential. Therefore, the potential of the terminal RS[6] becomes a low potential with the output from the signal supply circuit B[6]. Note that in Period T51 (FIG. 18), the potentials of the terminal RS_PWC1, the terminal RS_PWC3, and the terminal RS_PWC4 are low potentials.

As describe above, in Period T50, the potential of the terminal FOUT[5] output from the register circuit F[5] becomes a high potential. As described above, the signal output from the register circuit F[5] is input to the register circuit F[6] through the terminal FOUT[5]. The signal output from the register circuit F[6] is input to the terminal FOUT[6]. Therefore, in Period T50, the potential of the terminal FOUT[6] becomes a high potential. Similarly, the signal output from the register circuit F[6] is input to a register circuit F[7] through the terminal FOUT[6]. Thus, the high-potential signal is output from the register circuit F[7] to the terminal FO1[7]. Furthermore, the low-potential signal is output from the register circuit F[7] to the terminal FFN[7]. Here, in Period T50 (FIG. 19), the potential of the terminal SEL1 is a high potential and the potential of the terminal SEL2 is a low potential. Therefore, the selection circuit M[7] electrically connected to the terminal SEL1 and the terminal SEL2 outputs the signal, which is output from the register circuit F[7] to the terminal FO1[7], to the terminal O1[7]. Thus, the potential of the terminal O1[7] becomes a high potential. In addition, the signal output from the register circuit F[7] to the terminal FFN[7] is output to the terminal FN[7]. Thus, the potential of the terminal FN[7] becomes a low potential.

Next, in Period T52 to Period T55 (FIG. 18), the potential of the terminal CLK1[3] becomes a high potential. Therefore, in Period T52 to Period T55, the potential of the terminal FOUT[7] output from the register circuit F[7] becomes a high potential. Here, as described above, the signal output from the register circuit F[7] is input to the register circuit F[5] in the stage before the previous stage through the terminal FOUT[7]. Therefore, in Period T52 to Period T55, the high-potential signal is input to the register circuit F[5]. Therefore, the potential of the terminal FO1[5] becomes a low potential with the output from the register circuit F[5]. In addition, the potential of the terminal FFN[5] becomes a high potential with the output from the register circuit F[5].

In this manner, the processing corresponding to Step X2 shown in the flow chart in FIG. 16, that is, the reading operation of the fingerprint image in the specified region in the pixel portion 30 (the region including the pixels in the p-th row (q-th row) to the q-th row (p-th row) in the pixel portion 30), is performed repeatedly, whereby scan signals can be sequentially supplied to the pixels 31. That is, in Period T47, when a high potential is input to a register circuit F[p] from a register circuit F[p−1] in the previous stage of the register circuit F[p] through a terminal FOUT [p−1], scan signals are supplied to a selection circuit M[p] and a signal supply circuit B[p]. After that, the scan signals are sequentially supplied to the register circuit F[p] to a register circuit F[q], the selection circuit M[p] to a selection circuit M[q], and the signal supply circuit B[p] to a signal supply circuit B[q]. In response to the scan signals, selection signals are output to a terminal SL[p] to a terminal SL[q] sequentially, and reset signals are output to a terminal RS[p] to a terminal RS[q] sequentially. Thus, captured-image data can be sequentially read out from the pixels 31 in the p-th row to the q-th row of the pixel portion 30. Note that in the driving method illustrated in FIG. 7 (FIG. 17), the start pulse signal is not input to the terminal SP2.

The processing corresponding to Step X3 shown in the flow chart in FIG. 16, that is, the processing of skipping imaging operation in the other region of the pixel portion where the finger is not detected (the region including the pixels in the q+1-th row (p−1-th row) to the m-th row (first row) of the pixel portion 30) will be described below.

In Period T69 (FIG. 18), the potential of the terminal CLK1[1] becomes a high potential. Therefore, in Period T69, the high potential of a terminal FOUT[q] output from the register circuit F[q] is input to a register circuit F[q+1], and the potential of the terminal FOUT[1] output from the register circuit F[q+1] becomes a high potential.

Period T69 to Period T73 are periods for performing the processing corresponding to Step X3 shown in the flow chart in FIG. 16. That is, Period T69 to Period T73 are periods for skipping fingerprint imaging operation in the other region of the pixel portion 30 where the finger is not detected, and output signals are sequentially transmitted from the terminal CLK1[1] to the terminal CLK1[4] in these periods. During these periods, the potentials of the terminal SL_PWC1 to the terminal SL_PWC4 and the terminal RS_PWC1 to the terminal RS_PWC4 are low potentials, and the potentials of a terminal SL[q+1] and a terminal RS[q+1] are low potentials.

In addition, in Period T70 (FIG. 18), the potential of the terminal CLK1[2] becomes a high potential. Therefore, in Period T70, the potential of a terminal FOUT[q+1] output from the register circuit F[q+1] becomes a high potential. As described above, since the signal output from the register circuit F[q+1] is input to a register circuit F[q+2] through the terminal FOUT[q+1], the high-potential signal is output from the register circuit F[q+2] to a terminal FO1[q+2]. However, during this period, the potentials of the terminal SL_PWC1 to the terminal SL_PWC4 and the terminal RS_PWC1 to the terminal RS_PWC4 are the low potentials, and the potentials of a terminal SL[q+2] and a terminal RS[q+2] are low potentials.

In Period T71 (FIG. 18), the potential of the terminal CLK1[3] becomes a high potential. Therefore, in Period T71, the potential of a terminal FOUT[q+2] output from the register circuit F[q+2] becomes a high potential. As described above, since the signal output from the register circuit F[q+2] is input to a register circuit F[q+3] through the terminal FOUT[q+2], the high-potential signal is output from the register circuit F[q+3] to a terminal FO1[q+3]. However, during this period, the potentials of the terminal SL_PWC1 to the terminal SL_PWC4 and the terminal RS_PWC1 to the terminal RS_PWC4 are the low potentials, and the potentials of a terminal SL[q+3] and a terminal RS[q+3] are low potentials.

In Period T72 (FIG. 18), the potential of the terminal CLK1[4] becomes a high potential. Therefore, in Period T72, the potential of a terminal FOUT[q+3] output from the register circuit F[q+3] becomes a high potential. As described above, since the signal output from the register circuit F[q+3] is input to a register circuit F[q+4] through the terminal FOUT[q+3], the high-potential signal is output from the register circuit F[q+4] to a terminal FO1[q+4]. However, during this period, the potentials of the terminal SL_PWC1 to the terminal SL_PWC4 and the terminal RS_PWC1 to the terminal RS_PWC4 are the low potentials, and the potentials of a terminal SL[q+4] and a terminal RS[q+4] are low potentials.

In this manner, in Step X3 shown in the flow chart in FIG. 16, when the operation described with reference to FIG. 18 and FIG. 19 (which is similar to the operation in Step X1 shown in the flow chart in FIG. 16) is performed repeatedly from the q+1-th row (p−1-th row) to the m-th row (first row) of the pixel portion 30, the register circuit F performs only the above-described operation of shifting the rows. During this, the potentials of the terminal SL_PWC1 to the terminal SL_PWC4 and the terminal RS_PWC1 to the terminal RS_PWC4 are the low potentials, and the potentials of all the terminals SL and the potentials of all the terminals RS are the low potentials, so that imaging operation is not performed.

As described above, when the row driver circuit 33 performs the operation illustrated in FIG. 18 and FIG. 19 in the readout period, the semiconductor device of one embodiment of the present invention can perform authentication such as fingerprint authentication.

Figure 20:
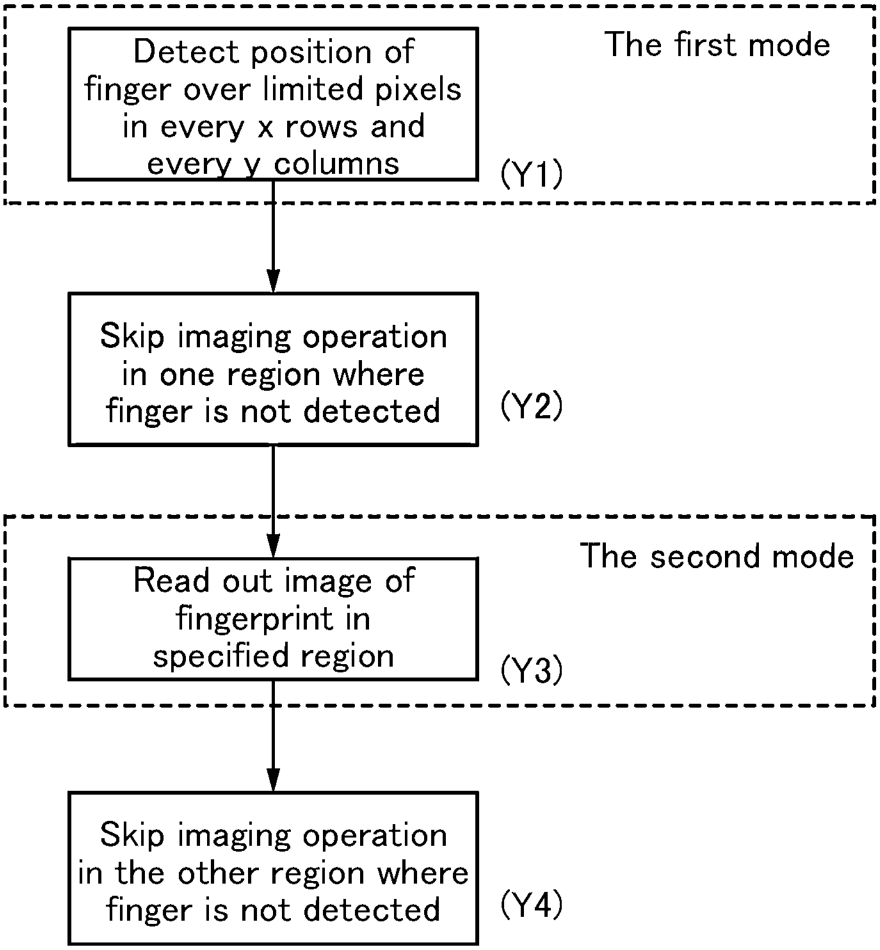
FIG. 20 is a flow chart showing an example of a driving method for a row driver circuit.

FIG. 20 is a flow chart showing another example of the driving method of the row driver circuit 33 of one embodiment of the present invention and is different from the flow chart shown in FIG. 16. The semiconductor device of one embodiment of the present invention can perform the user's fingerprint authentication in a short time by the driving method.

First, the position of the user's finger is detected in Step Y1. For example, in FIG. 6, the position of the user's finger 70 over the pixel portion 30 is detected. That is, Step Y1 is the driving method illustrated in FIG. 6 and is the first mode.

Here, the pixel portion 30 is composed of the pixels arranged in a matrix of m rows and n columns as described in <Structure example of imaging apparatus>. Accordingly, the detection of the position of the finger 70 over the pixel portion 30 means the detection of the finger 70 over the pixels in the p-th to q-th rows (p and q are integers greater than or equal to 1 and less than or equal to m) of the pixel portion 30.

Note that as described above, the processing of detecting the position of the user's finger is not necessarily performed overall the pixels 31 in the pixel portion 30 in Step Y1. For example, the process is preferably performed on a limited number of pixels in every x rows and every y columns (x and y are integers greater than or equal to 1 and less than or equal to q-p) of the pixels 31 included in the pixel portion 30. Accordingly, the position of the user's finger can be detected in a short time as compared with the case where the process is performed on all the pixels 31 in the pixel portion 30.

Next, in Step Y2, processing for skipping fingerprint imaging operation is performed in one region of the pixel portion 30 where the finger is not detected (which can also be referred to as one region of the first pixel portion that does not overlap with the second pixel portion). For example, in FIG. 7, the region where the finger is not detected is a region including the pixels in the first to p−1-th rows of the pixel portion 30 and a region including the pixels in the q+1-th to m-th rows of the pixel portion 30. Therefore, in Step Y2, processing for skipping fingerprint imaging operation is performed in the pixels in the first row (m-th row) to the pixels in the p−1-th row (q+1-th row) of the pixel portion 30.

Next, in Step Y3, the fingerprint image is read out row by row from the pixels in the p-th row (q-th row) to the pixels in the q-th row (p-th row) in a specified region of the pixel portion 30. As described with reference to FIG. 1, the semiconductor device 10 of one embodiment of the present invention includes the light-emitting apparatus and the imaging apparatus, and the imaging apparatus detects light emitted from the light-emitting apparatus and then reflected by a finger or the like. Thus, in Step Y2, the pixels, which detect light emitted from the light-emitting apparatus and then reflected by a finger, can capture an image of the fingerprint of the finger and the captured-image data can be read out.

Step Y3 is the driving method illustrated in FIG. 7 and the second mode.

Next, in Step Y4, processing for skipping fingerprint imaging operation is performed in the other region of the pixel portion 30 where the finger is not detected (which can also be referred to as the other region of the first pixel portion not overlapping with the second pixel portion), that is, in the pixels in the q+1-th row (p−1-th row) to the pixels in the m-th row (first row) of the pixel portion 30.

In this manner, in the driving method of one embodiment of the present invention, the position of the user's finger is detected in the first mode (Step Y1), and the fingerprint image is read out from only part of the region of the pixel portion 30 in the second mode (Step Y3). The fingerprint image is not read out from the region where the finger is not detected, and processing for shifting the rows of the pixels included in the region is performed (Step Y2 and Step Y4). That is, the flow chart shown in FIG. 20 is different from the flow chart shown in FIG. 16 in that the first mode is performed first.

Figure 21:
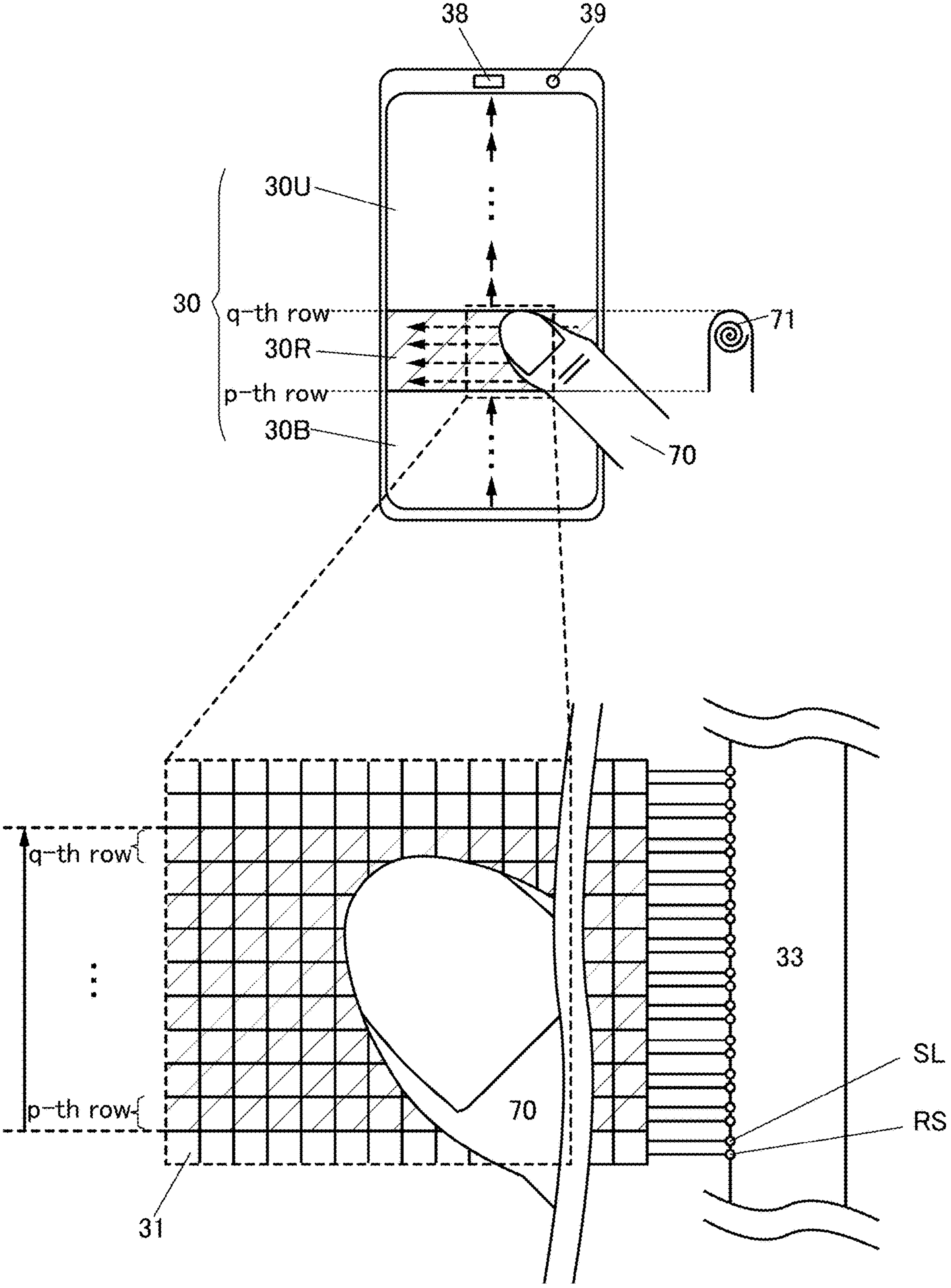
FIG. 21 is a schematic view illustrating an example of a driving method for a row driver circuit.

FIG. 21 is a schematic view illustrating the example of the driving method of the row driver circuit 33 described with reference to the flow chart in FIG. 20.

In FIG. 21, the pixel portion 30 includes the pixel portion 30B, the pixel portion 30R, and the pixel portion 30U.

The pixel portion 30B is one region adjacent to the pixel portion 30R in the pixel portion 30, and is a region including the pixels in the first to p−1-th rows in the pixel portion 30.

The pixel portion 30U is the other region adjacent to the pixel portion 30R in the pixel portion 30, and is a region including the pixels in the q+1-th to m-th rows in the pixel portion 30.

Although the specified region in which the position of the finger is detected and which corresponds to the pixel portion 30F in FIG. 17 is not illustrated in FIG. 21, one embodiment of the present invention is not limited thereto. In one embodiment of the present invention, the pixel portion 30 in FIG. 21 may include the specified region in which the position of the finger is detected and the first mode may be performed in the specified region.

As described above, after the position of the user's finger is detected in the first mode (Step Y1), processing for skipping fingerprint imaging operation is performed in one region of the pixel portion 30 where the finger is not detected, that is, in the pixels in the first row (m-th row) to the pixels in the p−1-th row (q+1-th row) of the pixel portion 30, in Step Y2. That is, in the pixel portion 30B (the pixel portion 30U), the readout of the fingerprint image is not performed, and only the processing for skipping the imaging operation and shifting the rows are performed.

As described above, after the user's fingerprint image is read out from the pixel portion 30R in the second mode (Step Y3), processing for skipping fingerprint imaging operation is performed in the other region of the pixel portion 30 where the finger is not detected, that is, in the pixels in the q+1-th row (p−1-th row) to the pixels in the m-th row (first row) of the pixel portion 30, in Step Y4. That is, in the pixel portion 30U (the pixel portion 30B), the readout of the fingerprint image is not performed, and only the processing for skipping the imaging operation and shifting the rows are performed.

That is, in the driving method of one embodiment of the present invention, the first mode is performed on a limited number of pixels in every x rows and every y columns of the pixels 31 included in the pixel portion 30, and then the second mode is performed only on the pixel portion 30R after. In this manner, the region from which the fingerprint image is read out is limited to part of the pixel portion 30, so that a frame frequency for the readout of the fingerprint image by the row driver circuit 33 can be increased as compared with the case where the fingerprint image is read out from the entire pixel portion. Thus, fingerprint authentication can be performed in a short time.

Structure Example_2 of Semiconductor Device

Figure 22:
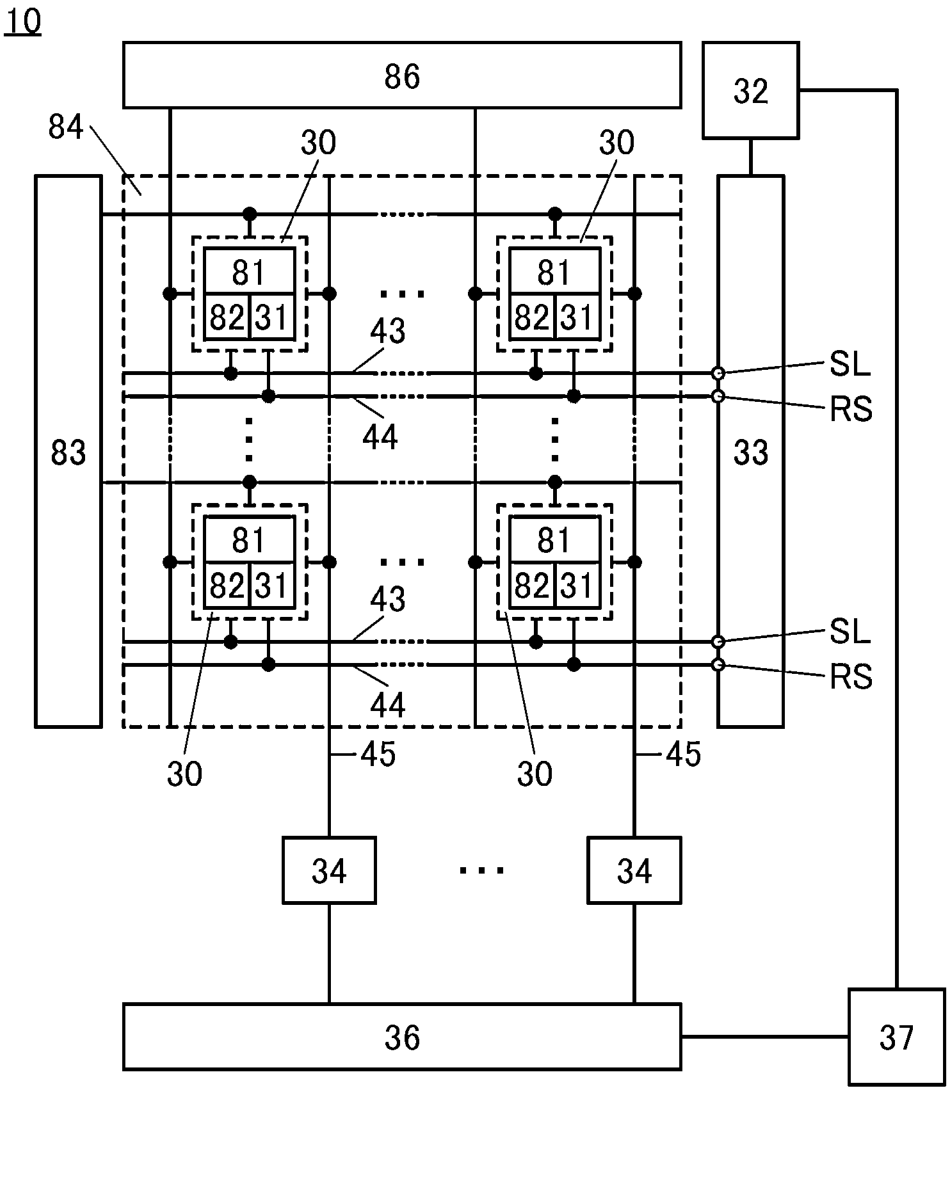
FIG. 22 is a block diagram illustrating a configuration example of a semiconductor device.

FIG. 22 is a block diagram illustrating a structure example of the semiconductor device 10. The semiconductor device 10 includes the light-emitting apparatus 13 and the imaging apparatus 15 as illustrated in FIG. 1A. Note that the boundary between the light-emitting apparatus 13 and the imaging apparatus 15 is not illustrated in FIG. 22, but the semiconductor device 10 in FIG. 22 includes the imaging apparatus 15 in FIG. 2A. Thus, the description of the components illustrated in FIG. 2A is omitted here as appropriate.

The semiconductor device 10 includes a pixel portion 84 in which the pixel portions 30 are arranged in a matrix. Furthermore, the semiconductor device 10 includes a gate driver circuit 83 and a data driver circuit 86 in addition to the control circuit 32, the row driver circuit 33, the CDS circuit 34, the readout circuit 36, and the detection circuit 37.

Each of the pixel portion 30 can include a pixel 81 and a pixel 82 in addition to the pixel 31. For example, the pixel 81 has a function of emitting light for displaying an image on the pixel portion 84. The pixel 82 has a function of emitting light toward a detection target. In other words, the pixel 82 has a function of emitting the light 23 illustrated in FIG. 1A, FIG. 1, and the like. Here, the pixel 81, the pixel 82, and the pixel 31 can be referred to as subpixels.

The pixel 31 includes a light-emitting element (also referred to as a light-emitting device) that emits visible light, for example. The pixel 82 includes a light-emitting element that emits infrared light.

As each of the light-emitting elements, an EL element such as an OLED (Organic Light Emitting Diode) or a QLED (Quantum-dot Light Emitting Diode) is preferably used. Examples of a light-emitting substance contained in the EL element include a substance emitting fluorescent light (a fluorescent material), a substance emitting phosphorescent light (a phosphorescent material), a substance exhibiting thermally activated delayed fluorescence (a thermally activated delayed fluorescence (TADF) material), and an inorganic compound (such as a quantum dot material). An LED such as a micro-LED (Light Emitting Diode) can be used as the light-emitting element.

The gate driver circuit 83 is electrically connected to the pixel 81 and the pixel 82 through gate lines. The data driver circuit 86 is electrically connected to the pixel 81 and the pixel 82 through data lines.

The gate driver circuit 83 has a function of selecting the pixel 81 and the pixel 82 to which data showing the emission intensity of the light-emitting elements are to be written. The data driver circuit 86 has a function of generating data showing the emission intensity of the light-emitting element included in the pixel 81 and data showing the emission intensity of the light-emitting element included in the pixel 82. The gate driver circuit 83 and the data driver circuit 86 are driver circuits for driving the pixel 81 and the pixel 82.

Note that a driver circuit for driving the pixel 81 and a driver circuit for driving the pixel 82 may be separately provided. The function of the pixel 82 is mainly to emit light toward a detection target. Accordingly, all of the pixels 82 may emit light with the same luminance, for example. In this case, a driver circuit for driving the pixel 82 can have a simple structure without a highly functional sequential circuit or the like.

Figure 23:
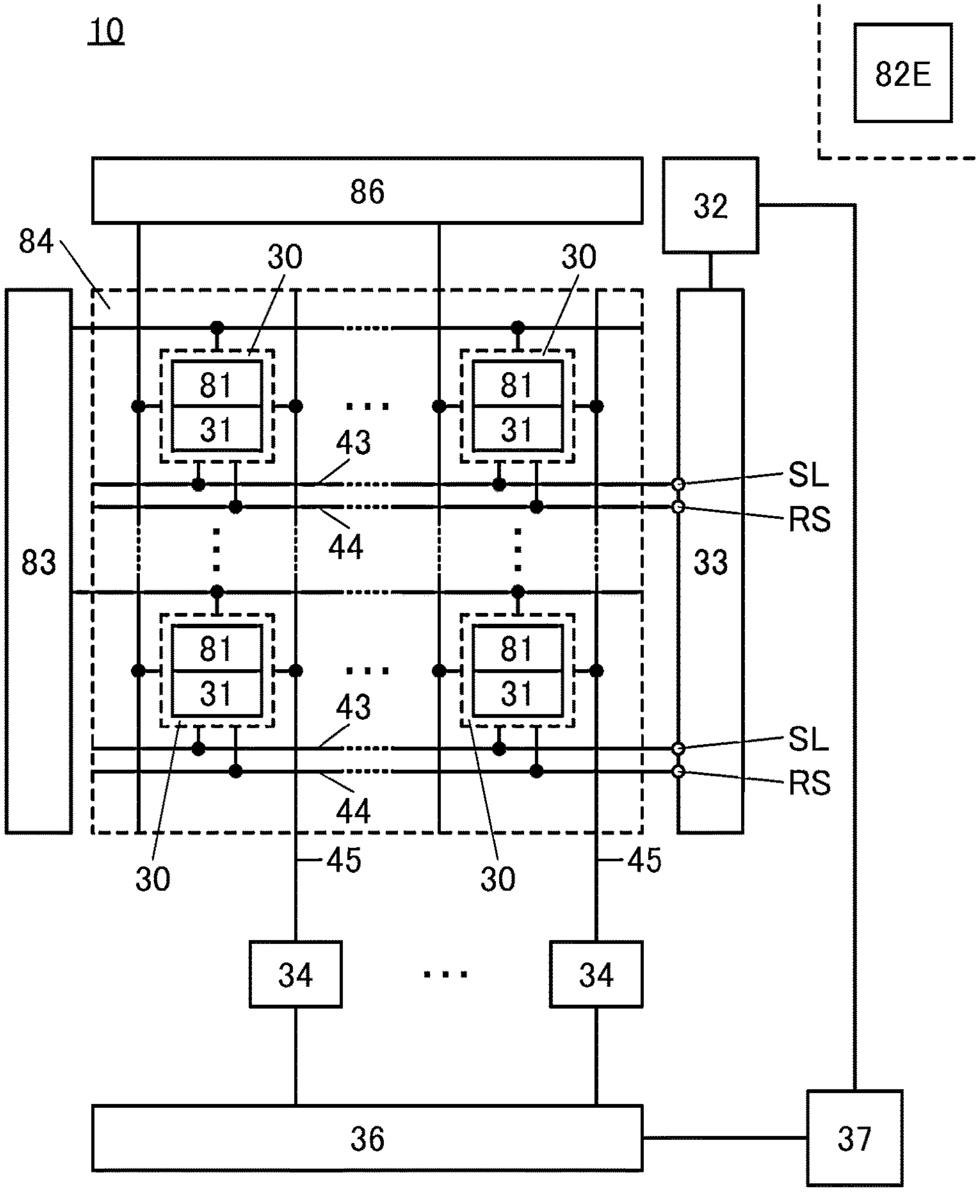
FIG. 23 is a block diagram illustrating a configuration example of a semiconductor device.

FIG. 23 is a block diagram illustrating a structure example of the semiconductor device 10, which is a variation example of the semiconductor device 10 illustrated in FIG. 22. The semiconductor device 10 in FIG. 23 is different from the semiconductor device 10 illustrated in FIG. 22 in that the pixel portions 30 include no pixels 82.

In the semiconductor device 10 illustrated in FIG. 23, a light source 82E that emits light toward a detection target is provided outside the pixel portion 84. As the light source 82E, an LED or the like that emits near-infrared light with high luminance can be used. Since the light source 82E is provided outside the pixel portion 84, the light source 82E can be turned on by control different from the control for the semiconductor device 10.

The arrangement position and the number of the light source 82E illustrated in FIG. 23 are just an example and are not limited thereto. The light source 82E is one component of a device in which the semiconductor device 10 is provided. Alternatively, the light source 82E may be a different device from the semiconductor device 10.

Note that the structure of the pixel portion 30 is not limited to the structures illustrated in FIG. 22 and FIG. 23, and a variety of arrangement modes can be employed.

Structure Example_2 of Pixel

Figure 24A:
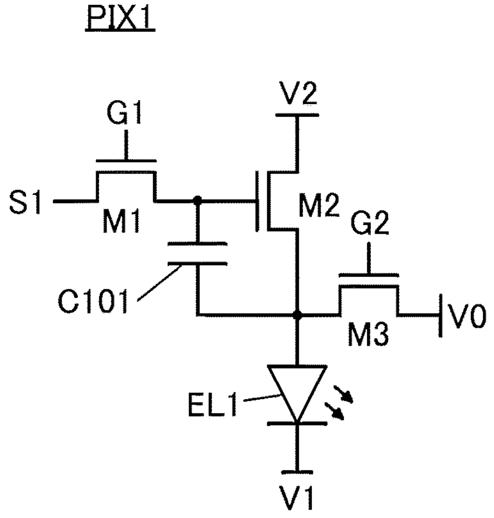
FIG. 24A to FIG. 24C are circuit diagrams each illustrating a configuration example of a pixel.

FIG. 24A is a circuit diagram illustrating a structure example of a pixel circuit PIX1 that can be used for the pixel 81 and the pixel 82. The pixel circuit PIX1 includes a light-emitting element EL1, a transistor M1, a transistor M2, a transistor M3, and a capacitor C101. Here, an example in which a light-emitting diode is used as the light-emitting element EL1 is illustrated. An organic EL element that emits visible light or an organic EL element that emits infrared light is preferably used as the light-emitting element EL1.

One of a source and a drain of the transistor M1 is electrically connected to a wiring Si. The other of the source and the drain of the transistor M1 is electrically connected to a gate of the transistor M2 and one electrode of the capacitor C101. A gate of the transistor M1 is electrically connected to a wiring G1. One of a source and a drain of the transistor M2 is electrically connected to a wiring V2. The other of the source and the drain of the transistor M2 is electrically connected to an anode of the light-emitting element EL1, the other electrode of the capacitor C101, and one of a source and a drain of the transistor M3. The other of the source and the drain of the transistor M3 is electrically connected to a wiring V0. A gate of the transistor M3 is electrically connected to a wiring G2. A cathode of the light-emitting element EL1 is electrically connected to a wiring V1.

The wiring G1 and the wiring G2 can be electrically connected to the gate driver circuit 83 illustrated in FIG. 22 and FIG. 23. The wiring Si can be electrically connected to the data driver circuit 86 illustrated in FIG. 22 and FIG. 23.

A constant potential is supplied to each of the wiring V1 and the wiring V2. Light emission can be performed when the anode side of the light-emitting element EL1 is set to a high potential and the cathode side is set to a low potential. The transistor M1 is controlled by a signal supplied to the wiring G1 and functions as a selection transistor for controlling a selection state of the pixel circuit PIX1. The transistor M2 functions as a driving transistor that controls a current flowing through the light-emitting element EL1 in accordance with a potential supplied to the gate.

When the transistor M1 is turned on, a potential supplied to the wiring Si is supplied to the gate of the transistor M2, and the emission luminance of the light-emitting element EL1 can be controlled in accordance with the potential. The transistor M3 is controlled by a signal supplied to the wiring G2. When the transistor M3 is turned on, the potential between the transistor M3 and the light-emitting element EL1 can be reset to a constant potential supplied from the wiring V0. Thus, a potential can be written to the gate of the transistor M2 in a state where the source potential of the transistor M2 is stabilized.

Figure 24B:
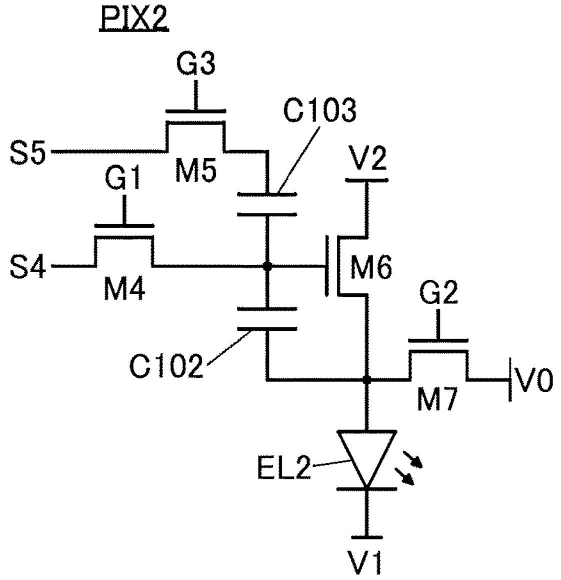

FIG. 24B illustrates an example of a pixel circuit PIX2 which is different from the pixel circuit PIX1. The pixel circuit PIX2 has a function of boosting a voltage. The pixel circuit PIX2 includes a light-emitting element EL2, a transistor M4, a transistor M5, a transistor M6, a transistor M7, a capacitor C102, and a capacitor C103. Here, an example in which a light-emitting diode is used as the light-emitting element EL2 is illustrated.

One of a source and a drain of the transistor M4 is electrically connected to a wiring S4. The other of the source and the drain of the transistor M4 is electrically connected to a gate of the transistor M6, one electrode of the capacitor C102, and one electrode of the capacitor C103. A gate of the transistor M4 is electrically connected to the wiring G1. One of a source and a drain of the transistor M5 is electrically connected to a wiring S5. The other of the source and the drain of the transistor M5 is electrically connected to the other electrode of the capacitor C103. A gate of the transistor M5 is electrically connected to a wiring G3.

One of a source and a drain of the transistor M6 is electrically connected to the wiring V2. The other of the source and the drain of the transistor M6 is electrically connected to one of a source and a drain of the transistor M7, the other electrode of the capacitor C102, and an anode of the light-emitting element EL2. The other of the source and the drain of the transistor M7 is electrically connected to the wiring V0. A gate of the transistor M7 is electrically connected to the wiring G2. A cathode of the light-emitting element EL2 is electrically connected to the wiring V1.

The wiring G1 to the wiring G3 can be electrically connected to the gate driver circuit 83 illustrated in FIG. 22 and FIG. 23. The wiring S4 and the wiring S5 can be electrically connected to the data driver circuit 86 illustrated in FIG. 22 and FIG. 23.

The transistor M4 is controlled by a signal supplied to the wiring G1, and the transistor M5 is controlled by a signal supplied to the wiring G3. The transistor M6 functions as a driving transistor that controls a current flowing through the light-emitting element EL2 in accordance with a potential supplied to the gate.

The emission luminance of the light-emitting element EL2 can be controlled in accordance with the potential supplied to the gate of the transistor M6. The transistor M7 is controlled by a signal supplied to the wiring G2. When the transistor M7 is turned on, the potential between the transistor M6 and the light-emitting element EL2 can be reset to a constant potential supplied from the wiring V0. Thus, a potential can be written to the gate of the transistor M6 in the state where the source potential of the transistor M6 is stabilized. In addition, when the potential supplied from the wiring V0 is set to the same potential as the potential of the wiring V1 or a potential lower than that of the wiring V1, light emission of the light-emitting element EL2 can be inhibited.

The function of boosting a voltage, which the pixel circuit PIX2 has, will be described below.

First, a potential "D1" of the wiring S4 is supplied to the gate of the transistor M6 through the transistor M4, and at timing overlapping with this, a reference potential "$V_{ref}$" is supplied to the other electrode of the capacitor C103 through the transistor M5. At this time, "$D1-V_{ref}$" is held in the capacitor C103. Next, the gate of the transistor M6 is set to be floating, and a potential "D2" of the wiring S5 is supplied to the other electrode of the capacitor C103 through the transistor M5. Here, the potential "D2" is a potential for addition.

At this time, the potential of the gate of the transistor M6 is $D1+((C_3/(C_3+C_2+C_{M6}))\times(D2-V_{ref}))$, where $C_3$ is the capacitance value of the capacitor C103, $C_2$ is the capacitance value of the capacitor C102, and $C_{M6}$ is the capacitance value of the gate of the transistor M6. Here, assuming that the value of $C_3$ is sufficiently larger than the value of $C_2+C_{M6}$, $C_3/(C_3+C_2+C_{M6})$ approximates 1. Thus, it can be said that the potential of the gate of the transistor M6 approximates "$D1+(D2-V_{ref})$". Then, when D1=D2 and $V_{ref}=0$, "$D1+(D2-V_{ref}))$"="2D1".

That is, when the circuit is designed appropriately, a potential approximately twice the potential that can be input from the wiring S4 or S5 can be supplied to the gate of the transistor M6.

Owing to such an action, a high voltage can be generated even when a general-purpose driver IC is used. Thus, the voltage to be input can be low and power consumption can be reduced.

Figure 24C:
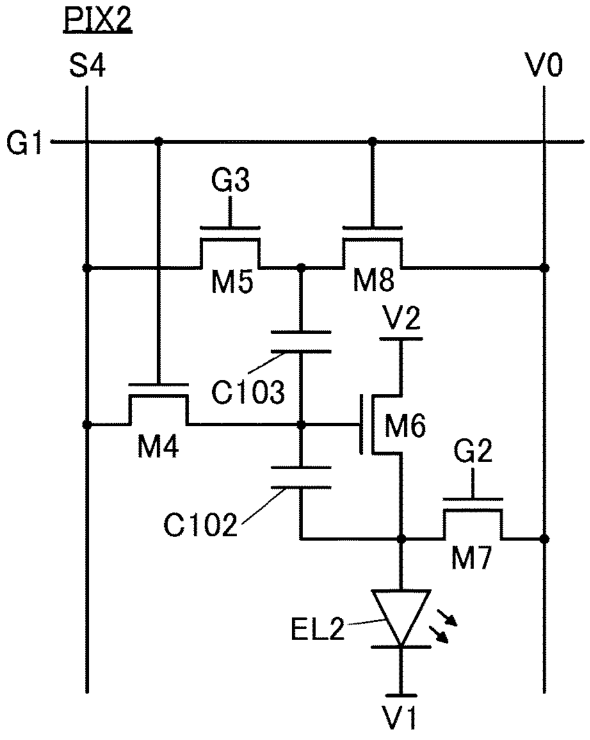

Alternatively, the pixel circuit PIX2 may have a structure illustrated in FIG. 24C. The pixel circuit PIX2 illustrated in FIG. 24C differs from the pixel circuit PIX2 illustrated in FIG. 24B in including a transistor M8. In the pixel circuit PIX2 in FIG. 24C, one of a source and a drain of the transistor M8 is electrically connected to the other of the source and the drain of the transistor M5 and the other electrode of the capacitor C103. The other of the source and the drain of the transistor M8 is electrically connected to the wiring V0. A gate of the transistor M8 is electrically connected to the wiring G1. One of the source and the drain of the transistor M5 is electrically connected to the wiring S4.

As described above, in the pixel circuit PIX2 illustrated in FIG. 24B, the operations of supplying the reference potential and the potential for addition to the other electrode of the capacitor C103 through the transistor M5 are performed. In this case, the two wirings S4 and S5 are necessary and the reference potential and the potential for addition need to be rewritten alternately in the wiring S5.

In the pixel circuit PIX2 illustrated in FIG. 24C, although the transistor M8 is additionally provided, the wiring S5 can be omitted because a dedicated path for supplying the reference potential is provided. Furthermore, since the gate of the transistor M8 can be connected to the wiring G1 and the wiring V0 can be used as a wiring for supplying the reference potential, the number of wirings connected to the transistor M8 does not increase. Moreover, alternate rewriting of the reference potential and the potential for addition is not performed in one wiring, which makes it possible to achieve high-speed operation with low power consumption.

Note that in FIG. 24B and FIG. 24C, "D1B", an inversion potential of "D1", may be used as the reference potential "$V_{ref}$". In this case, a potential approximately three times the potential that can be input from the wiring S4 or the wiring S5 can be supplied to the gate of the transistor M6. Note that the inversion potential refers to a potential such that the absolute value of the difference between the potential and a reference potential is the same (or substantially the same) as that of the difference between the original potential and the reference potential, and the potential is different from the original potential. The relation $V_0$=(D1+D1B)/2 is satisfied, where "D1" is the original potential, "D1B" is the inversion potential, and $V_0$ is the reference potential.

In the semiconductor device of one embodiment of the present invention, the light-emitting element may be made to emit light in a pulsed manner for displaying an image. A reduction in the driving time of the light-emitting element can reduce the power consumption of the semiconductor device and suppress heat generation of the semiconductor device. An organic EL element is particularly preferable because of its favorable frequency characteristics. The frequency can be higher than or equal to 1 kHz and lower than or equal to 100 MHz, for example.

Structure Example_3 of Semiconductor Device

Figure 25:
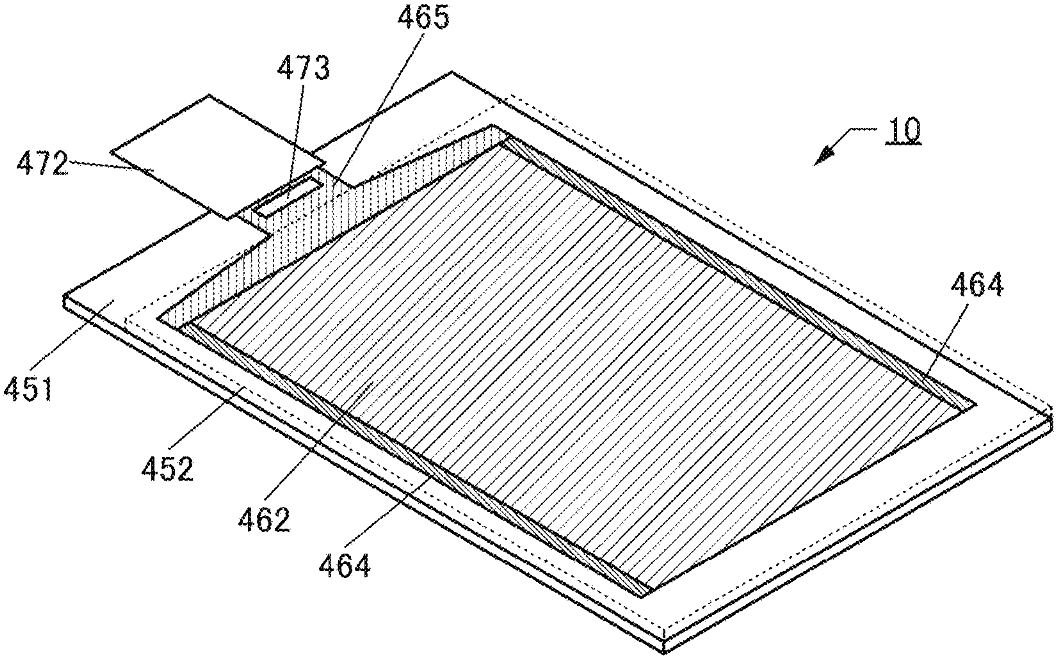
FIG. 25 is a perspective view illustrating a structure example of a semiconductor device.
Figure 26A:
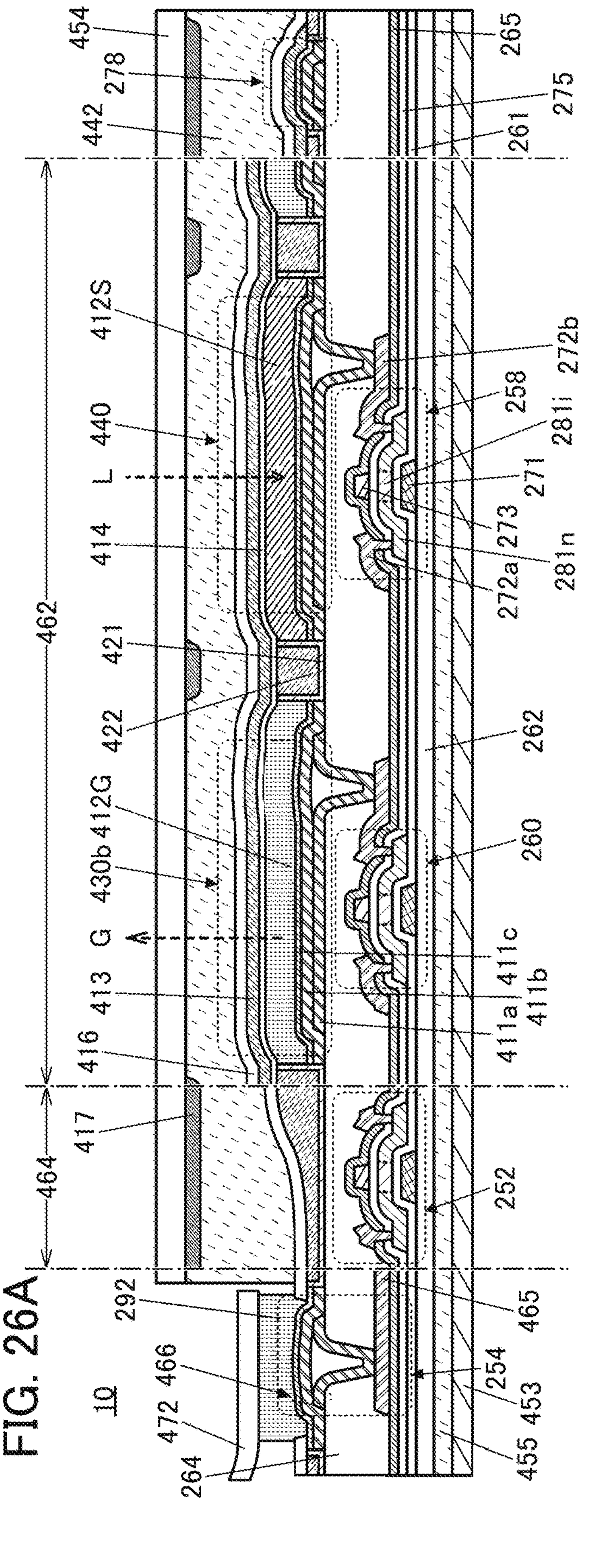
FIG. 26A is a cross-sectional view illustrating a structure example of a semiconductor device.

FIG. 25 is a perspective view of the semiconductor device 10, and FIG. 26A is a cross-sectional view of the semiconductor device 10.

The semiconductor device 10 has a structure in which a substrate 452 and a substrate 451 are bonded to each other. In FIG. 25, the substrate 452 is denoted by a dashed line.

The semiconductor device 10 includes a display portion 462, a circuit 464, a wiring 465, and the like. FIG. 25 illustrates an example in which an IC 473 and an FPC 472 are mounted on the semiconductor device 10. Thus, the structure illustrated in FIG. 25 can be regarded as a display module including the semiconductor device 10, the IC (integrated circuit), and the FPC.

As the circuit 464, a scan line driver circuit can be used, for example.

The wiring 465 has a function of supplying a signal and power to the display portion 462 and the circuit 464. The signal and power are input to the wiring 465 from the outside through the FPC 472 or input to the wiring 465 from the IC 473.

FIG. 25 illustrates an example where the IC 473 is provided over the substrate 451 by a COG (Chip On Glass) method, a COF (Chip On Film) method, or the like. An IC including a scan line driver circuit, a signal line driver circuit, or the like can be used as the IC 473, for example. Note that the semiconductor device 10 and the display module may have a structure that is not provided with an IC. The IC may be mounted on the FPC by a COF method or the like.

FIG. 26A illustrates an example of cross sections of part of a region including the FPC 472, part of the circuit 464, part of the display portion 462, and part of a region including a connection portion of the semiconductor device 10. FIG. 26A specifically illustrates an example of a cross section of a region including a light-emitting element 430*b* that emits green light (G) and a light-receiving element 440 that receives reflected light (L) in the display portion 462.

The semiconductor device 10 illustrated in FIG. 26A includes a transistor 252, a transistor 260, a transistor 258, the light-emitting element 430*b*, the light-receiving element 440, and the like between a substrate 453 and a substrate 454.

The light-emitting element and the light-receiving element described above as examples can be used as the light-emitting element 430*b* and the light-receiving element 440, respectively.

Here, in the case where a pixel of a display device includes three kinds of subpixels including light-emitting elements that emit light of different colors from each other, the three subpixels can be of three colors of red (R), green (G), and blue (B) or of three colors of yellow (Y), cyan (C), and magenta (M), for example. In the case where four subpixels are included, the four subpixels can be of four colors of R, G, B, and white (W) or of four colors of R, G, B, and Y, for example. Alternatively, the subpixel may include a light-emitting element that emits infrared light.

As the light-receiving element 440, a photoelectric conversion element having sensitivity to light in a red, green, or blue wavelength range or a photoelectric conversion element having sensitivity to light in an infrared wavelength range can be used.

The substrate 454 and a protective layer 416 are bonded to each other with an adhesive layer 442. The adhesive layer 442 is provided to overlap with the light-emitting element 430*b* and the light-receiving element 440; that is, the semiconductor device 10 employs a solid sealing structure. The substrate 454 is provided with a light-blocking layer 417.

The light-emitting element 430*b* and the light-receiving element 440 each include a conductive layer 411*a*, a conductive layer 411*b*, and a conductive layer 411*c* as a pixel electrode. The conductive layer 411*b* has a property of reflecting visible light and functions as a reflective electrode. The conductive layer 411*c* has a property of transmitting visible light and functions as an optical adjustment layer.

The conductive layer 411*a* included in the light-emitting element 430*b* is connected to a conductive layer 272*b* included in the transistor 260 through an opening provided in an insulating layer 264. The transistor 260 has a function of controlling driving of the light-emitting element. The conductive layer 411*a* included in the light-receiving element 440 is electrically connected to the conductive layer 272*b* included in the transistor 258. The transistor 258 has a function of controlling, for example, the timing of light exposure using the light-receiving element 440.

An EL layer 412G or a photoelectric conversion layer 412S is provided to cover the pixel electrode. An insulating layer 421 is provided in contact with a side surface of the EL layer 412G and a side surface of the photoelectric conversion layer 412S, and a resin layer 422 is provided to fill a depressed portion of the insulating layer 421. An organic layer 414, a common electrode 413, and the protective layer 416 are provided to cover the EL layer 412G and the photoelectric conversion layer 412S. With provision of the protective layer 416 that covers the light-emitting element, entry of impurities such as water into the light-emitting element can be inhibited, leading to an increase in the reliability of the light-emitting element.

The light G emitted from the light-emitting element 430*b* is emitted toward the substrate 454 side. The light-receiving element 440 receives the light L incident through the substrate 454 and converts the light L into an electric signal. For the substrate 454, a material having a high visible-light-transmitting property is preferably used.

The transistor 252, the transistor 260, and the transistor 258 are all formed over the substrate 453. These transistors can be fabricated using the same material in the same step.

Note that the transistor 252, the transistor 260, and the transistor 258 may be separately formed to have different structures. For example, it is possible to separately form a transistor having a back gate and a transistor having no back gate, or transistors having semiconductors, gate electrodes, gate insulating layers, source electrodes, and drain electrodes that are formed of different materials and/or have different thicknesses.

The substrate 453 and an insulating layer 262 are bonded to each other with an adhesive layer 455.

In a fabricating method of the semiconductor device 10, first, a formation substrate provided with the insulating layer 262, the transistors, the light-emitting elements, the light-receiving element, and the like is bonded to the substrate 454 provided with the light-blocking layer 417 with the adhesive layer 442. Then, the substrate 453 is attached to a surface exposed by separation of the formation substrate, whereby the components formed over the formation substrate are transferred onto the substrate 453. The substrate 453 and the substrate 454 preferably have flexibility. Accordingly, the flexibility of the semiconductor device 10 can be increased.

Note that in the semiconductor device 10, the EL layer and the photoelectric conversion layer can each be formed with an FMM (fine metal mask). Alternatively, the layers can be formed by a photolithography method instead of using the FMM. In the case where a photolithography method is used, films to be the EL layer and the photoelectric conversion layer are processed after formed on the entire surface, and accordingly the island-shaped EL layer and photoelectric conversion layer each with a uniform thickness can be formed.

Note that in this specification and the like, a device fabricated using a metal mask or an FMM is sometimes referred to as a device having an MM (metal mask) structure. In this specification and the like, a device fabricated without using a metal mask or an FMM is sometimes referred to as a device having an MML (metal maskless) structure.

In addition, in this specification and the like, the term “island shape” refers to a state where two or more layers formed using the same material in the same step are physically separated from each other. For example, “island-shaped light-emitting layer” refers to a state where the light-emitting layer and its adjacent light-emitting layer are physically separated from each other.

A connection portion 254 is provided in a region of the substrate 453 that does not overlap with the substrate 454. In the connection portion 254, the wiring 465 is electrically connected to the FPC 472 through a conductive layer 466 and a connection layer 292. The conductive layer 466 can be obtained by processing the same conductive film as the pixel electrode. Thus, the connection portion 254 and the FPC 472 can be electrically connected to each other through the connection layer 292.

Each of the transistor 252, the transistor 260, and the transistor 258 includes a conductive layer 271 functioning as a gate, an insulating layer 261 functioning as a gate insulating layer, a semiconductor layer 281 including a channel formation region 281*i* and a pair of low-resistance regions 281*n*, a conductive layer 272*a* connected to one of the pair of low-resistance regions 281*n*, the conductive layer 272*b* connected to the other of the pair of the low-resistance regions 281*n*, an insulating layer 275 functioning as a gate insulating layer, a conductive layer 273 functioning as a gate, and an insulating layer 265 covering the conductive layer 273. The insulating layer 261 is positioned between the conductive layer 271 and the channel formation region 281*i*. The insulating layer 275 is positioned between the conductive layer 273 and the channel formation region 281*i*.

The conductive layer 272*a* and the conductive layer 272*b* are connected to the respective low-resistance regions 281*n* through openings provided in the insulating layer 275 and the insulating layer 265. One of the conductive layer 272*a* and the conductive layer 272*b* functions as a source, and the other functions as a drain.

FIG. 26A illustrates an example in which the insulating layer 275 covers a top surface and a side surface of the semiconductor layer. The conductive layer 272*a* and the conductive layer 272*b* are connected to the respective low-resistance regions 281*n* through the openings provided in the insulating layer 275 and the insulating layer 265.

Figure 26B:
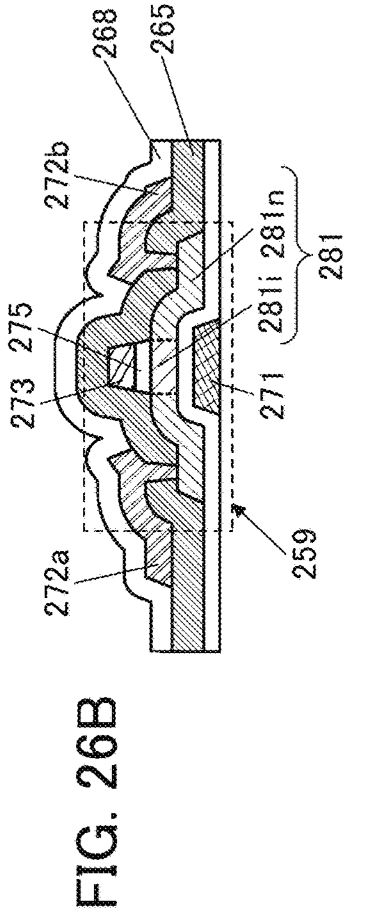
FIG. 26B is a cross-sectional view showing a structure example of a transistor.

Meanwhile, in a transistor 259 illustrated in FIG. 26B, the insulating layer 275 overlaps with the channel formation region 281*i* of the semiconductor layer 281 and does not overlap with the low-resistance regions 281*n*. The structure illustrated in FIG. 26B can be fabricated by processing the insulating layer 275 using the conductive layer 273 as a mask, for example. In FIG. 26B, the insulating layer 265 is provided to cover the insulating layer 275 and the conductive layer 273, and the conductive layer 272*a* and the conductive layer 272*b* are connected to the respective low-resistance regions 281*n* through the openings in the insulating layer 265. Furthermore, an insulating layer 268 covering the transistor may be provided.

There is no particular limitation on the structure of the transistors included in the display device of this embodiment. For example, a planar transistor, a staggered transistor, an inverted staggered transistor, or the like can be used. Atop-gate or a bottom-gate transistor structure may be employed. Alternatively, gates may be provided above and below the semiconductor layer where a channel is formed.

The structure in which the semiconductor layer where a channel is formed is sandwiched between two gates is used for the transistor 252, the transistor 260, and the transistor 258. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the semiconductor layer of the transistor, and any of an amorphous semiconductor, a single crystal semiconductor, and a semiconductor having crystallinity other than single crystal (a microcrystalline semiconductor, a polycrystalline semiconductor, or a semiconductor partly including crystal regions) may be used. A single crystal semiconductor or a semiconductor having crystallinity is preferably used, in which case deterioration of the transistor characteristics can be inhibited.

The semiconductor layer of the transistor preferably includes a metal oxide (also referred to as an oxide semiconductor). That is, a transistor including a metal oxide in its channel formation region (hereinafter, referred to as an OS transistor) is preferably used for the display device of this embodiment.

The band gap of a metal oxide used for the semiconductor layer of the transistor is preferably 2 eV or more, further preferably 2.5 eV or more. With the use of a metal oxide having a wide bandgap, the off-state current of the OS transistor can be reduced.

A metal oxide contains preferably at least indium or zinc and further preferably indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. In particular, M is preferably one or more kinds selected from gallium, aluminum, yttrium, and tin, and M is further preferably gallium. Hereinafter, a metal oxide containing indium, M, and zinc is referred to as In-M-Zn oxide in some cases.

When a metal oxide is an In-M-Zn oxide, the atomic proportion of In is preferably higher than or equal to the atomic proportion of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of an intended atomic ratio. By increasing the proportion of the number of indium atoms in the metal oxide, the on-state current, field-effect mobility, or the like of the transistor can be improved.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The atomic proportion of In may be less than the atomic proportion of M in the In-M-Zn oxide. Examples of the atomic ratio of the metal elements in such an In-M-Zn oxide include In:M:Zn=1:3:2 or a composition in the neighborhood thereof, In:M:Zn=1:3:3 or a composition in the neighborhood thereof, and In:M:Zn=1:3:4 or a composition in the neighborhood thereof. By increasing the atomic proportion of M in the metal oxide, the band gap of the In-M-Zn oxide is further increased; thus, the resistance to a negative bias stress test with light irradiation can be improved. Specifically, the amount of change in the threshold voltage or the amount of change in the shift voltage (Vsh) measured in a NBTIS (Negative Bias Temperature Illumination Stress) test of the transistor can be decreased. Note that the shift voltage (Vsh) is defined as Vg at which, in a drain current (Id)-gate voltage (Vg) curve of a transistor, the tangent at a point where the slope of the curve is the steepest intersects the straight line of Id=1 pA.

Alternatively, the semiconductor layer of the transistor may include silicon. Examples of silicon include amorphous silicon and crystalline silicon (e.g., low-temperature polysilicon or single crystal silicon).

In particular, low-temperature polysilicon has relatively high mobility and can be formed over a glass substrate, and thus can be suitably used for a display device. For example, a transistor including low-temperature polysilicon in a semiconductor layer can be used as the transistor 252 and the like included in the driver circuit, and a transistor including an oxide semiconductor in a semiconductor layer can be used as the transistor 260, the transistor 258, and the like provided in the pixel.

Alternatively, the semiconductor layer of the transistor may include a layered substance that functions as a semiconductor. The layered substance is a general term of a group of materials having a layered crystal structure. In the layered crystal structure, layers formed by covalent bonding or ionic bonding are stacked with bonding such as the Van der Waals force, which is weaker than covalent bonding or ionic bonding. The layered substance has high electrical conductivity in a monolayer, that is, high two-dimensional electrical conductivity. When a material that functions as a semiconductor and has high two-dimensional electrical conductivity is used for a channel formation region, a transistor having a high on-state current can be provided.

Examples of the layered substances include graphene, silicene, and chalcogenide. Chalcogenide is a compound containing chalcogen (an element belonging to Group 16). Examples of chalcogenide include transition metal chalcogenide and chalcogenide of Group 13 elements. Specific examples of the transition metal chalcogenide which can be used for a semiconductor layer of a transistor include molybdenum sulfide (typically $MoS_2$), molybdenum selenide (typically $MoSe_2$), molybdenum telluride (typically $MoTe_2$), tungsten sulfide (typically $WS_2$), tungsten selenide (typically $WSe_2$), tungsten telluride (typically $WTe_2$), hafnium sulfide (typically $HfS_2$), hafnium selenide (typically $HfSe_2$), zirconium sulfide (typically $ZrS_2$), and zirconium selenide (typically $ZrSe_2$).

The transistor included in the circuit 464 and the transistor included in the display portion 462 may have the same structure or different structures. A plurality of transistors included in the circuit 464 may have the same structure or two or more kinds of structures. Similarly, a plurality of transistors included in the display portion 462 may have the same structure or two or more kinds of structures.

A material through which impurities such as water and hydrogen are not easily diffused is preferably used for at least one of the insulating layers covering the transistors. Such an insulating layer can function as a barrier layer. Such a structure can effectively inhibit diffusion of impurities into the transistors from the outside and increase the reliability of the display device.

An inorganic insulating film is preferably used as each of the insulating layer 261, the insulating layer 262, the insulating layer 265, the insulating layer 268, and the insulating layer 275. As the inorganic insulating film, a silicon nitride film, a silicon oxynitride film, a silicon oxide film, a silicon nitride oxide film, an aluminum oxide film, or an aluminum nitride film can be used, for example. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above inorganic insulating films may also be used.

Here, an organic insulating film often has a lower barrier property than an inorganic insulating film. Therefore, the organic insulating film preferably has an opening in the vicinity of an end portion of the semiconductor device 10. This can inhibit entry of impurities from the end portion of the semiconductor device 10 through the organic insulating film. Alternatively, the organic insulating film may be formed such that an end portion of the organic insulating film is positioned inward from the end portion of the semiconductor device 10, to prevent the organic insulating film from being exposed at the end portion of the semiconductor device 10.

An organic insulating film is suitable for the insulating layer 264 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

The light-blocking layer 417 is preferably provided on a surface of the substrate 454 on the substrate 453 side. A variety of optical members can be arranged on the outer surface of the substrate 454. Examples of the optical members include a polarizing plate, a retardation plate, a light diffusion layer (e.g., a diffusion film), an anti-reflective layer, and a light-condensing film. Furthermore, an antistatic film inhibiting the attachment of dust, a water repellent film inhibiting the attachment of stain, a hard coat film inhibiting generation of a scratch caused by the use, an impact-absorbing layer, or the like may be arranged on the outer surface of the substrate 454.

In a connection portion 278 illustrated in FIG. 26A, the common electrode 413 is electrically connected to a wiring. FIG. 26A illustrates an example of the case where the wiring has the same stacked-layer structure as the pixel electrode.

For each of the substrate 453 and the substrate 454, glass, quartz, ceramics, sapphire, a resin, a metal, an alloy, a semiconductor, or the like can be used. The substrate on the side from which light from the light-emitting element is extracted is formed using a material which transmits the light. When the substrate 453 and the substrate 454 are formed using a flexible material, the flexibility of the display device can be increased. Furthermore, a polarizing plate may be used as the substrate 453 or the substrate 454.

For each of the substrate 453 and the substrate 454, any of the following can be used, for example: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber. Glass that is thin enough to have flexibility may be used for one or both of the substrate 453 and the substrate 454.

In the case where a circularly polarizing plate overlaps with the display device, a highly optically isotropic substrate is preferably used as the substrate included in the display device. A highly optically isotropic substrate has a low birefringence (that can also be referred to as a small amount of birefringence).

The absolute value of a retardation (phase difference) of a highly optically isotropic substrate is preferably less than or equal to 30 nm, further preferably less than or equal to 20 nm, still further preferably less than or equal to 10 nm.

Examples of a highly optically isotropic film include a triacetyl cellulose (TAC, also referred to as cellulose triacetate) film, a cycloolefin polymer (COP) film, a cycloolefin copolymer (COC) film, and an acrylic film.

When a film is used for the substrate and the film absorbs water, the shape of the display panel might be changed, e.g., creases are generated. Thus, for the substrate, a film with a low water absorption rate is preferably used. For example, the water absorption rate of the film is preferably 1% or lower, further preferably 0.1% or lower, still further preferably 0.01% or lower.

For the adhesive layer, any of a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferable. A two-liquid-mixture-type resin may be used. An adhesive sheet or the like may be used.

As the connection layer 292, an anisotropic conductive film (ACF), an anisotropic conductive paste (ACP), or the like can be used.

As materials for a gates, a source, and a drain of a transistor and conductive layers such as a variety of wirings and electrodes included in the display device, any of metals such as aluminum, titanium, chromium, nickel, copper, yttrium, zirconium, molybdenum, silver, tantalum, and tungsten, or an alloy containing any of these metals as its main component can be used, for example. A single-layer structure or a stacked-layer structure including a film containing any of these materials can be used.

As a light-transmitting conductive material, a conductive oxide such as indium oxide, indium tin oxide, indium zinc oxide, zinc oxide, or zinc oxide containing gallium, or graphene can be used. It is also possible to use metal material such as gold, silver, platinum, magnesium, nickel, tungsten, chromium, molybdenum, iron, cobalt, copper, palladium, or titanium; or an alloy material containing any of these metal materials. Alternatively, a nitride of the metal material (e.g., titanium nitride) or the like may be used. Note that in the case of using the metal material or the alloy material (or the nitride thereof), the thickness is preferably set small enough to transmit light. Alternatively, a stacked film of any of the above materials can be used for the conductive layers. For example, a stacked film of indium tin oxide and an alloy of silver and magnesium is preferably used because conductivity can be increased. They can also be used for conductive layers such as wirings and electrodes included in the display device, and conductive layers (e.g., a conductive layer functioning as a pixel electrode or a common electrode) included in a light-emitting element.

Examples of insulating materials that can be used for the insulating layers include a resin such as an acrylic resin or an epoxy resin, and an inorganic insulating material such as silicon oxide, silicon oxynitride, silicon nitride oxide, silicon nitride, or aluminum oxide.

The structures described in this embodiment can be combined as appropriate. For example, structures illustrated in different drawings can be combined as appropriate for implementation.

This embodiment can be combined with any of the other embodiments described in this specification as appropriate.

Embodiment 2

Described in this embodiment is a metal oxide that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structure>

Figure 27A:
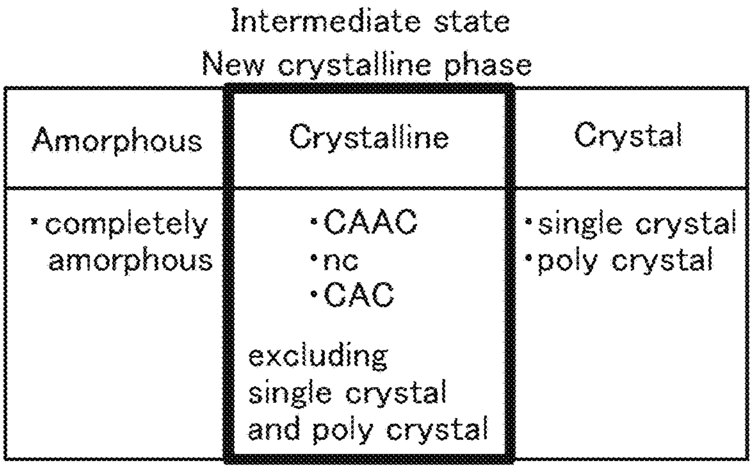
FIG. 27A is a diagram showing classifications of crystal structures of IGZO.

First, the classification of the crystal structures of an oxide semiconductor will be described with reference to FIG. 27A. FIG. 27A is a diagram showing the classification of crystal structures of an oxide semiconductor, typically IGZO (a metal oxide containing In, Ga, and Zn).

As shown in FIG. 27A, an oxide semiconductor is roughly classified into “Amorphous”, “Crystalline”, and “Crystal”. The term “Amorphous” includes completely amorphous. The term “Crystalline” includes CAAC, nc (nanocrystalline), and CAC. Note that the term “Crystalline” excludes single crystal, poly crystal, and completely amorphous (excluding single crystal and poly crystal). The term “Crystal” includes single crystal and poly crystal.

Note that the structures in the thick frame in FIG. 27A are in an intermediate state between “Amorphous” and “Crystal”, and belong to a new crystalline phase. That is, these structures are completely different from “Amorphous”, which is energetically unstable, and “Crystal”.

Figure 27B:
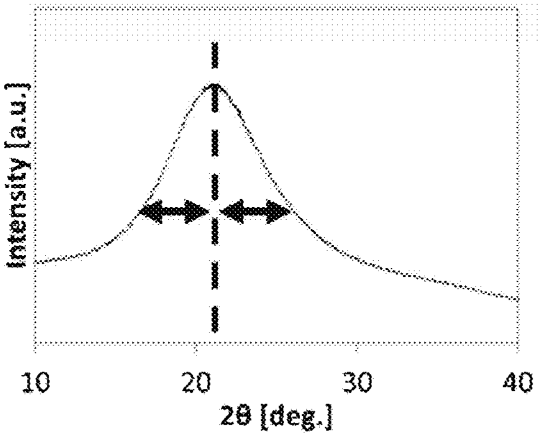
FIG. 27B is a diagram showing an XRD spectrum of a quartz glass substrate.
Figure 27C:
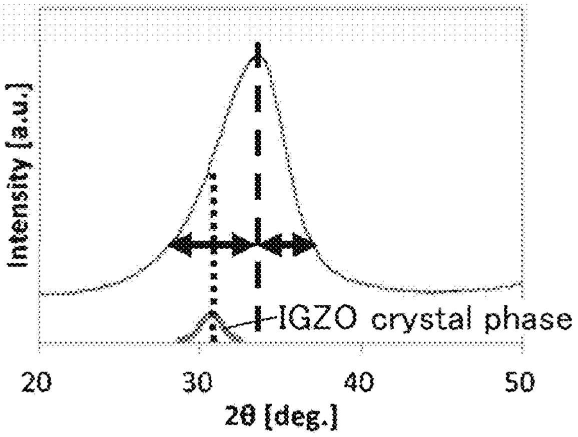
FIG. 27C is a diagram showing an XRD spectrum of a crystalline IGZO film.

A crystal structure of a film or a substrate can be analyzed with an X-ray diffraction (XRD) spectrum. Here, XRD spectra of a quartz glass substrate and an IGZO film having a crystal structure classified into “Crystalline” (also referred to as Crystalline IGZO), which are obtained by a GIXD (Grazing-Incidence XRD) measurement, are shown in FIG. 27B and FIG. 27C, respectively. Note that a GIXD method is also referred to as a thin film method or a Seemann-Bohlin method. The XRD spectrum obtained by GIXD measurement in each of FIG. 27B and FIG. 27C is hereinafter simply referred to as an XRD spectrum. In each of FIG. 27B and FIG. 27C, the vertical axis represents X-ray intensity (Intensity), and the horizontal axis represents diffraction angle (2θ) of X-ray. FIG. 27B shows an XRD spectrum of a quartz glass substrate, and FIG. 27C shows an XRD spectrum of a crystalline IGZO film. Note that the crystalline IGZO film shown in FIG. 27C has a composition in the vicinity of In:Ga:Zn=4:2:3 [atomic ratio]. Furthermore, the crystalline IGZO film shown in FIG. 27C has a thickness of 500 nm.

As indicated by arrows in FIG. 27B, the XRD spectrum of the quartz glass substrate shows a peak with a substantially bilaterally symmetrical shape. In contrast, as indicated by arrows in FIG. 27C, the XRD spectrum of the crystalline IGZO film shows a peak with a bilaterally asymmetrical shape. The asymmetrical peak of the XRD spectrum clearly shows the existence of crystal in the film or the substrate. In other words, the crystal structure of the film or the substrate cannot be regarded as “amorphous” unless it has a bilaterally symmetrical peak in the XRD spectrum. Note that in FIG. 27C, a crystal phase (IGZO crystal phase) is explicitly denoted at 2θ=31° or in the neighborhood thereof. The bilaterally asymmetrical peak of the XRD spectrum is probably attributed to a diffraction peak derived from such a crystal phase (a fine crystal).

Specifically, interference of an X-ray scattered by atoms contained in IGZO probably contributes to a peak at 2θ=34° or in the vicinity thereof. In addition, the fine crystal probably contributes to the peak at 2θ=31° or in the vicinity thereof. In the XRD spectrum of the crystalline IGZO film shown in FIG. 27C, the peak at 2θ=34° or in the vicinity thereof is wide on the lower angle side. This indicates that the crystalline IGZO film includes a fine crystal attributed to the peak at 2θ=31° or in the vicinity thereof.

Figure 27D:
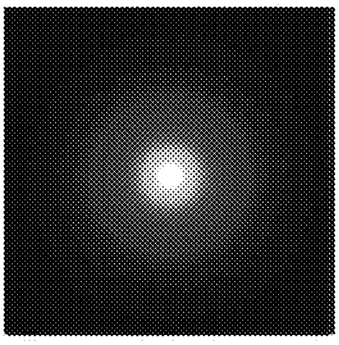
FIG. 27D is a diagram showing a nanobeam electron diffraction pattern of a quartz glass substrate.
Figure 27E:
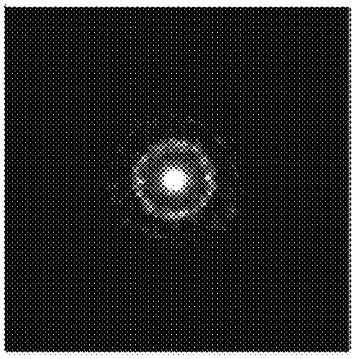
FIG. 27E is a diagram showing a nanobeam electron diffraction pattern of a crystalline IGZO film.

A crystal structure of a film or a substrate can also be evaluated with a diffraction pattern obtained by a nanobeam electron diffraction (NBED) method (also referred to as a nanobeam electron diffraction pattern). Diffraction patterns of the quartz glass substrate and the IGZO film formed with a substrate temperature set at room temperature are shown in FIG. 27D and FIG. 27E, respectively. FIG. 27D shows the diffraction pattern of the quartz glass substrate and FIG. 27E shows the diffraction pattern of the IGZO film. Note that the IGZO film of FIG. 27E is formed by a sputtering method using an In—Ga—Zn oxide target with In:Ga:Zn=1:1:1 [atomic ratio]. In the nanobeam electron diffraction method, electron diffraction is performed with a probe diameter of 1 nm.

Note that as shown in FIG. 27D, a halo pattern is observed in the diffraction pattern of the quartz glass substrate, which indicates that the quartz glass substrate is in an amorphous state. As shown in FIG. 27E, not a halo pattern but a spot-like pattern is observed in the diffraction pattern of the IGZO film deposited at room temperature. Thus, it is suggested that the IGZO film deposited at room temperature is in an intermediate state, which is neither a crystal state nor an amorphous state, and it cannot be concluded that the IGZO film is in an amorphous state.

<<Structure of Oxide Semiconductor>>

Oxide semiconductors might be classified in a manner different from one shown in FIG. 27A when classified in terms of the crystal structure. For example, oxide semiconductors are classified into a single crystal oxide semiconductor and a non-single-crystal oxide semiconductor.

Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[Caac-Os]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. Note that when an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In addition, in an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter an In layer) and a layer containing the element M, zinc (Zn), and oxygen (hereinafter an (M,Zn) layer) are stacked. Indium and the element M can be replaced with each other. Therefore, indium may be contained in the (M, Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal elements contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, or the like is included in the distortion in some cases. Note that a clear crystal grain boundary (also referred to as grain boundary) cannot be observed even in the vicinity of the distortion in the CAAC-OS. That is, formation of a crystal grain boundary is found to be inhibited by the distortion of a lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear crystal grain boundary is observed is what is called polycrystal. It is highly probable that the crystal grain boundary becomes a recombination center and traps carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, reduction in electron mobility due to the crystal grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor with some analysis methods in some cases. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., greater than or equal to 1 nm and less than or equal to 30 nm).

[a-Like OS]

The a-like OS is an oxide semiconductor having a structure between those of the nc-OS and the amorphous oxide semiconductor. The a-like OS includes a void or a low-density region. That is, the a-like OS has low crystallinity as compared with the nc-OS and the CAAC-OS. Moreover, the a-like OS has a higher hydrogen concentration in the film than the nc-OS and the CAAC-OS.

<<Structure of Oxide Semiconductor>>

Next, the above-described CAC-OS will be described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size are mixed in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide is a region having [In] higher than [In] in the composition of the CAC-OS film. Moreover, the second region is a region having [Ga] higher than [Ga] in the composition of the CAC-OS film. As another example, the first region is a region having [In] higher than [In] in the second region and having [Ga] lower than [Ga] in the second region. Moreover, the second region is a region having [Ga] higher than [Ga] in the first region and having [In] lower than [In] in the first region.

Specifically, the first region is a region including indium oxide, indium zinc oxide, or the like as its main component. The second region is a region including gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof. These regions are randomly present to form a mosaic pattern. Thus, it is suggested that the CAC-OS has a structure where metal elements are unevenly distributed.

The CAC-OS can be formed by a sputtering method under a condition where a substrate is not heated, for example. Moreover, in the case of forming the CAC-OS by a sputtering method, any one or more selected from an inert gas (typically, argon), an oxygen gas, and a nitrogen gas are used as a deposition gas. The ratio of the flow rate of an oxygen gas to the total flow rate of the deposition gas at the time of deposition is preferably as low as possible, and for example, the ratio of the flow rate of an oxygen gas to the total flow rate of the deposition gas at the time of deposition is preferably higher than or equal to 0% and less than 30%, further preferably higher than or equal to 0% and less than or equal to 10%.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

Here, the first region is a region having higher conductivity than the second region. In other words, when carriers flow through the first region, the conductivity of a metal oxide is exhibited. Accordingly, when the first regions are distributed in a metal oxide as a cloud, high field-effect mobility (μ) can be achieved.

On the other hand, the second region is a region having a higher insulating property than the first region. In other words, when the second regions are distributed in a metal oxide, a leakage current can be inhibited.

Thus, in the case where the CAC-OS is used for a transistor, a switching function (On/Off function) can be given to the CAC-OS owing to complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current ($I_{on}$), high field-effect mobility (μ), and an excellent switching operation can be achieved.

A transistor using the CAC-OS has high reliability. Thus, it is most suitable to use the CAC-OS for a variety of semiconductor devices typified by a display.

An oxide semiconductor has various structures with different properties. Two or more kinds among an amorphous oxide semiconductor, a polycrystalline oxide semiconductor, an a-like OS, a CAC-OS, an nc-OS, and a CAAC-OS may be included in the oxide semiconductor of one embodiment of the present invention.

<Transistor Including Oxide Semiconductor>

Next, the case where the above oxide semiconductor is used for a transistor will be described.

When the oxide semiconductor is used for a transistor, the transistor can have high field-effect mobility. In addition, the transistor having high reliability can be achieved.

An oxide semiconductor having a low carrier concentration is preferably used for a transistor. For example, the carrier concentration of an oxide semiconductor is lower than or equal to $1\times10^{17}$ $cm^{-3}$, preferably lower than or equal to $1\times10^{15}$ $cm^{-3}$, further preferably lower than or equal to $1\times10^{13}$ $cm^{-3}$, still further preferably lower than or equal to $1\times10^{11}$ $cm^{-3}$, yet further preferably lower than $1\times10^{10}$ $cm^{-3}$, and higher than or equal to $1\times10^{-9}$ $cm^{-3}$. In order to reduce the carrier concentration in an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor with a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Electric charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor will be described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained by SIMS, is set lower than or equal to $1\times10^{18}$ atoms/cm$^3$, preferably lower than or equal to $2\times10^{16}$ atoms/cm$^3$.

Furthermore, when the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

This embodiment can be combined with any of the other embodiments described in this specification as appropriate.

Embodiment 3

In this embodiment, electronic devices including the semiconductor device of one embodiment of the present invention are described.

The semiconductor device of one embodiment of the present invention can be provided in a variety of electronic devices. For example, the semiconductor device of one embodiment of the present invention can be provided in a digital camera, a digital video camera, a digital photo frame, a portable game machine, a portable information terminal, an audio reproducing device, or the like, in addition to an electronic device with a comparatively large screen, such as a television device, a desktop or laptop computer, a tablet computer, a monitor for a computer or the like, digital signage, or a large game machine such as a pachinko machine. Structure examples of electronic device in which the semiconductor device of one embodiment of the present invention can be provided are described with reference to FIG. 28A to FIG. 28D.

Figure 28A:
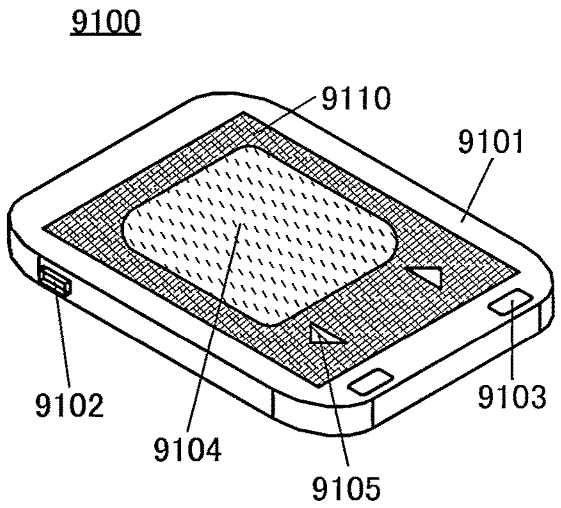
FIG. 28A to FIG. 28D are diagrams illustrating examples of electronic devices.

FIG. 28A is a diagram illustrating an example of a portable data terminal 9100. The portable data terminal 9100 includes a display portion 9110, a housing 9101, a key 9102, a speaker 9103, and the like. The portable data terminal 9100 can be a tablet, for example. Here, the key such as the key 9102 can be a key for switching on/off of a power source. That is, the key such as the key 9102 can be a power switch, for example. The key such as the key 9102 can be an operation key to be used to make an electronic device perform a desired operation, for example.

The display portion 9110 can display information 9104, operation buttons (also referred to as operation icons or simply icons) 9105, and the like.

The portable data terminal 9100 in which the semiconductor device of one embodiment of the present invention is provided can perform authentication such as fingerprint authentication in a short time and with a high accuracy.

Figure 28B:
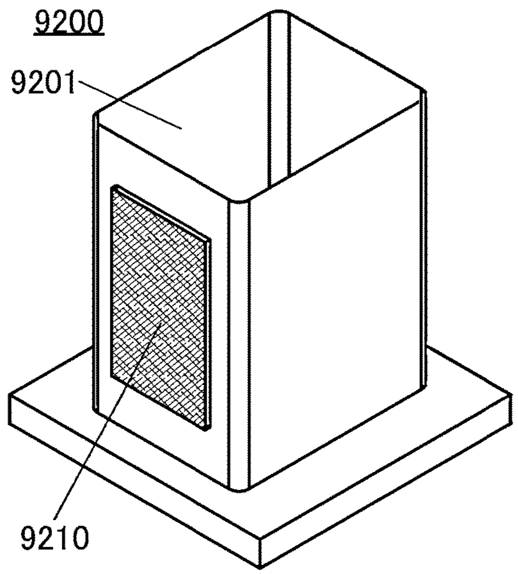

FIG. 28B is a diagram illustrating an example of digital signage 9200. The digital signage 9200 can have a structure where a display portion 9210 is attached to a pillar 9201.

The digital signage 9200 in which the semiconductor device of one embodiment of the present invention is provided can perform authentication such as fingerprint authentication in a short time and with a high accuracy.

Figure 28C:
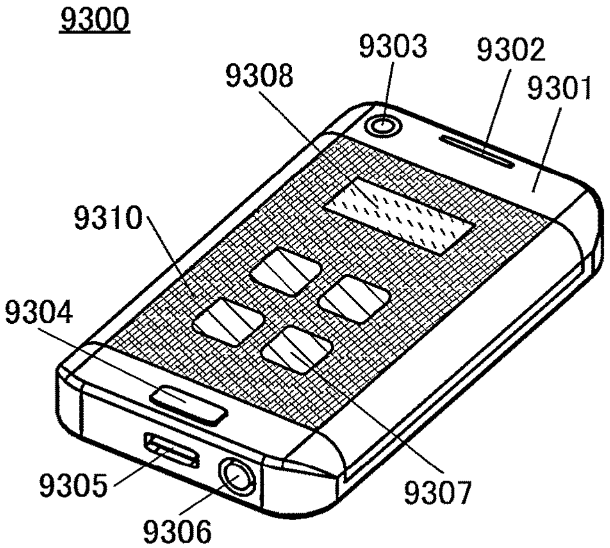

FIG. 28C is a diagram illustrating an example of a portable information terminal 9300. The portable information terminal 9300 includes a display portion 9310, a housing 9301, a speaker 9302, a camera 9303, a key 9304, a connection terminal 9305, a connection terminal 9306, and the like. For example, the portable information terminal 9300 can be a smartphone. The speaker 9302 in FIG. 28C corresponds to the speaker 38 illustrated in the schematic view in FIG. 6 or the like in Embodiment 1. The camera 9303 in FIG. 28C corresponds to the camera 39 illustrated in the schematic view in FIG. 6 or the like in Embodiment 1. The display portion 9310 in FIG. 28C corresponds to the pixel portion 30 illustrated in the schematic view in FIG. 6 or the like in Embodiment 1. Therefore, in FIG. 28C, pixels in a row which is the farthest from the speaker 9302 corresponds to the pixels in the first row and pixels in a row which is the closest to the speaker 9302 corresponds to the pixels in the m-th row of pixels in m rows and n columns included in the display portion 9310. Similarly, pixels in a row which is the farthest from the camera 9303 corresponds to the pixels in the first row and pixels in a row which is the closest to the camera 9303 corresponds to the pixels in the m-th row of pixels in m rows and n columns included in the display portion 9310. Note that the connection terminal 9305 can be a micro USB terminal, a lightning terminal, or a Type-C terminal, or the like, for example. In addition, the connection terminal 9306 can be an earphone jack, for example.

The display portion 9310 can display, for example, an operation button 9307. The display portion 9310 can also display information 9308. Examples of the information 9308 include display indicating incoming e-mails, SNS (social networking services), phone calls, and the like; the titles of e-mails, SNS, and the like; the senders of e-mails, SNS, and the like; dates; time; remaining battery; the reception strength of an antenna; and the like.

The portable information terminal 9300 in which the semiconductor device of one embodiment of the present invention is provided can perform authentication such as fingerprint authentication in a short time and with a high accuracy.

Figure 28D:
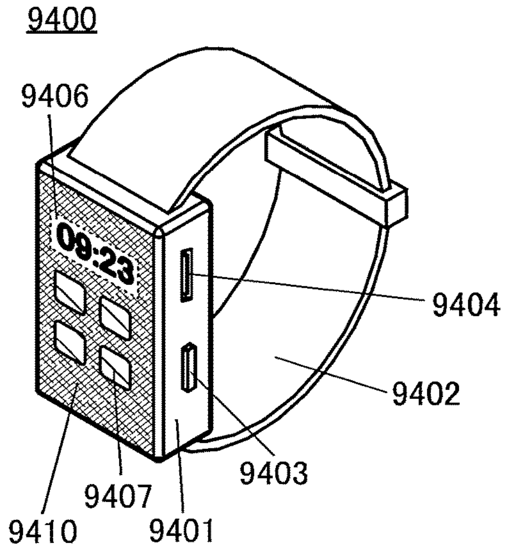

FIG. 28D is a diagram illustrating an example of a watch-type portable information terminal 9400. The portable information terminal 9400 includes a display portion 9410, a housing 9401, a wristband 9402, a key 9403, a connection terminal 9404, and the like. Note that the connection terminal 9404 can be a micro USB terminal, a lightning terminal, or a Type-C terminal, or the like, for example, like the connection terminal 9305 in the portable information terminal 9300 illustrated in FIG. 28C or the like.

The display portion 9410 can display information 9406, operation buttons 9407, and the like. FIG. 28D illustrates an example in which time is displayed on the display portion 9410 as the information 9406.

The portable information terminal 9400 in which the semiconductor device of one embodiment of the present invention is provided can perform authentication such as fingerprint authentication in a short time and with a high accuracy.

This embodiment can be combined with any of the other embodiments described in this specification as appropriate.

REFERENCE NUMERALS

10: semiconductor device, 11: substrate, 12: substrate, 13: light-emitting apparatus, 15: imaging apparatus, 23: light, 25: light, 27: finger, 29: fingerprint, 30: pixel portion, 30R: pixel portion, 30U: pixel portion, 31: pixel, 32: control circuit, 33: row driver circuit, 34: CDS circuit, 36: readout circuit, 37: detection circuit, 38: speaker, 39: camera, 41: wiring, 43: wiring, 44: wiring, 45: wiring, 46: wiring, 47: wiring, 48: wiring, 49: wiring, 50: light-receiving element, 51: transistor, 52: transistor, 53: transistor, 54: transistor, 56: capacitor, 57: capacitor, 60: circuit, 70: finger, 71: fingerprint, 81: pixel, 82: pixel, 82E: light source, 83: gate driver circuit, 84: pixel portion, 86: data driver circuit, 252: transistor, 254: connection portion, 258: transistor, 259: transistor, 260: transistor, 261: insulating layer, 262: insulating layer, 264: insulating layer, 265: insulating layer, 268: insulating layer, 271: conductive layer, 272*a*: conductive layer, 272*b*: conductive layer, 273: conductive layer, 275: insulating layer, 278: connection portion, 281*i*: channel formation region, 281*n*: low-resistance region, 281: semiconductor layer, 292: connection layer, 411*a*: conductive layer, 411*b*: conductive layer, 411*c*: conductive layer, 412G: EL layer, 412S: photoelectric conversion layer, 413: common electrode, 414: organic layer, 416: protective layer, 417: light-blocking layer, 421: insulating layer, 422: resin layer, 430*b*: light-emitting element, 440: light-receiving element, 442: adhesive layer, 451: substrate, 452: substrate, 453: substrate, 454: substrate, 455: adhesive layer, 462: display portion, 464: circuit, 465: wiring, 466: conductive layer, 472: FPC, 473: IC, 9100: portable data terminal, 9101: housing, 9102: key, 9103: speaker, 9104: information, 9110: display portion, 9200: digital signage, 9201: pillar, 9210: display portion, 9300: portable information terminal, 9301: housing, 9302: speaker, 9303: camera, 9304: key, 9305: connection terminal, 9306: connection terminal, 9307: operation button, 9308: information, 9310: display portion, 9400: portable information terminal, 9401: housing, 9402: wristband, 9403: key, 9404: connection terminal, 9406: information, 9407: operation button, 9410: display portion

The invention claimed is:

1. A semiconductor device comprising:

a light-emitting apparatus; and an imaging apparatus, wherein the imaging apparatus comprises a pixel portion where pixels are arranged in a matrix of m rows and n columns (m and n are each an integer greater than or equal to 1) and a row driver circuit comprising a shift register circuit, wherein the pixel portion and the shift register circuit each comprise a transistor, wherein the transistor comprises a metal oxide in a channel formation region, and wherein the imaging apparatus is configured to detect a detection target located over the pixels in p-th to q-th rows (p and q are each an integer greater than or equal to 1 and less than or equal to m, and p is smaller than q) of the pixel portion, and to obtain and to read out an image of the detection target from at least pixels in the first to q-th rows of the pixel portion.

2. The semiconductor device according to claim 1, wherein pixels in the first row of the pixel portion are connected to a first stage of the shift register circuit, and wherein pixels in the m-th row of the pixel portion are connected to the last stage of the shift register circuit outputting a selection signal.

3. The semiconductor device according to claim 1, wherein the detection target is a finger of a user of the semiconductor device.

4. A semiconductor device comprising:

a light-emitting apparatus; and an imaging apparatus, wherein the imaging apparatus comprises a pixel portion where pixels of m rows and n columns (m and n are each an integer greater than or equal to 1) are arranged in a matrix and a row driver circuit comprising a shift register circuit, wherein the pixel portion and the shift register circuit each comprise a transistor, wherein the transistor comprises a metal oxide in a channel formation region, and wherein the imaging apparatus is configured to detect a detection target that is located on the pixels in the p-th to q-th rows (p and q are each an integer greater than or equal to 1 and less than or equal to m, and p is smaller than q) of the pixel portion when light that is emitted by the light-emitting apparatus and reflected by the detection target is detected, to skip imaging operation for the detection target in pixels in the first to p-1-th rows of the pixel portion, to obtain and to read out an image of the detection target from pixels in the p-th to q-th rows of the pixel portion, and to skip imaging operation for the detection target in pixels q+1-th to m-th rows of the pixel portion.

5. The semiconductor device according to claim 4, wherein the detection target is a finger of a user of the semiconductor device, and wherein the image is a fingerprint of the user.

6. An electronic device comprising:

the semiconductor device according to claim 4; and a speaker.

7. An electronic device comprising:

the semiconductor device according to claim 4; and a camera.

8. A method for driving a semiconductor device comprising a light-emitting apparatus and an imaging apparatus, wherein the imaging apparatus comprises a pixel portion where pixels of m rows and n columns (m and n are each an integer greater than or equal to 1) are arranged in a matrix and a row driver circuit comprising a shift register circuit, wherein the pixel portion and the shift register circuit each comprise a transistor, wherein the transistor comprises a metal oxide in a channel formation region, wherein the method comprises the steps of:

detecting a detection target located on the pixels in p-th to q-th rows (p and q are each an integer greater than or equal to 1 and less than or equal to m, and p is smaller than q) of the pixel portion; and capturing an image of the detection target which reflects light emitted from the light-emitting apparatus and reading out a captured image from the pixels in the first to the q-th rows of the pixel portion by the imaging apparatus, and wherein the step of capturing is performed after the step of detecting is performed, and operation of the shift register circuit is stopped after the step of reading out is completed.

9. The method for driving a semiconductor device according to claim 8, wherein the step of detecting is performed in every x rows and in every y columns (x and y are each an integer greater than or equal to 1 and less than or equal to q-p) of the pixels arranged in m rows and n columns of the pixel portion.

10. The method for driving a semiconductor device according to claim 8, wherein the detection target is a finger of a user of the semiconductor device, and wherein the image captured by the imaging apparatus is a fingerprint image of the user.

11. A method for driving a semiconductor device comprising a light-emitting apparatus and an imaging apparatus, wherein the imaging apparatus comprises a pixel portion where pixels of m rows and n columns (m and n are each an integer greater than or equal to 1) are arranged in a matrix and a row driver circuit comprising a shift register circuit, wherein the pixel portion and the shift register circuit each comprise a transistor, wherein the transistor comprises a metal oxide in a channel formation region, and wherein the method comprises the steps of:

detecting a detection target that is located on the pixels in p-th to q-th rows (p and q are each an integer greater than or equal to 1 and less than or equal to m, and p is smaller than q) of the pixel portion;

skipping imaging operation for the detection target in pixels in the first to p-1-th rows in the pixel portion;

capturing an image of the detection target which reflects light emitted from the light-emitting apparatus in pixels in the p-th to q-th rows in the pixel portion and reading out a captured image by the imaging apparatus; and skipping imaging operation for the detection target is performed in pixels in the q+1-th to m-th rows in the pixel portion.

12. The method for driving a semiconductor device according to claim 11, wherein the step of detecting is performed on pixels in every x rows and in every y columns (x and y are each an integer greater than or equal to 1 and less than or equal to q-p) of pixels arranged in m rows and n columns of the pixel portion.

13. The method for driving a semiconductor device according to claim 11, wherein the detection target is a finger of a user of the semiconductor device, and wherein the image captured by the imaging apparatus is a fingerprint image of the user.

* * * * *